(12) United States Patent
Waldman et al.

(10) Patent No.: US 9,483,109 B2
(45) Date of Patent: Nov. 1, 2016

(54) METHODS AND SYSTEMS FOR DISPLAYING TEXT USING RSVP

(71) Applicant: SPRITZ TECHNOLOGY, INC., Stoneham, MA (US)

(72) Inventors: Francis Abbott Waldman, Stoneham, MA (US); Maik Steffen Maurer, Ismaning (DE); Oleg Skrypnyuk, Munich (DE)

(73) Assignee: Spritz Technology, Inc., Salt Lake City, UT (US)

( * ) Notice: Subject to any disclaimer, the term of this patent is extended or adjusted under 35 U.S.C. 154(b) by 465 days.

(21) Appl. No.: 13/919,848

(22) Filed: Jun. 17, 2013

(65) Prior Publication Data

US 2014/0189515 A1 Jul. 3, 2014

Related U.S. Application Data

(63) Continuation-in-part of application No. 13/730,163, filed on Dec. 28, 2012, now abandoned.

(51) Int. Cl.
*G06F 3/048* (2013.01)
*G06F 3/01* (2006.01)
(Continued)

(52) U.S. Cl.
CPC ........... *G06F 3/01* (2013.01); *G06F 17/30061* (2013.01); *G06F 17/30781* (2013.01); *G06F 17/30796* (2013.01); *G06F 17/30905* (2013.01); *G09G 5/00* (2013.01); *G06F 3/0482* (2013.01); *G06F 3/0488* (2013.01); *G09G 2340/14* (2013.01); *G09G 2340/145* (2013.01)

(58) Field of Classification Search
CPC ................... G06F 17/214; G06F 17/30719
See application file for complete search history.

(56) References Cited

U.S. PATENT DOCUMENTS

| 4,845,645 A | 7/1989 | Matin et al. |
| 4,932,416 A | 6/1990 | Rosenfeld |

(Continued)

FOREIGN PATENT DOCUMENTS

| CA | 2 619 015 A1 | 8/2009 |
| CN | 1461435 A | 12/2003 |

(Continued)

OTHER PUBLICATIONS

Android Push Notifications, http://developer.android.com/guide/topics/ui/notifiers/notifications.html.

(Continued)

*Primary Examiner* — William Bashore
*Assistant Examiner* — Nathan Shrewsbury
(74) *Attorney, Agent, or Firm* — Mauriel Kapouytian Woods LLP; Michael Mauriel; Lana Akopyan

(57) ABSTRACT

The disclosure describes systems and methods related to moving object content that is enhanced with textual content presented using rapid serial visual presentation ("RSVP"). In one embodiment, video content is enhanced with RSPV content. Related embodiments provide systems and methods for displaying, creating, and editing such content. A particular embodiment provides for RSPV enhanced video previews. In another embodiment, augmented reality content is enhanced with RSVP content. In some embodiments, RSPV enhanced moving object content is provided on various end user electronic devices including smart phones, smart watches, and head mounted displays. These and other embodiments are disclosed further herein.

29 Claims, 76 Drawing Sheets

(51) Int. Cl.
*G06F 17/30* (2006.01)
*G09G 5/00* (2006.01)
*G06F 3/0488* (2013.01)
*G06F 3/0482* (2013.01)

(56) References Cited

U.S. PATENT DOCUMENTS

| | | |
|---|---|---|
| 5,137,027 A | 8/1992 | Rosenfeld |
| 5,543,850 A * | 8/1996 | Pratt .................... H04N 7/0255 348/564 |
| 5,873,109 A | 2/1999 | High |
| 5,875,428 A * | 2/1999 | Kurzweil ............. G09B 17/003 704/260 |
| 5,995,101 A | 11/1999 | Clark et al. |
| 6,018,744 A | 1/2000 | Mayle et al. |
| 6,052,663 A * | 4/2000 | Kurzweil ................ G06F 3/16 704/260 |
| 6,067,069 A | 5/2000 | Krause |
| 6,078,935 A | 6/2000 | Nielsen |
| 6,098,085 A | 8/2000 | Blonder et al. |
| 6,113,394 A | 9/2000 | Edgar |
| 6,130,968 A | 10/2000 | McIan et al. |
| 6,227,576 B1 * | 5/2001 | Gerou .................... G09B 17/02 283/45 |
| 6,292,176 B1 | 9/2001 | Reber et al. |
| 6,353,824 B1 | 3/2002 | Boguraev et al. |
| 6,409,513 B1 | 6/2002 | Kawamura et al. |
| 6,515,690 B1 | 2/2003 | Back et al. |
| 6,553,373 B2 | 4/2003 | Boguraev et al. |
| 6,568,939 B1 | 5/2003 | Edgar |
| 6,652,283 B1 | 11/2003 | Van Schaack et al. |
| 6,686,928 B1 | 2/2004 | Reber et al. |
| 6,816,174 B2 | 11/2004 | Tiongson et al. |
| 6,865,572 B2 | 3/2005 | Boguraev et al. |
| 6,925,613 B2 | 8/2005 | Gibson |
| 7,139,006 B2 | 11/2006 | Wittenburg et al. |
| 7,159,172 B1 | 1/2007 | Bentley et al. |
| 7,173,621 B2 | 2/2007 | Reber et al. |
| 7,272,787 B2 | 9/2007 | Nakamura et al. |
| 7,365,741 B2 | 4/2008 | Chincholle et al. |
| 7,395,500 B2 | 7/2008 | Whittle et al. |
| 7,404,142 B1 | 7/2008 | Tischer |
| 7,454,717 B2 | 11/2008 | Hinckley et al. |
| 7,475,334 B1 | 1/2009 | Kermani |
| 7,478,322 B2 | 1/2009 | Konttinen |
| 7,549,114 B2 | 6/2009 | Bederson et al. |
| 7,598,977 B2 | 10/2009 | Ryall et al. |
| 7,613,731 B1 | 11/2009 | Larson |
| 7,627,590 B2 | 12/2009 | Boguraev et al. |
| 7,647,345 B2 | 1/2010 | Trepess et al. |
| 7,710,411 B2 | 5/2010 | Reber et al. |
| 7,730,397 B2 | 6/2010 | Tischer |
| 7,783,978 B1 | 8/2010 | Andrews et al. |
| 7,835,581 B2 | 11/2010 | Mathan et al. |
| 7,946,707 B1 | 5/2011 | McDonald, II et al. |
| 7,991,195 B2 | 8/2011 | Mathan et al. |
| 7,991,920 B2 | 8/2011 | Back et al. |
| 7,996,045 B1 | 8/2011 | Bauer et al. |
| 8,059,136 B2 | 11/2011 | Mathan |
| 8,069,466 B2 | 11/2011 | Shelton et al. |
| 8,165,407 B1 | 4/2012 | Khosla et al. |
| 8,214,309 B1 | 7/2012 | Khosla et al. |
| 8,244,475 B2 | 8/2012 | Aguilar et al. |
| 8,245,142 B2 | 8/2012 | Mizrachi et al. |
| 8,249,397 B2 | 8/2012 | Wood et al. |
| 8,265,743 B2 | 9/2012 | Aguilar et al. |
| 8,274,592 B2 | 9/2012 | Watkins et al. |
| 8,285,052 B1 | 10/2012 | Bhattacharyya et al. |
| 8,292,433 B2 | 10/2012 | Vertegaal |
| 8,307,282 B2 | 11/2012 | Saito et al. |
| 8,335,751 B1 | 12/2012 | Daily et al. |
| 8,363,939 B1 | 1/2013 | Khosla et al. |
| 8,365,235 B2 * | 1/2013 | Hunt .................... G06F 3/04817 709/219 |
| 8,369,652 B1 | 2/2013 | Khosla et al. |
| 8,374,687 B2 | 2/2013 | Mathan et al. |
| 8,418,057 B2 | 4/2013 | Knight et al. |
| 8,458,152 B2 * | 6/2013 | Fogg .................. G06F 17/30905 707/705 |
| 8,472,791 B2 | 6/2013 | Gargi |
| 8,483,816 B1 | 7/2013 | Payton et al. |
| 2002/0133521 A1 | 9/2002 | Campbell et al. |
| 2002/0144268 A1 * | 10/2002 | Khoo .................... G06Q 30/02 725/47 |
| 2003/0038754 A1 | 2/2003 | Goldstein et al. |
| 2003/0043196 A1 | 3/2003 | Gibson |
| 2003/0184560 A1 | 10/2003 | Pierce |
| 2004/0004632 A1 | 1/2004 | Knight et al. |
| 2004/0024747 A1 | 2/2004 | Boguraev et al. |
| 2004/0107195 A1 | 6/2004 | Trepess |
| 2005/0120306 A1 | 6/2005 | Klassen et al. |
| 2005/0277099 A1 * | 12/2005 | Van Schaack ........... G09B 5/00 434/322 |
| 2006/0069562 A1 | 3/2006 | Adams et al. |
| 2006/0100984 A1 | 5/2006 | Fogg et al. |
| 2007/0061720 A1 | 3/2007 | Kriger |
| 2007/0173699 A1 * | 7/2007 | Mathan .............. G06K 9/00496 600/300 |
| 2007/0195096 A1 * | 8/2007 | Voorhees ............. G06F 3/0481 345/467 |
| 2007/0245241 A1 | 10/2007 | Betram et al. |
| 2008/0141126 A1 | 6/2008 | Johnson et al. |
| 2008/0249843 A1 * | 10/2008 | Gross .................. G06Q 30/0281 705/307 |
| 2009/0019485 A1 * | 1/2009 | Ellis .................... H04N 5/44543 725/40 |
| 2009/0066722 A1 * | 3/2009 | Kriger .................... G06Q 30/02 345/619 |
| 2009/0083621 A1 | 3/2009 | Kermani |
| 2009/0094105 A1 | 4/2009 | Gounares et al. |
| 2009/0094659 A1 * | 4/2009 | Candelore ............. H04N 5/4403 725/131 |
| 2009/0187825 A1 * | 7/2009 | Sandquist ......... G06F 17/30781 715/719 |
| 2009/0189904 A1 | 7/2009 | Roth |
| 2009/0249247 A1 | 10/2009 | Tseng et al. |
| 2010/0280403 A1 | 11/2010 | Erdogmus et al. |
| 2011/0010611 A1 | 1/2011 | Ross |
| 2011/0016389 A1 * | 1/2011 | Gordon ............... G06F 17/2264 715/271 |
| 2011/0115819 A1 * | 5/2011 | Hanson ................ G06F 1/1626 345/649 |
| 2011/0117969 A1 * | 5/2011 | Hanson ............. H04M 1/72552 455/566 |
| 2012/0265758 A1 * | 10/2012 | Han ................... G06F 17/30038 707/737 |
| 2012/0317498 A1 * | 12/2012 | Logan ................. G06F 3/04817 715/752 |
| 2012/0323891 A1 * | 12/2012 | Jacobson .......... G06F 17/30023 707/722 |
| 2013/0038578 A1 * | 2/2013 | Liang .................. G06F 3/03547 345/175 |
| 2013/0100139 A1 | 4/2013 | Schliesser et al. |
| 2013/0125175 A1 * | 5/2013 | Hao .................. H04N 21/47202 725/62 |
| 2013/0132854 A1 * | 5/2013 | Raleigh ................ G06F 3/0482 715/738 |
| 2013/0159850 A1 | 6/2013 | Cohn |
| 2013/0174088 A1 * | 7/2013 | Stringer ................ G06F 3/0481 715/800 |
| 2013/0218982 A1 * | 8/2013 | Hymel .................... H04L 51/08 709/206 |
| 2013/0222378 A1 | 8/2013 | Koivusalo |
| 2013/0304616 A1 * | 11/2013 | Raleigh ................ G06Q 20/145 705/34 |
| 2013/0332815 A1 * | 12/2013 | Gallo .................... G09B 21/008 715/234 |

(56) References Cited

U.S. PATENT DOCUMENTS

| | | | | |
|---|---|---|---|---|
| 2014/0040344 | A1* | 2/2014 | Gehring | G06F 9/542 709/203 |
| 2014/0186010 | A1* | 7/2014 | Guckenberger | G11B 27/031 386/248 |

FOREIGN PATENT DOCUMENTS

| | | |
|---|---|---|
| EP | 1 162 587 A1 | 12/2001 |
| EP | 1 727 052 A1 | 11/2006 |
| EP | 2 323 357 A1 | 5/2011 |
| JP | 2007-141059 A1 | 6/2007 |
| KR | 2002-0011933 A | 2/2002 |
| WO | WO 98/41937 A1 | 9/1998 |
| WO | WO 02/12994 A1 | 2/2002 |
| WO | WO 02/37256 A2 | 5/2002 |
| WO | WO 2006/100645 A2 | 9/2006 |
| WO | WO 2008/051510 A2 | 5/2008 |

OTHER PUBLICATIONS

U.S. Appl. No. 13/547,982, filed Jul. 12, 2012, Maurer et al.
U.S. Appl. No. 13/973,835, filed Aug. 22, 2013, Waldman et al.
U.S. Appl. No. 13/973,867, filed Aug. 22, 2013, Waldman et al.
U.S. Appl. No. 14/047,975, filed Oct. 7, 2013, Waldman et al.
U.S. Appl. No. 13/730,163, filed Dec. 28, 2012, Waldman et al.
Brysbaert, "Interhemispheric transfer and the processing of foveally presented stimuli," Behavioural Brain Research, 1994, pp. 151-161, vol. 64.
Brysbaert et al., "Visual Constraints in Written Word Recognition: Evidence From the Optimal Viewing Position Effect," Journal of Research in Reading, 2005, pp. 216-228, vol. 28, Issue 3.
Brysbaert et al., "Word skipping: Implications for theories of eye movement control in reading," Eye Guidance in Reading and Scene Perception, 1998, pp. 125-147, Chapter 6.
Clark et al., "Word Ambiguity and the Optimal Viewing Position in Reading," Preprint submitted to Elsevier Preprint, 1998, pp. 1-50.
Engbert et al., "SWIFT: A Dynamical Model of Saccade Generation during Reading," Psychological Review, 2005, pp. 777-813, vol. 112, No. 4.
Findlay et al., "Saccade target selection in visual search: the effect of information from the previous fixation," Vision Research, 2001, pp. 87-95, vol. 41.
Kliegl et al., "Tracking the Mind During Reading: The Influence of Past, Present, and Future Words on Fixation Durations," J. of Exp. Psyc., 2006, pp. 12-35, vol. 135, No. 1.
McConkie et al., "Eye Movement Control During Reading:II. Frequency of Refixating a Word," Center for the Study of Reading, 1989, pp. 1-30, Technical Report No. 469.
Nazir et al., "Letter visibility and word recognition: The optimal viewing position in printed words," Perception & Psychophysics, 1992, pp. 315-328, vol. 52, No. 3.
O'Regan et al., "Convenient Fixation Location Within Isolated Words of Different Length and Structure," Journal of Experimental Psychology, 1984, pp. 250-257, vol. 10, No. 2.
Rayner et al., "Asymmetry of the effective visual field in reading," Perception & Psychophysics, 1980, pp. 537-544, vol. 27, No. 6.
Rayner, "Eye Movements in Reading and Information Processing: 20 Years of Research," Psychological Bulletin,1998, pp. 372-422, vol. 124, No. 3.
Schoonbaert et al., "Letter position coding in printed word perception: Effects of repeated and transposed letters," Language and Cognitive Processes, 2004, pp. 333-367, Voi. 19, No. 3.
Staub et al., "Eye movements and on-line comprehension processes," The Oxford handbook of psycholinguistics, 2007, pp. 327-342, Chapter 19.
Stevens et al., "Letter visibility and the viewing position effect in visual word recognition," Perception & Psychophysics, 2003, pp. 133-151, vol. 65, No. 1.
Vitu et al., "Optimal landing position in reading isolated words and continuous text," Perception & Psychophysics, 1990, pp. 583-600, vol. 47, No. 6.
Vitu, "The influence of parafoveal preprocessing and linguistic context on the optimal landing position effect," Perception & Psychophysics, 1991, pp. 58-75, vol. 50.
Bruijn et al., "RSVP Browser: Web Browsing on Small Screen Devices," Personal and Ubiquitous Computing, 2002, pp. 245-252, vol. 6, Issue 4.
International Search Report and Written Opinion issued in corresponding International Application No. PCT/US2013/050081 dated Oct. 31, 2013.
International Search Report and Written Opinion issued in corresponding International Application No. PCT/US2013/077883 dated Apr. 16, 2014.

* cited by examiner

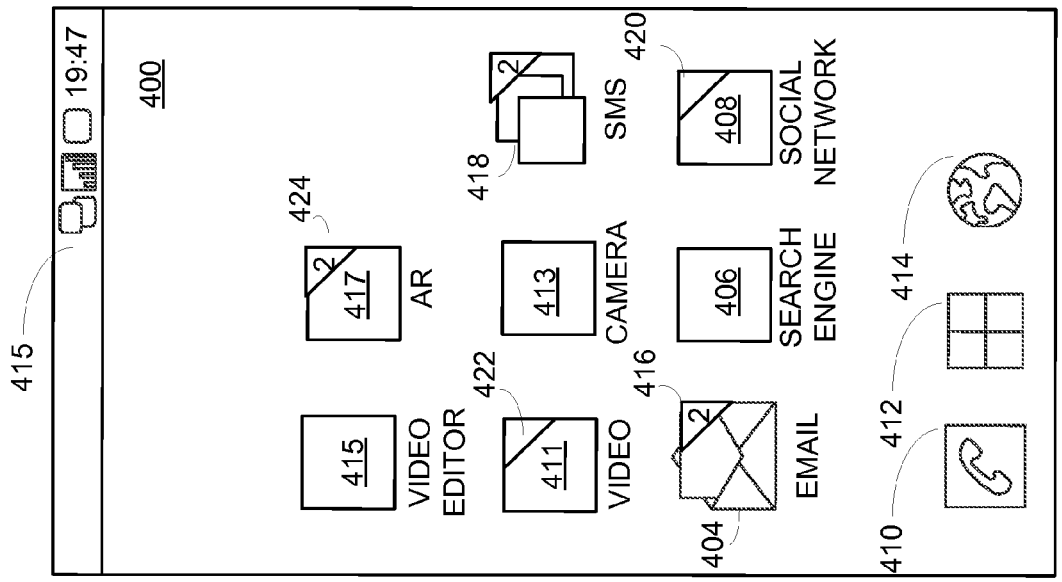
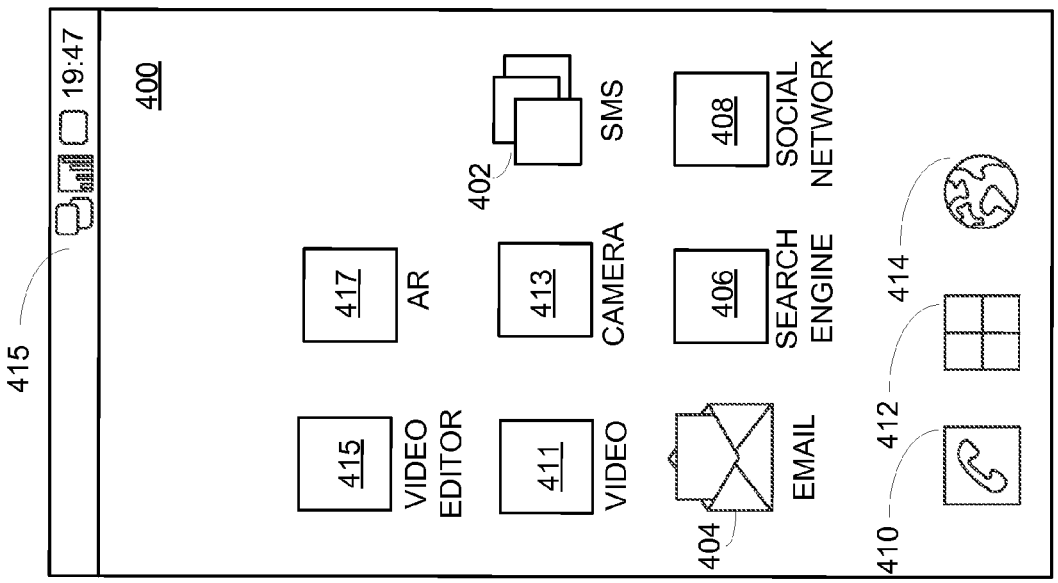

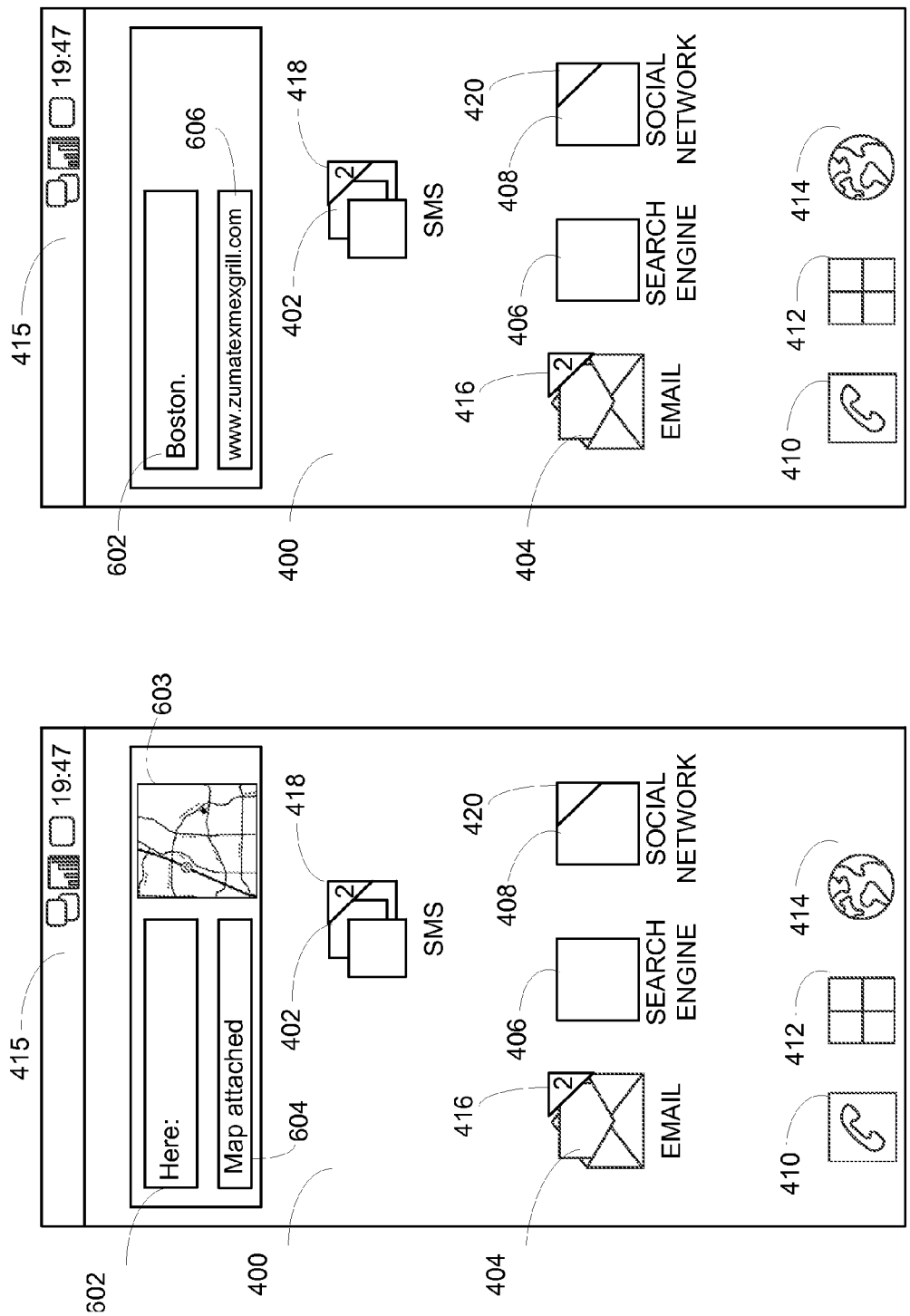

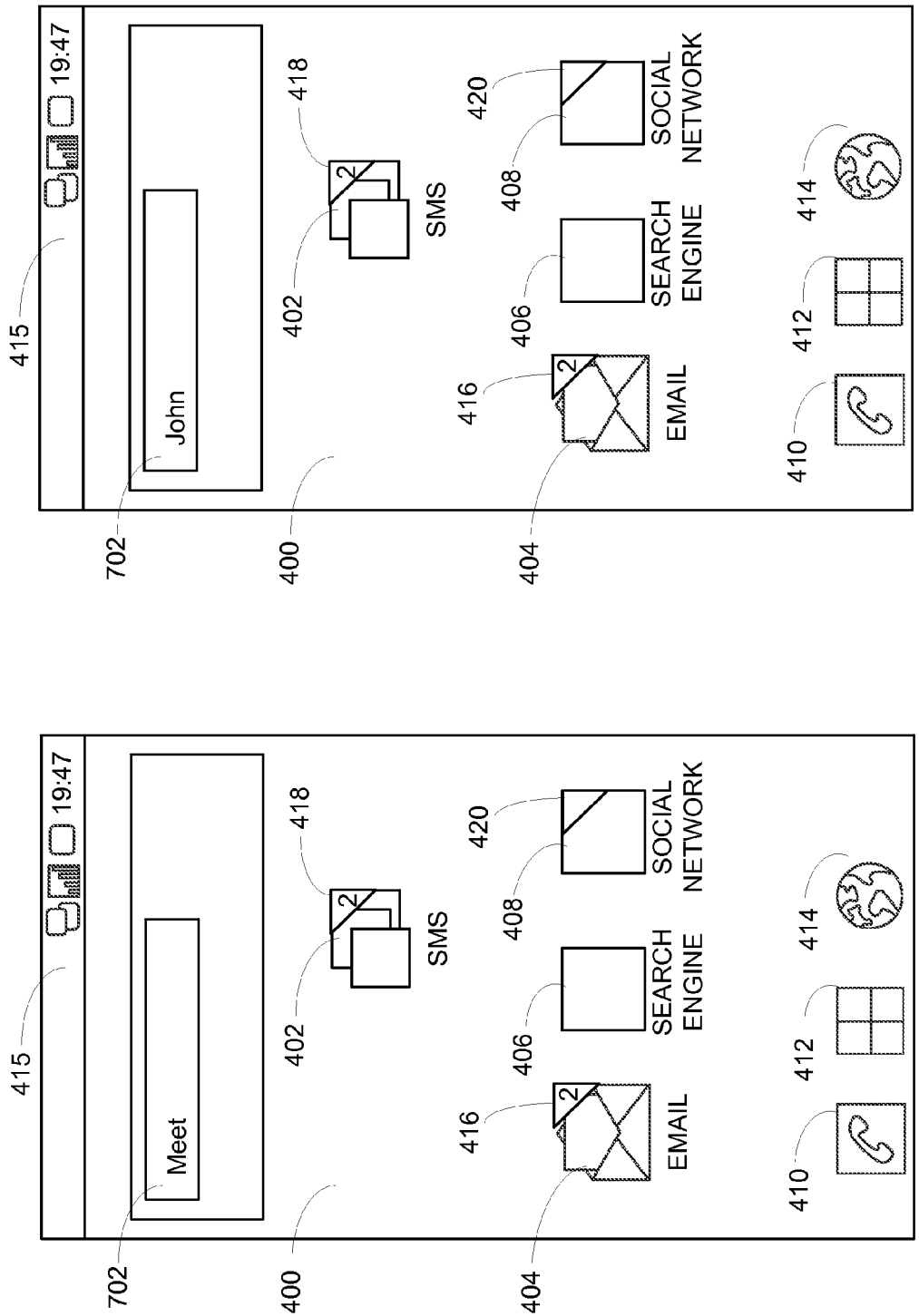

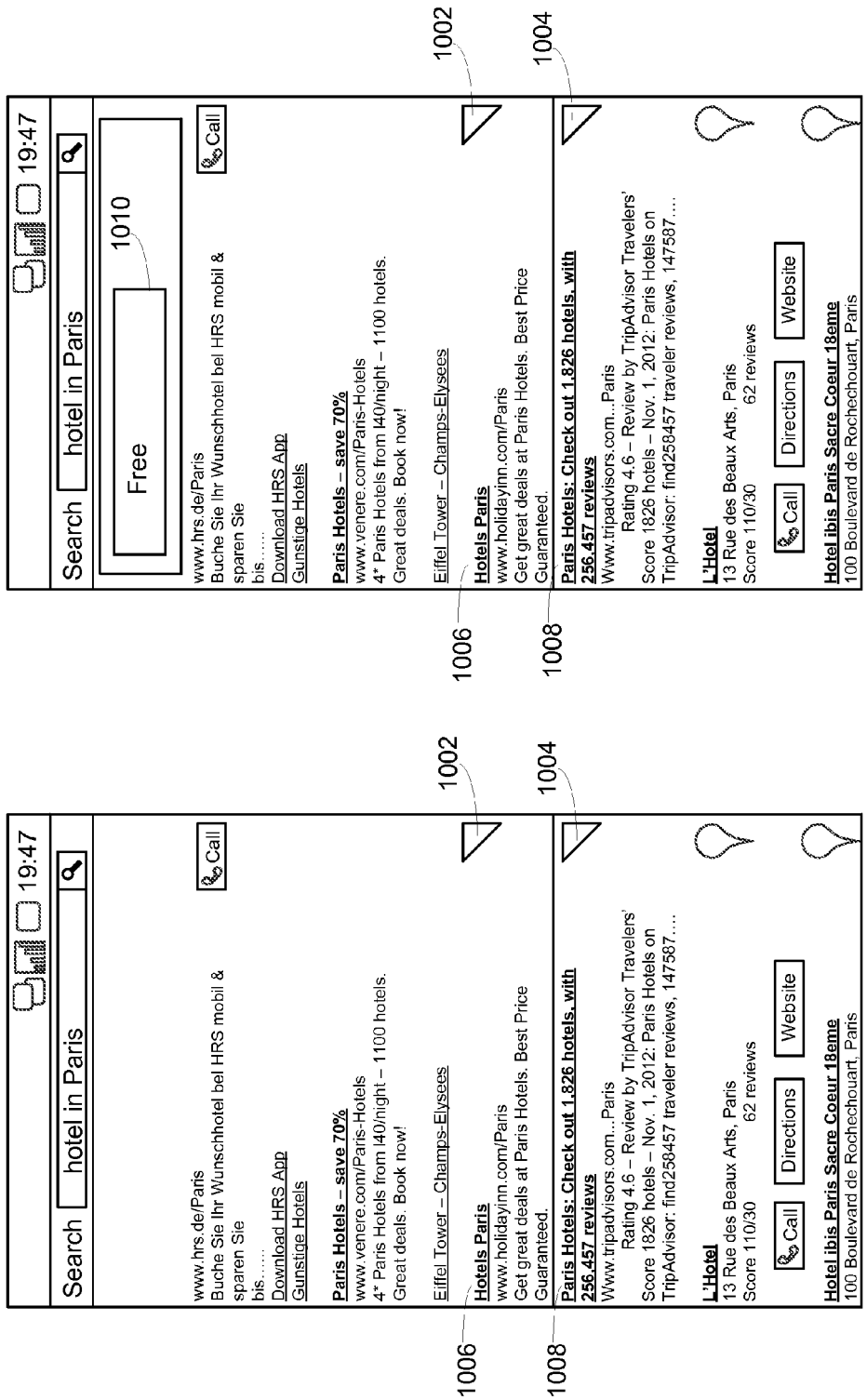

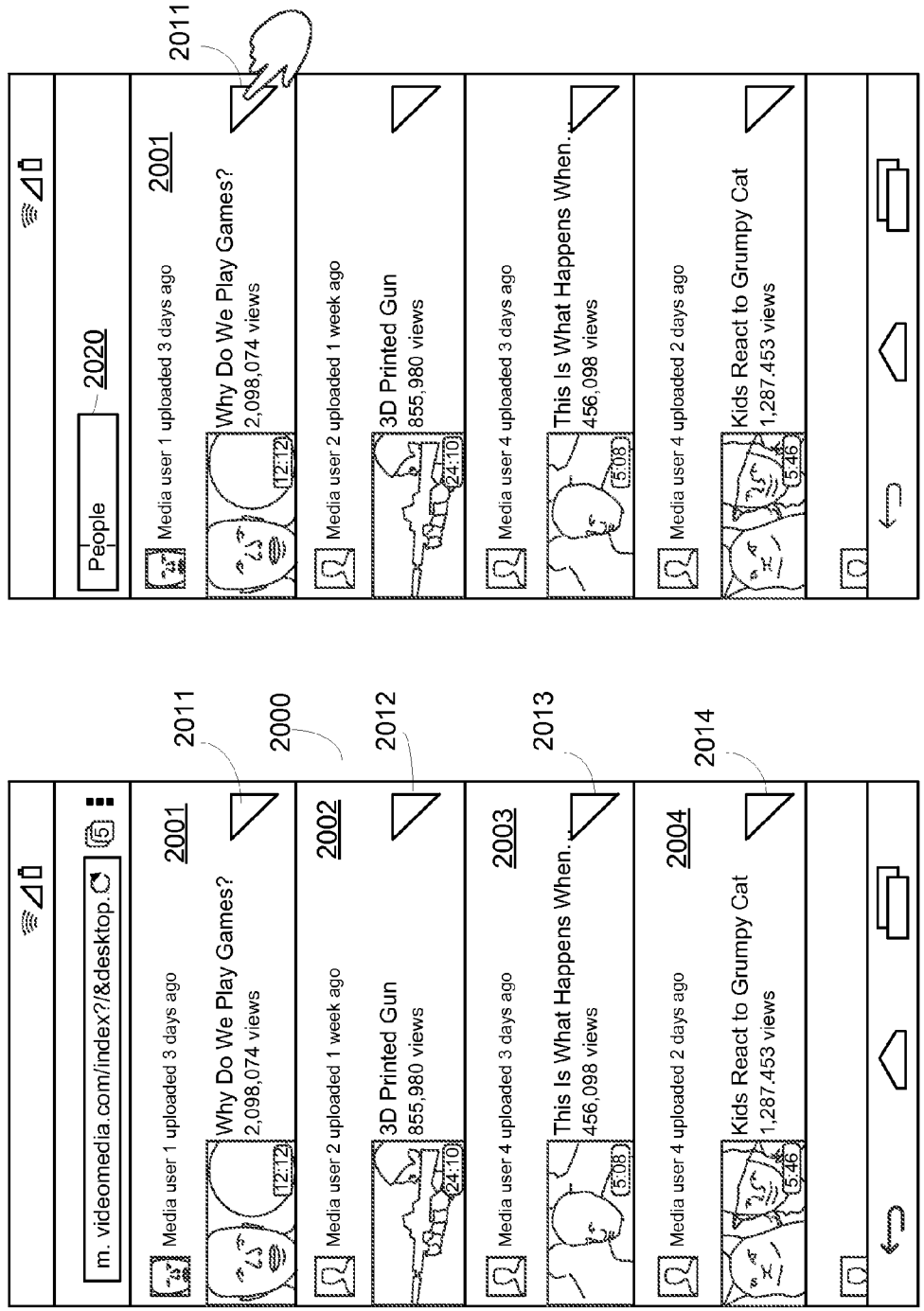

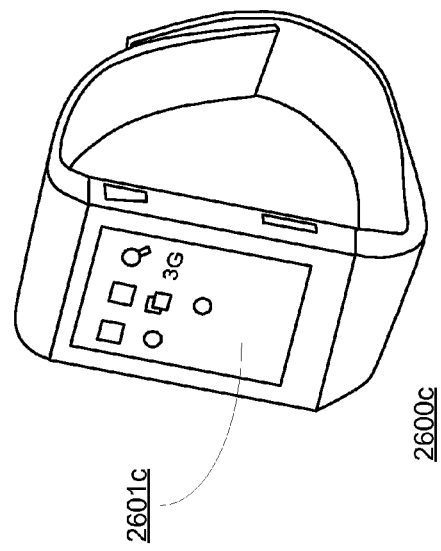
FIG. 26c
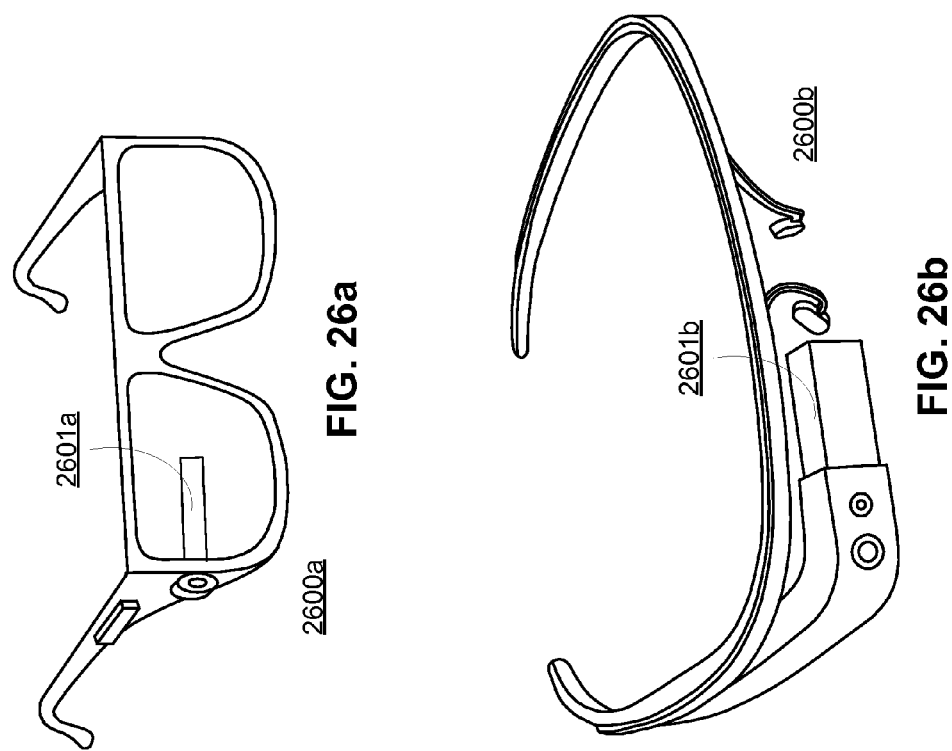
FIG. 26a
FIG. 26b

METHODS AND SYSTEMS FOR DISPLAYING TEXT USING RSVP

CROSS REFERENCE TO RELATED APPLICATIONS

This application is a continuation-in-part of U.S. application Ser. No. 13/730,163 filed on Dec. 28, 2012. This application is also related to U.S. application Ser. No. 13/547,982 filed on Jul. 12, 2012. The entire disclosures of both of these applications are hereby incorporated by reference.

BACKGROUND

The present invention relates to apparatuses and methods for enabling improved display of textual content on an electronic display.

Communications devices, including PCs, smartphones, tablets, e-readers, etc. continue to grow in popularity, and have become an integral part of both personal and business communications. As a result, users continue to spend more time using their communications devices during the course of a day reading e-mails, reading web sites, sending short message service (SMS) messages, etc.

Rapid serial visual presentation (RSVP) is a method of displaying textual content in which each word of the textual content is displayed in sequential order, one at a time, at a certain display rate, at a fixed location on a display. RSVP was first introduced in the 1970s as a technique for presenting text one word at a time in a display. Many references since then have provided information on the use of RSVP in a variety of applications. Commercially available products based on RSVP include "Zap Reader" (www.zapreader.com/reader) and "Spreeder" (www.spreeder.com). Some prior methods exist for improving the effectiveness of an RSVP by varying the display time of a word in the display based on word length and word type (see, U.S. Pat. No. 6,130,968 to McIan et al. ("McIan")) and based on word frequency (see WO/37256 by Goldstein et al. ("Goldstein 2002")). While these techniques are beneficial in improving comprehension of the displayed text, new techniques and methods are needed to further increase a user's reading speed, and improve the presentation of dense content on electronic displays.

Isolated efforts have also been made to apply RSVP to particular applications (e.g., email applications) in mobile communications devices (see, US 2011/0115819 to Hanson). However, the challenges and opportunities for integrating RSVP into user interfaces for increasing the density of displayable content remain largely unexplored.

SUMMARY

Despite heavy technological (digital) advances, the illustration of textual information on electronic displays has not fundamentally changed. Textual information is typically displayed in lines such that the reader's eye moves sequentially from word to word. However, interacting with text displayed in the traditional manner on a communications device, and particularly a mobile communications device, presents certain inconveniences to a user. For example, the display area of a mobile communications device may be limited, which may increase the time spent reading an e-mail or a web site, as the user may have to scroll through multiple pages to read the entire e-mail or web site.

Previous implementations of Rapid Serial Visual Presentation (RSVP) do not address using RSVP to improve user access to information from a homescreen (e.g., a "homescreen" of a smartphone running a mobile operating system such as iOS™, Android™, or Windows Phone™ or a "desktop" screen of a PC, laptop, etc., running an operating system such as Windows™, or Mac™ OS; or a homescreen/desktop screen of an intermediate portable device such as notepad, touchpad, etc running a corresponding operating system; all referenced herein as simply a "homescreen" for simplicity) user interface or how to best integrate RSVP into a variety of applications. Given the increasing reliance on small-screen devices (particularly mobile communication devices, but also notebook computers and other highly portable computing devices) for a variety of purposes, there is a growing need to efficiently utilize screen space within user interfaces. Moreover, even with respect to larger screen devices, there are unexplored opportunities to create more efficient interfaces by incorporating RSVP techniques. Embodiments of the invention relate to electronic interfaces that effectively utilize RSVP to improve user access to information.

In one embodiment, a communications device displays a first icon representing a notification event associated with an application by displaying the first icon with an icon representing the application. The first icon further represents a presence of content that is displayable using RSVP. The communications device receives a first user interface action to select the notification event, and in response to the first user interface action, displays textual content associated with the notification event in a designated display area using RSVP. The RSVP content may contain embedded text, a uniform resource locator (URL), or an attachment. If the user selects embedded text, the RSVP content corresponding to the embedded text may be displayed in the designated display area using RSVP. In one embodiment, if the user selects a URL, the contents of the webpage corresponding to the URL may be displayed in the designated display area using RSVP. Alternatively, the webpage may be displayed by a browser application. If the user selects an attachment, an application associated with the attachment may be launched to open the attachment. For example, if the attachment is a photo, a photo viewer application may be launched to open the photo.

In another embodiment, the communications device displays a first icon within an application interface. The first icon represents presence of textual content that is displayable using RSVP. The communications device receives a first user interface action to select the first icon, and in response to the first user interface action, displays the textual content in a designated display area using RSVP. In an alternative to this embodiment, an application interface is configurable so that any selectable item within the application interface that is associated with textual content may have that content displayed using RSVP when the item is selected.

In yet another embodiment, a search query is received by at least one server computer. At least one search result corresponding to the search query is transmitted to a browser application for display in the browser application on a user device. The search result is configured to be displayed by the browser application with an icon representing presence of content, corresponding to the at least one search result, that is displayable using RSVP.

In yet another embodiment, RSVP content may be embedded in a map, photo, diagram, video, presentation, etc. A map, photo, diagram, video, or presentation may be displayed by the appropriate application. A user may specify whether to add "global" RSVP content and/or "local" RSVP content. If the user chooses to add "global" (e.g., in reference to a document in its entirety) RSVP content, an interface which allows the user to add the "global" RSVP content may be displayed. If the user chooses to add "local" RSVP content, an interface which allows the user to specify location(s), element(s), and/or text selection, and add the corresponding "local" RSVP content to be displayed. For example, the user may specify locations on photos, maps, etc., or specify elements or objects in photos, diagrams, videos and presentations, etc. In one embodiment, the interface may also allow selection of text such that RSVP content may be associated with the selected text. In the case of a photo, in addition to specifying locations on the photo, the user may select areas of the photo, such as, for example a face of a person.

There is also a need to minimize the need to download or stream large amounts of content to a wireless device, especially prior to a user making a consumption decision regarding the content. Multimedia content including video and/or audio is an example of a type of content that creates such issues. This is particularly a problem when accessing such files on wireless devices, which often have more limited bandwidth and/or lower imposed data limits on services than do devices with a hardline connection. Therefore, another embodiment of the present invention provides an interface for receiving information about video and other multi-media content via RSVP display without having to download and/or stream the content. In a particular embodiment, a video item in a list of video items is selectable to initiate display of information via RSVP regarding that video item. In a particular embodiment, at least a portion of the list of video items remained displayed while information is displayed via RSPV regarding the selected item.

There is also often a need to provide textual content that is associated with video, particularly given the increasingly interactive nature online video sharing. However, existing methods of providing textual content associated with video include a first method in which text is provided entirely outside of the video display window (e.g., in comments areas below the video window) and a second method in which text is provided within the video interface using traditional line by line text presentation (e.g., subtitles). Both of these methods have disadvantages. In the first method, because the text is provide outside the video window, the user must look away from the video content to view the text. Also, this method generally is not convenient for associating text with a particular time portion of the video content. In the second method, because the text is presented for traditional left-to-right (or right-to-left) reading, it necessarily obscures a significant portion of the video window. Also, because the traditional method of text presentation does not allow for the fastest reading speeds with a high level of comprehension, consuming text by traditional methods during a video is more disruptive of video content than would be necessary using the improved methods of certain embodiments of the present invention.

Therefore, in another embodiment, RSVP content is embedded in video content for display at selected points during the video. A particular embodiment provides one or more icons (i.e., any form of visual indicator) along a video timeline bar that can be selected to view text via RSVP that is associated with that portion of the video. Another particular embodiment displays one or more icons within the video content that are selectable to view RSVP content associated with that portion of the video content. In another particular embodiment, one or more icons are placed on and track one or more recognized objects within the video content, the one or more icons being selectable to view RSVP content associated with the corresponding video object. In one version of this embodiment, the icon remains displayed on a moving video object while the object remains displayed in the video. Some embodiments are configured such that RSVP content embedded in or otherwise associated with a video file displays automatically at particular times during video playback without the need for user selection, or such that automatic RSVP content display is a default or non-default selectable setting that may be altered via a user settings interface. In another embodiment, a preview version of a video is provided that displays short clips of different portions of the video after (or, alternatively, either before or while) displaying RSVP content associated with those clips to provide efficient, low-data video previews while enhancing the information provided to the user. A related embodiment is provided for adding RSVP content to videos and for creating video previews that include RSVP content.

In one embodiment of the invention, RSVP content is provided within an interface of an augmented reality application. A particular embodiment displays one or more icons on or near one or more real world objects viewed through the augmented reality application, the one or more icons being selectable to view RSVP content associated the corresponding real world object.

Some embodiments of the invention are implemented in or with particular types of user devices such as, for example, desktop computers and portable electronic devices such as mobile phones, smartphones, multi-media players, e-readers, tablet/touchpad, notebook or laptop PCs, smart watches, smart televisions, and other communication devices. Some embodiments of the invention include implementation in particular types of electronic devices including, for example, smart glasses and other types of head mounted displays.

These and other embodiments are more fully described below.

BRIEF DESCRIPTION OF THE DRAWINGS

FIGS. 4a-4b illustrate screenshot diagrams of an exemplary homescreen in accordance with one embodiment of the present invention.

FIGS. 6a and 6b illustrate screenshot diagrams of an exemplary homescreen including a designated RSVP display area, along with a notification indicating the presence of an attachment or URL in accordance with one embodiment of the present invention.

FIGS. 7a-7c illustrate screenshot diagrams of an exemplary homescreen including a designated RSVP display area in accordance with one embodiment of the present invention.

FIGS. 10a-10c illustrate screenshot diagrams of an exemplary search results page in accordance with one embodiment of the present invention.

FIGS. 20a-20d show screenshot diagrams of an exemplary video item listing page for displaying RSVP content related to video items in accordance with one embodiment of the present invention.

FIGS. 26a-26c show examples of various types of alternative known display devices in which embodiments of the invention might be implemented.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, the present disclosure is not intended to be limited to the embodiments shown, but is to be accorded the widest scope consistent with the principles and features disclosed herein.

Figure 1:
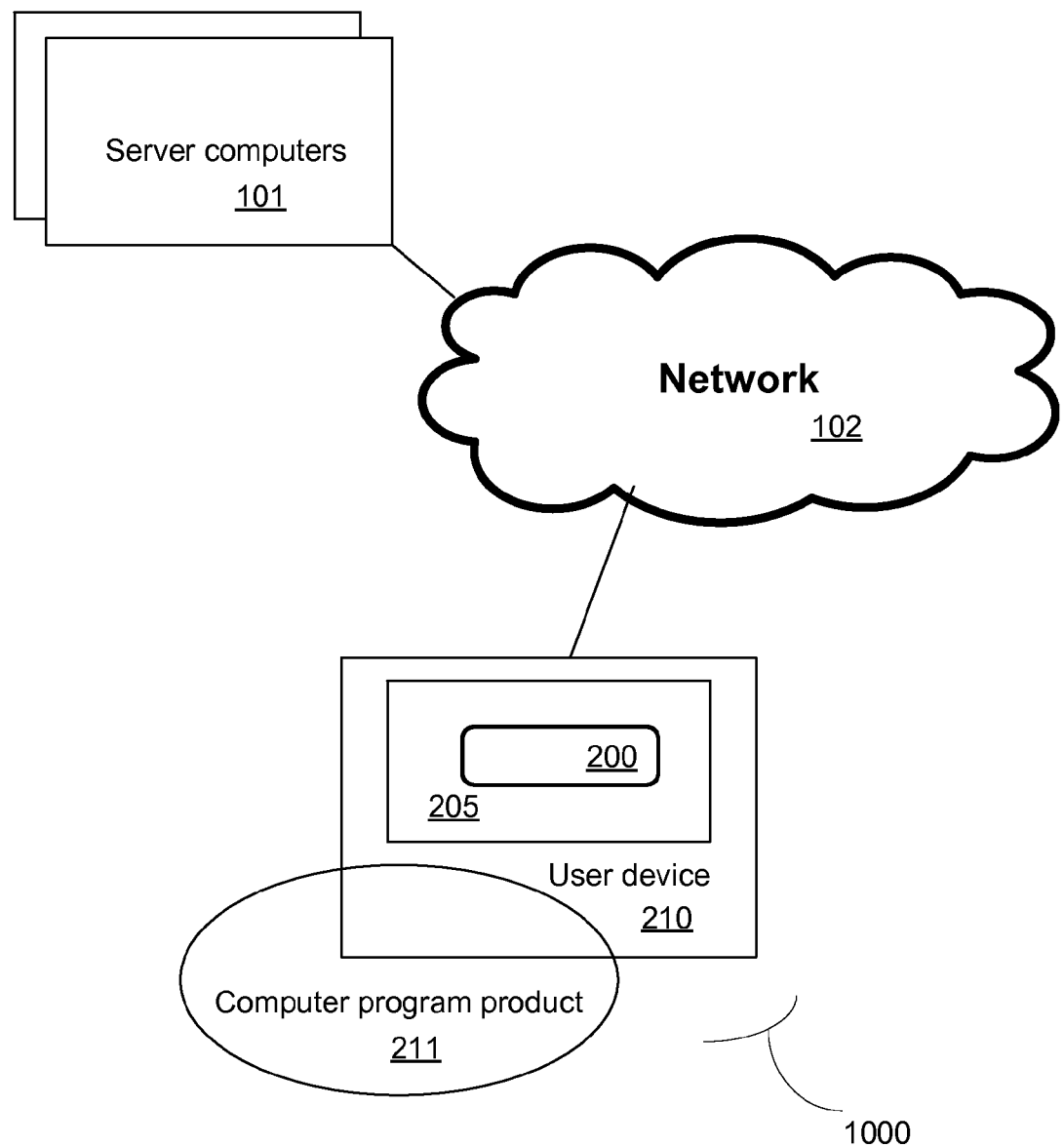
FIG. 1 is a diagram of a computer system in the context of a computer network in accordance with one embodiment of the present invention.

Referring now to FIG. 1, there is shown a diagram of an illustrative computer system 1000 in accordance with an exemplary embodiment. In this embodiment, the text display system is implemented on an end user device 210, which is configured by computer program product 211 in accordance with an exemplary embodiment. Computer program product 211 may be provided in a transitory or non-transitory computer readable medium; however, in a particular embodiment, it is provided in a non-transitory computer readable medium (e.g., persistent (i.e., non-volatile) storage, volatile memory (e.g., random access memory), or various other well-known non-transitory computer readable mediums).

End user device 210 includes a display 205. In some embodiments, display 205 may be configured to accept touch input. Computer program product 211 configures device 210 to serially present text in a designated rapid serial visual presentation ("RSVP") display area 200 on display 205 (for convenience, referenced herein simply as "DRDA 200"). User device 210 may include any type of electronic device capable of controlling text display. Some examples include desktop computers and portable electronic devices such as mobile phones, smartphones, multi-media players, e-readers, tablet/touchpad, notebook, or laptop PCs, smart televisions, smart watches, head mounted displays, and other communication devices. In some implementations (e.g., a smart phone or e-reader), the display 205 may be packaged together with the rest of device 210. However, in other implementations, a separate display device (e.g., a monitor) maybe be attached to device 210. While the illustrated embodiment shows a graphical border around DRDA 200, DRDA 200 simply refers to a region (e.g., a window) on display 205 where text is serially presented in accordance with an embodiment of the present invention and in particular implementations, DRDA 200 may or may not be outlined by a graphical border.

In one embodiment, user device 210 has typical computer components including a processor, memory, storage, and an input/output subsystem. In some implementations (e.g., a smart phone or e-reader), user device 210 may include a wireless transceiver and one or more input interfaces including a touch enabled display, a trackball, keyboard, microphone, smart television controller, etc. In the illustrated embodiment, computer program product 211 is loaded into memory (not separately shown) to configure device 210 in accordance with the present invention. In one embodiment, text data may be loaded into memory for text processing and display processing by device 210 as will be further described herein. Text data loaded into memory for text processing and display processing may be retrieved from persistent storage on a user device such as device 210 and/or may be received from one or more server computers 101 through a connection to network 102 (e.g., the Internet). One or more server computers 101 may be for example, one or more advertiser computers, one or more search engine computers, one or more web servers, one or more application servers, etc. In an alternative embodiment, at least some processing/pre-processing of text data for display in accordance with the principles illustrated herein may be carried out by one or more remote computers such as server computers 101 and then sent to end user device 210 for display in DRDA 200 on display 205. In such an alternative, some or all of a computer program product such as computer program product 211 for implementing an embodiment of the present invention may reside on one or more computers such as server computers 101 that are remote from end user device 210. In some embodiments, the entire computer program product may be stored and executed on remote computers and the results presented within a browser application component (e.g. a media player application) of user device 210 (browser application and media player application not separately shown).

In an embodiment of the invention, text (which includes, for example, strings of characters—e.g., letters, numbers, symbols, etc.—which constitute words, numeric figures, and combinations of both with punctuation marks and symbols—note that words may include words represented by any human language including, without limitation, words represented by roman characters, script elements, or pictographic characters—) is presented serially (for example, one word at a time) within DRDA 200. As referenced herein, a "display element" will refer to a group of text data that is displayed at one time within DRDA 200. In other words, display elements are displayed serially. In the primary embodiment discussed herein, a display element will generally consist of one word. However, in alternative embodiments, two words may be presented as a single display element. Also, in the primary embodiment, two words are sometimes part of a single display element such as, for example, when a number e.g., "9," is displayed together with a unit, e.g. "feet," so that, for example, the text "9 feet" may constitute a single display element and be presented together.

In a conventional RSVP system, each word is centered in the display area, and the optimal fixation position shifts as words of differing lengths are sequentially displayed, resulting in saccade movements as the eyes shift to the optimal fixation position. The reader has to refocus on the display every time a new word appears that is of a different length than the previous word. The reader's eyes will move from one character to the next to find the optimal position, which is also referred to as a recovery saccade. In addition, when a longer word follows a shorter one, the saccadic movement direction will be from right to left. When reading text in lines in a traditional paragraph display, most saccadic movement is from left to right so the reader is accustomed to this type of eye movement. Only occasionally, if the optimal fixation position is not found directly, the reader may have to move back from right to left. Thus conventional RSVP forces the reader to experience saccades which are not normal. Conventional RSVP approaches offer no solution to these problems. In order to prevent or minimize recovery saccades in an RSVP, it is preferable to display each word such that the optimal fixation position does not shift in the display. The focal point of the reader can then remain fixed on the optimal fixation position, which is a specific point in each word that is determined by the total number of characters or width of the word. This optimal recognition position, hereinafter referred to as the "ORP," can be identified in the display such that the reader's eyes are directed to focus there as the words are serially presented. An RSVP which incorporates an ORP is hereinafter referred to as "ORP-RSVP." With an ORP-RSVP, text can then be presented at a faster rate because no saccades occur during the presentation. In addition, the elimination of saccades reduces eye fatigue and makes it more comfortable, resulting in a better reading experience for the user. Embodiments described herein may be implemented using conventional RSVP or ORP-RSVP.

In addition, words are rarely greater than 13 characters (according to Sigurd, only 0.4% of the words in the English language are longer than 13 characters—see Sigurd, B. et al, "Word Length, Sentence Length and Frequency—ZIPF Revisited", Studia Linguistica 58(1), pp. 37-52, Blackwell Publishing Ltd, Oxford UK, 2004) and therefore, for the vast majority of words, it is preferable to limit the number of characters to the right side of the fixation point to 8 characters. Also, in some embodiments, a word having a length of greater than thirteen characters is divided into first and second display elements such that a first portion of the word is displayed first (along with a hyphen) and then the second portion of the word is displayed next. In some embodiments, an empirically determined ORP of each display element is presented at a fixed location of the DRDA 200. For example, each word of a plurality of words is serially presented and positioned in the display such that the ORP is displayed at a fixed display location within DRDA 200 and this enables recognition of each word in succession with minimal saccade by the reader. Determining and displaying the ORP for display elements, and presenting display elements within DRDA 200 is described in more detail in co-pending U.S. application Ser. No. 13/547,982, now U.S. Pat. No. 8,903,174, which is hereby incorporated by reference in its entirety. In general, one method of displaying display elements using the ORP method involves displaying a word such that the fixed display location is offset so that it is closer to the beginning of the word than to the end of the word, particularly if the word is greater that a certain number of characters. Research has demonstrated that it is possible to get information about a word from up to 4 characters from the left side of the fixation position and up to 15 characters to the right side, resulting in a perceptual span of 20 characters, and that the maximum character length of a word without saccade movement is 20 characters. The DRDA 200 can accommodate text of up to 20 characters in lenght without saccades, although it is preferred to limit the display to 13 characters for improved comprehension. For example, using one embodiment of an ORP character method, a word four or five characters long would be displayed with the second character at the fixed display location. A word six, seven, eight or nine characters in length would be displayed with the third character at the fixed display location. A word that is ten, eleven, twelve, or thirteen characters long would be displayed with the fourth character at the fixed display location. Words longer than 13 characters may be hyphenated as described above, or, for words 14-20 characters in length, for example, displayed with their fifth character at the fixed display location.

Instead of using whole characters, proportionate positions may be used in conjunction with a physical width of a word as displayed (e.g., in pixels) to determine, at a pixel level (rather than simply using the middle of an OPR character), an ORP of a word to place at the fixed display location. In one embodiment, this approach can help account for the effect of proportionally spaced fonts). In one such a method, also disclosed in the above reference co-pending patent application, an optimal recognition position is calculated as a proportion of a word's length in pixels and a pixel offset can be used to place such a calculated optimal recognition proportionate positing of the word at the fixed display location.

Therefore, some embodiments of the present invention incorporate a method for serially displaying text on an electronic display comprising identifying an ORP for a plurality of words to be displayed and serially displaying the plurality of words such that the ORP of each word is displayed at a fixed display location on the electronic display. In one embodiment, the ORP is identified as a character in the word. In another embodiment, the ORP is identified as a proportionate position relative to the width of the word in pixels. In some embodiments, visual aids are used to mark the fixed display location (see e.g., hash marks 504 in FIGS. 5a-5d) and/or an ORP within the word (e.g., different colored font).

In one embodiment, configuring text content for RSVP display comprises parsing text into a plurality of display elements, inserting blank elements at the end of a sentence, and determining a multiplier for each display element that can be used, along with user selected settings and/or other display parameters, to determine a display time for each display element. While, in alternative embodiments, it is possible to display each element for the same amount of time, it has been demonstrated empirically that a longer display time is beneficial for comprehension of longer words. It has also been demonstrated empirically that a longer pause between sentences is beneficial for comprehension of longer sentences. Further details of certain exemplary systems and methods for preparing and displaying text using RSVP are described in co-pending U.S. application Ser. No. 13/547,982 referenced above.

Figure 2A:
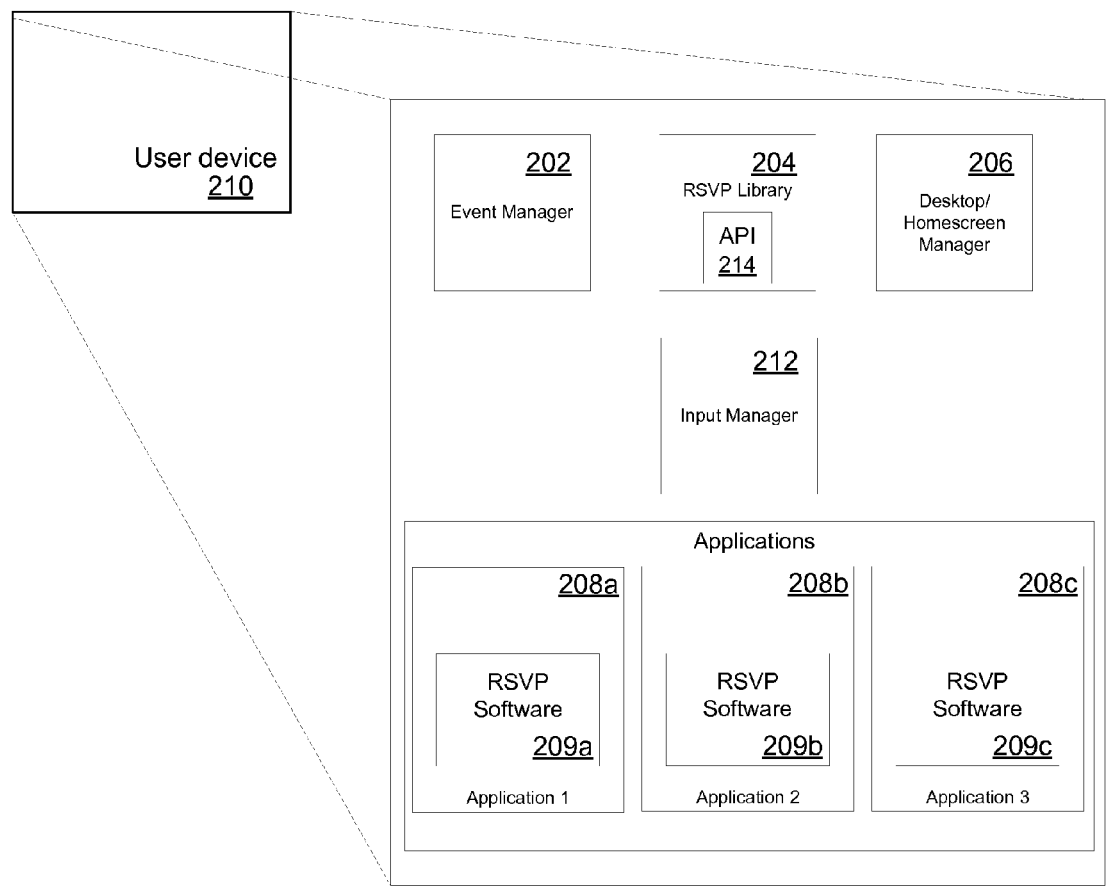
FIG. 2a is a block diagram of exemplary software modules included in the computer program product loaded on the user device of FIG. 1 in accordance with one embodiment of the present invention.

FIG. 2a is a block diagram of exemplary software modules included in the computer program product loaded on user device 210 of FIG. 1 in accordance with one embodiment of the present invention. A number of modules are shown schematically inside device 210 to indicate modules in the device associated with text display functionality in accordance with an exemplary embodiment. One or more of the modules may be implemented as part of a programmable microprocessor on the device 210, though the particular modules are shown separately in this example for clarity of explanation. Other arrangements of modules are also contemplated.

User device 210 includes a desktop/homescreen manager 206 to control various elements to be displayed on a homescreen (e.g., a "homescreen" of a smartphone running a mobile operating system such as iOS™, Android™, or Windows Phone™ or a "desktop" display of a PC, laptop, etc., running an operating system such as Windows™, or Mac™ OS; or a homescreen/desktop screen of an intermediate portable device such as notepad, touchpad, etc running a corresponding operating system; all referenced herein as simply a "homescreen" for simplicity). For example, desktop/homescreen manager 206 may control the icons, widgets, tiles, windows, folders, etc. and other information that may be displayed on a traditional computer desktop or on a homescreen (e.g., of a smart phone, tablet, smart television, smart watch, head mounted display, etc.). An input manager 212 manages inputs received from one or more input mechanisms such as a touch-screen, trackball, keyboard, mouse, microphone, eye-tracking, a gesture detector, or other natural interface input detector, smart television controllers, etc. For example, text input may be provided using a virtual (i.e., touch screen) or physical keyboard, mouse, trackball, etc. Alternatively, or in addition, a user may provide voice/speech input via a microphone, which may then be converted to text. Various applications 208 (including, for example, applications 208a, 208b, and 208c) may run on the device and may provide data to be displayed through desktop/homescreen manager 206.

Various messages (e.g., email, SMS) may be received over a network such as a wireless communications network connected to the Internet, via a wireless interface (not shown). Information received from the network, such as from one or more remote servers, may be provided to the applications 208 by event manager 202 and information may be passed from the applications 208 back to the network. Event manager 202 may manage notification events that are presented to a user, e.g., through display 205. For example, event manager 202 may receive notification events from the wireless network. Notification events may include, for example receipt of text messages, emails, voicemails, social network updates, file transfers, etc. The event manager 202 may in turn forward the notification events to corresponding applications. For example, an email notification may be forwarded to the email application. The application may then instruct the desktop or homescreen manager 206 to display status or notification information to alert the user.

As will be described in further detail below, RSVP library 204 allows user device 210 to present display elements using RSVP. In accordance with an exemplary embodiment, applications 208a, 208b, and 208c, which may be a word processing application, a spreadsheet application, a photo application, a video application, an augmented reality application, a map application, a webpage editor, a browser application, etc., may communicate with RSVP library 204 through a RSVP application programming interface (API), such as API 214. As will be apparent to one of skill in the art, an API is an interface used by software components to communicate with each other. In one embodiment, each application 208a, 208b, and 208c may include application specific RSVP software, such as RSVP software 209a, 209b, and 209c, respectively, which may allow applications 208a, 208b, and 208c to detect presence of RSVP content. Upon detecting RSVP content, RSVP software, such as RSVP software 209a, 209b, and/or 209c may call RSVP library 204 via the API. In response, RSVP library 204 may display RSVP notification markers/icons, display DRDA 200, display RSVP content in DRDA 200, etc. In an alternate embodiment, the application specific RSVP software, such as RSVP software 209a, 209b, and/or 209c may instead be included in RSVP library 204. In one embodiment, application specific RSVP software, such as RSVP software 209a, 209b, and 209c may additionally include logic to allow embedding of textual content within a file. Embedding textual content in a file is described in more detail in the description of FIGS. 17, 18a and 18b.

Figure 2B:
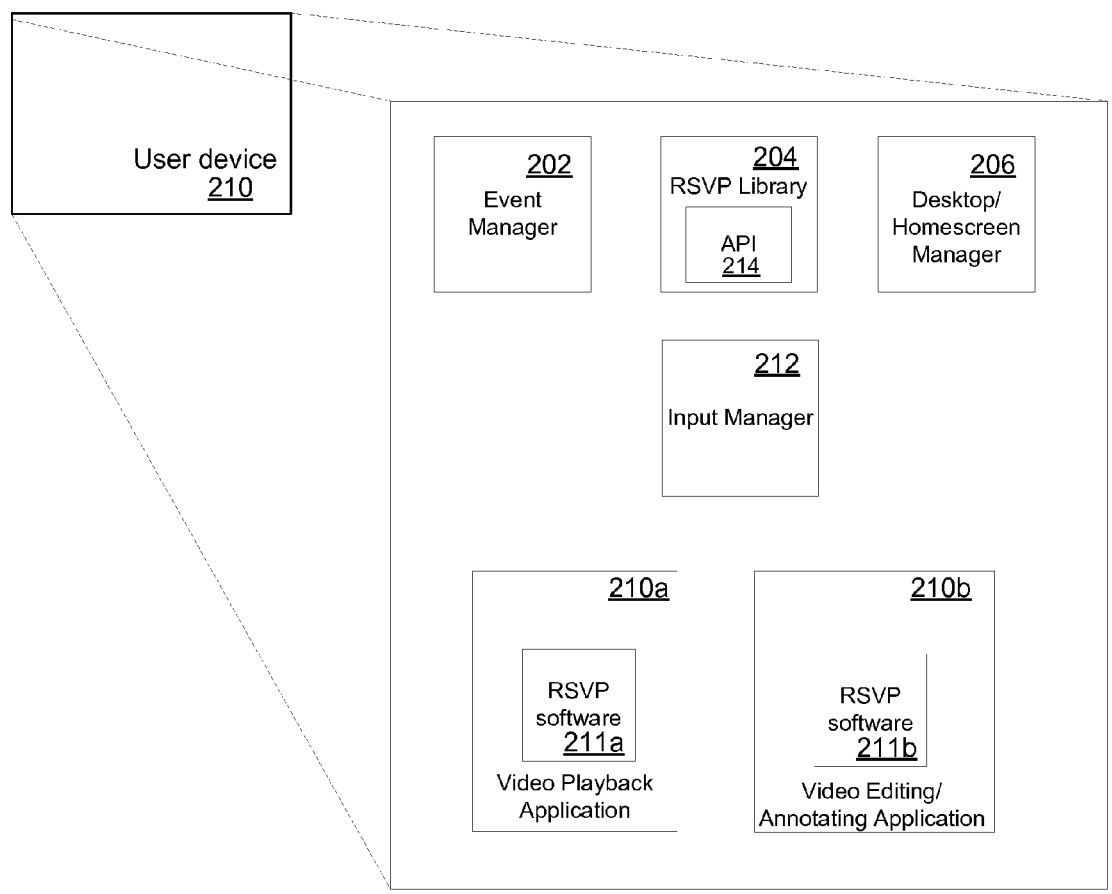
FIG. 2b shows a specific implementation of the embodiment of FIG. 2a in which the specific RSVP-enabled applications are video-related applications.

FIG. 2b shows a specific implementation of the embodiment of FIG. 2a in which the specific RSVP-enabled applications are video-related applications. Specifically, the implementation shown in FIG. 2b includes video playback application 210a and video editing/annotating application 210b. In one embodiment, each application 210a and 210b may include application specific RSVP software, such as RSVP software 211a and 211b, respectively, which may allow applications 210a and 210b to detect presence of RSVP content. Upon detecting RSVP content, RSVP software, such as RSVP software 211a and/or 211b may call RSVP library 204 via the API 214 and RSVP library 204 may respond as described above in the context of FIG. 2a. In an alternate embodiment, the application specific RSVP software, such as RSVP software 211a and/or 211b may instead be included in RSVP library 204. In one embodiment, application specific RSVP software, such as RSVP software 211a and 211b may additionally include logic to allow embedding of textual content within a video file. Also, it will be understood by those skilled in the art, that particular embodiments of such applications may be used to enhance a video stream (rather than a file) with added textual content for RSVP display. For example, adding RSVP content to may comprise adding that content to a database that relates the added content to video stream content so that the video and RSVP content may be provided together in a stream for display by an RSVP-enabled media player application. Alternatively, in some implementations, the RSVP content may be converted in advance to an existing media player file format (or data stream protocol) and combined with the video content (in a file or stream) so that an existing media player application can display the RSVP content without requiring additional RSVP specific software. In all embodiments described herein, it will be understood that even if the particular embodiment is described in terms of a "file," the principles can also be applied to data streams in alternative embodiments.

Figure 2C:
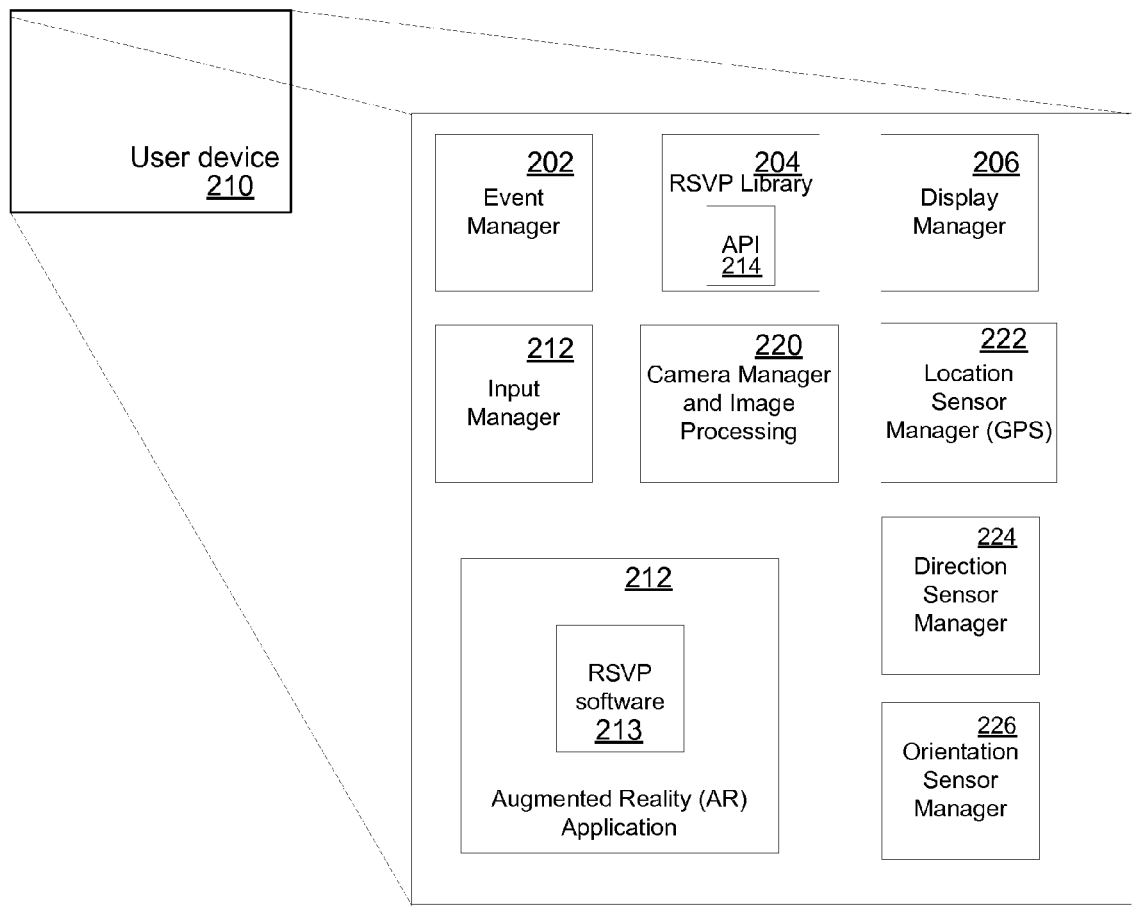
FIG. 2c shows a specific implementation of the embodiment of FIG. 2a including an RSVP-enabled augmented reality (AR) application.

FIG. 2c shows a specific implementation of the embodiment of FIG. 2a including RSVP enabled augmented reality (AR) application 212 with RSPV-specific software 213. Additional components of user device 210 that are relevant to AR applications are also shown including camera manager and image processing application 220, location sensor manager 222 (implemented with GPS), direction sensor manager 224, and orientation sensor manager 226. As similarly described in the context of FIG. 2a, upon detecting RSVP content for AR application 212, RSVP software 213 may call RSVP library 204 via the API 214 and RSVP library 204 may respond as described above in the context of FIG. 2a. In an alternate embodiment, the application specific RSVP software, such as RSVP software 213 may instead be included in RSVP library 204.

Figure 2D:
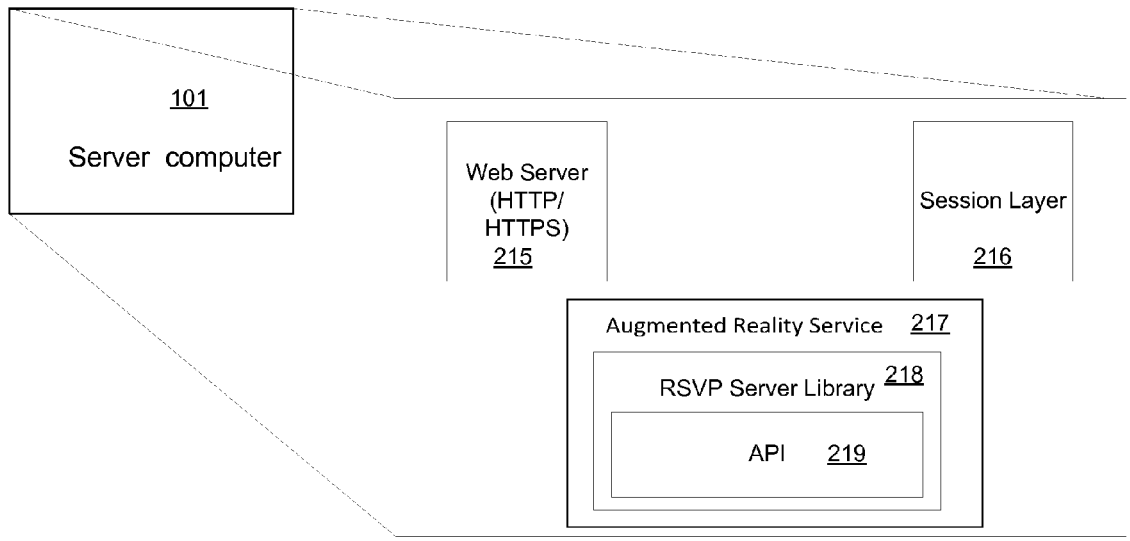
FIG. 2d shows server-side architecture for a server of FIG. 1 configured to implement server-side components of an RVSP-enabled augmented reality (AR) service.

FIG. 2d shows server-side architecture for a server 101 of FIG. 1 configured to implement server-side components of an RVSP-enabled augmented reality (AR) service. Specifically, as shown, server 101 includes web server 215, session layer 216, and augmented reality service application 217. AR application 217 includes RSVP server library 218 and API 219. Those skilled in the art will appreciate that the arrangement shown in FIG. 2d could be adapted to provide server-side components of other RSVP applications such as, for example, a video content and/or search application, a photo application, a social networking application, a search engine, news service, a word processing application, a spreadsheet application, a photo application, a map application, a webpage editor, or various other types of applications that would benefit from RSVP capabilities. Moreover, in various embodiments, different divisions of tasks between server and user (client-side) devices can be implemented. In some embodiments, content is selected and formatted for RSVP presentation at the server and sent to the user device for RSVP display. In other embodiments, content is selected and formatted for RSVP display after it is received at the user device. Therefore, in some alternative embodiments, server-side RSVP software will not be separately necessary for particular applications.

Figure 3:
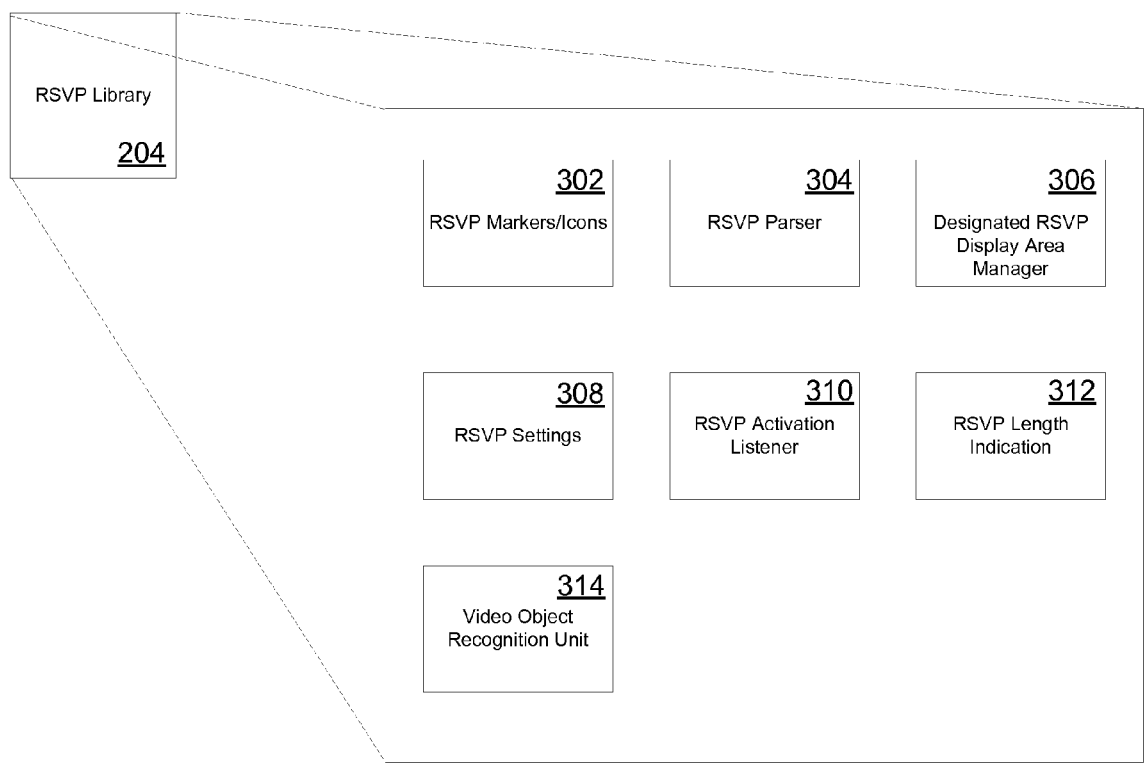
FIG. 3 is a block diagram of exemplary software modules included in the RSVP library of FIG. 2a in accordance with one embodiment of the present invention.

FIG. 3 is a schematic diagram of various software modules that may be included in RSVP library 204 in accordance with an exemplary embodiment. Though the particular modules are shown separately in this example for clarity of explanation, one or more modules may be combined. Other arrangements of modules are also contemplated. RSVP library 204 includes RSVP notification markers or icons 302, RSVP parser 304, designated RSVP display area manager 306, RSVP settings 308, RSVP activation listener 310, RSVP duration indication 312, and video object recognition unit 314. RSVP notification markers or icons 302 are displayed by RSVP library 204 to alert a user of the presence of RSVP content. RSVP parser 304 may parse textual data into individual display elements suitable for display in DRDA 200. Designated RSVP display area manager 306 may display DRDA 200 when appropriate user input is received. RSVP settings 308 include settings related to displaying display elements using RSVP such as, the speed of display, selection of the type of user input to activate RSVP display, etc. RSVP activation listener 310 detects appropriate user input which is intended to select a RSVP notification marker/icon. RSVP duration indication 312 determines the duration of the RSVP content, which may be displayed, for example adjacent to DRDA. In one embodiment, the duration may be displayed as an amount of time (e.g., in seconds). Alternatively, or in addition, the duration may be displayed graphically as, for example a status bar. As will be apparent to one of skill in the art, that the duration may be displayed various other ways. In some embodiments, one or more of the modules shown as part of client side RSVP library 204 may instead or also be provided as part of a server-side RSVP library such as library 218 of FIG. 2d. In some embodiments, RSVP library 204 is stored on a server and then provided to the user device at the time RSVP content is requested.

FIG. 4a is an illustrative homescreen 400 of a mobile communications device which has enabled display of textual information using RSVP in accordance with an exemplary embodiment. Homescreen 400 includes icons 402, 404, 406, 408, 410, 412, and 414 corresponding to various different applications. Homescreen 400 also includes status area 415 which may show notification events or indicators such as battery, signal strength, etc. FIG. 4b is an illustrative homescreen 400 which displays RSVP notification markers/icons 416, 418 and 420. RSVP notification markers/icons 416, 418 and 420 indicate presence of RSVP content, i.e., content that is configured to be displayed using RSVP. As shown, notification markers/icons 416, 418 and 420 are overlaid on top of icons 404, 402 and 408, respectively. In some embodiments, RSVP notification markers/icons may include a numerical indicator as shown in RSVP notification markers/icons 416 and 418. The numerical indicators may indicate the quantity of notifications associated with that application. For example, RSVP notification marker/icon 416 indicates that there are two new email messages. As will be apparent to one of skill in the art, the numerical indicators may be incremented as additional notification events are received and decremented as notification events are viewed. In some embodiments, notification markers/icons may also be color coded. For example, a notification marker/icon may be a certain color when new notification events are present, and a different color when all notification events have been viewed. Alternatively, notification markers/icons may be removed once notification events have been viewed. Although notification markers/icons 416, 418 and 420 are shown overlaid on top of icons 404, 402 and 408, in some embodiments, notification markers/icons may be displayed adjacent to, above, or below icons 404, 402 and 408. In other embodiments, notification markers/icons 416, 418 and 420 may be displayed in other areas of homescreen 400. For example, notification markers/icons may be displayed in status area 415. In other implementations, such as on desktop or laptop PCs, notification markers/icons may be displayed in the taskbar area typically located in the bottom right corner. In some embodiments, application specific notification markers/icons, DRDA, etc. may be implemented. For example, a social networking application may employ customized RSVP notification markers/icons and/or DRDA such that the RSVP notification markers/icons and/or DRDA are consistent with the application UI.

In yet another embodiment, for certain applications, notification markers/icons may not be displayed. For example, for SMS and/or email applications, where notification events typically include textual content, RSVP display may be enabled by default such that content associated with all notification events for these applications may be displayed using RSVP upon user selection of a notification event or upon user interaction with a selectable item (e.g., an email or a text message). As another example, even when an underlying application's content is non-textual, the content items may be known to be associated with textual descriptions. For example, a video application icon on a homescreen may be enabled to display textual descriptions, using RSVP, of new or featured video items by default from a home screen such that the video application's icon is selectable for RSVP display of such descriptions by default without the need for a separate RSVP-specific notification marker.

FIGS. 5a-5d illustrate screenshot diagrams of an exemplary homescreen including a designated RSVP display area, which displays textual content associated with a notification event using RSVP in accordance with one embodiment of the present invention. As shown in FIGS. 5a-5d, upon user selection of a notification marker/icon, textual content associated with the corresponding notification event is displayed using RSVP in DRDA 502. The user may select a notification marker/icon a number of different ways. For example, in a smartphone with a touch enabled display implementation, the user may touch and hold the notification marker/icon. Alternatively, the user may tap the notification marker/icon, swipe across the notification marker/icon, etc. In one embodiment, user selection of notification markers/icons may be determined by eye-tracking, gesture detection, or other natural interface input detection. As will be apparent to one of ordinary skill in the art, various different user input methods may be used to select the notification marker/icon. In other implementations, such as on a desktop or laptop PC, smart television, or on devices without a touch enabled display, user selection of notification markers/icons may be provided using, for example a keyboard, mouse, trackball, eye-tracking, smart television remote controller, etc. It should be noted that user selection of notification markers/icons does not necessarily require clicking or tapping a particular notification marker/icons. User selection may be made simply by "rolling" or "hovering" over a notification marker/icon. In one embodiment, the desired method may be selected in RSVP settings 308 (see FIG. 3).

Figure 5B:
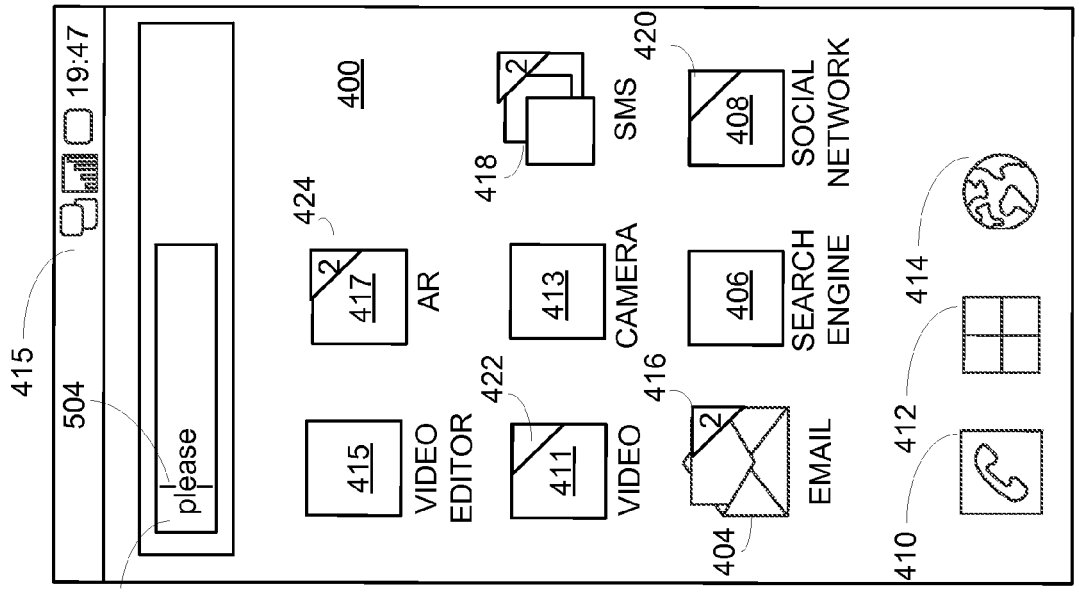
FIGS. 5a-5d illustrate screenshot diagrams of an exemplary homescreen including a designated rapid serial visual presentation ("RSVP") display area, which displays textual content associated with a notification event using RSVP in accordance with one embodiment of the present invention.
Figure 5A:
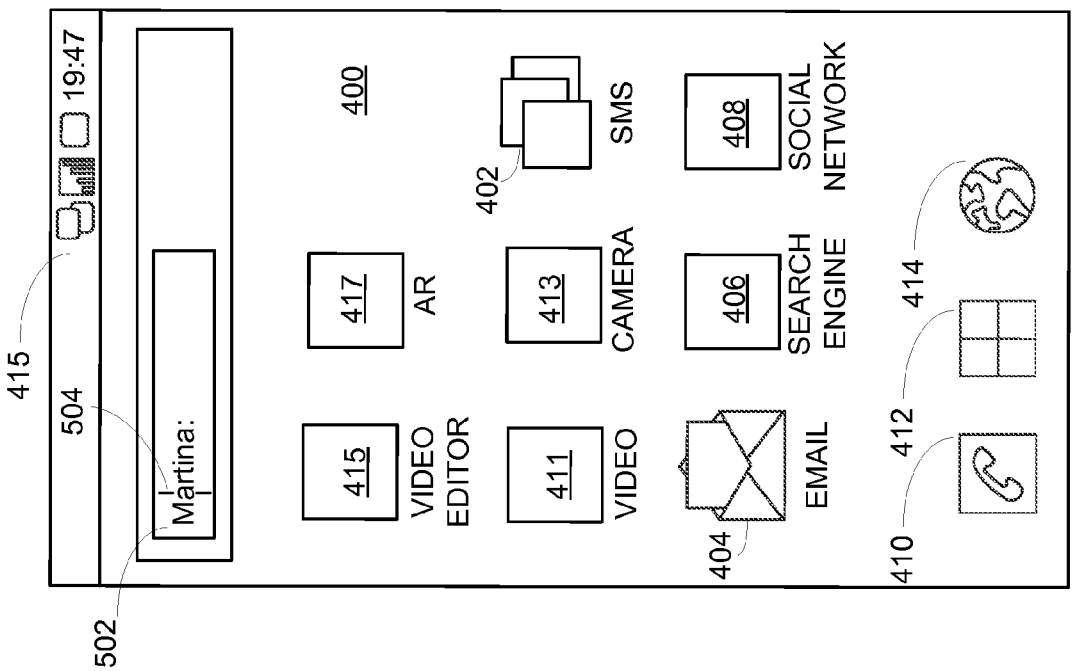
Figure 5D:
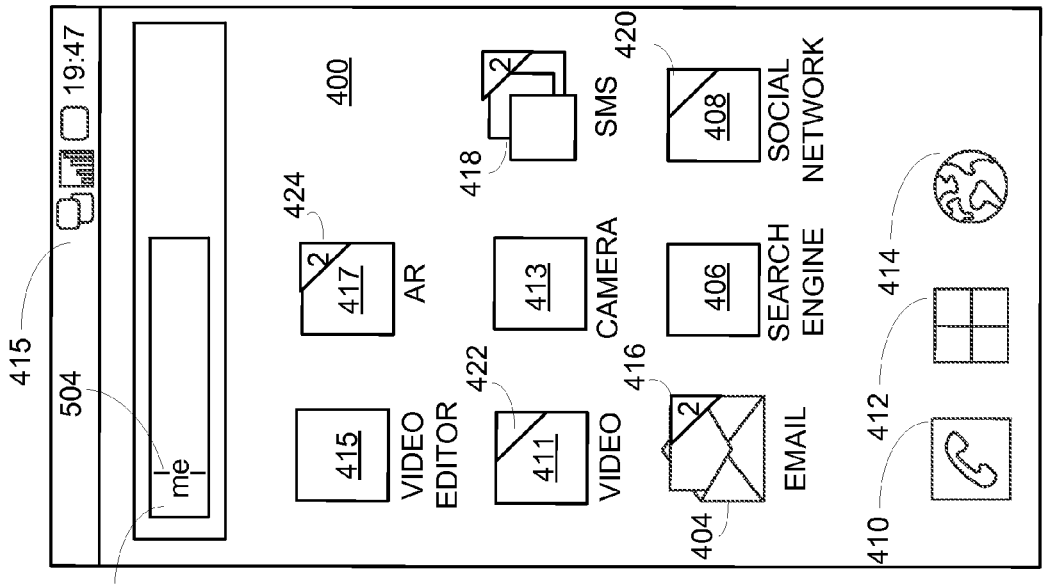
Figure 5C:
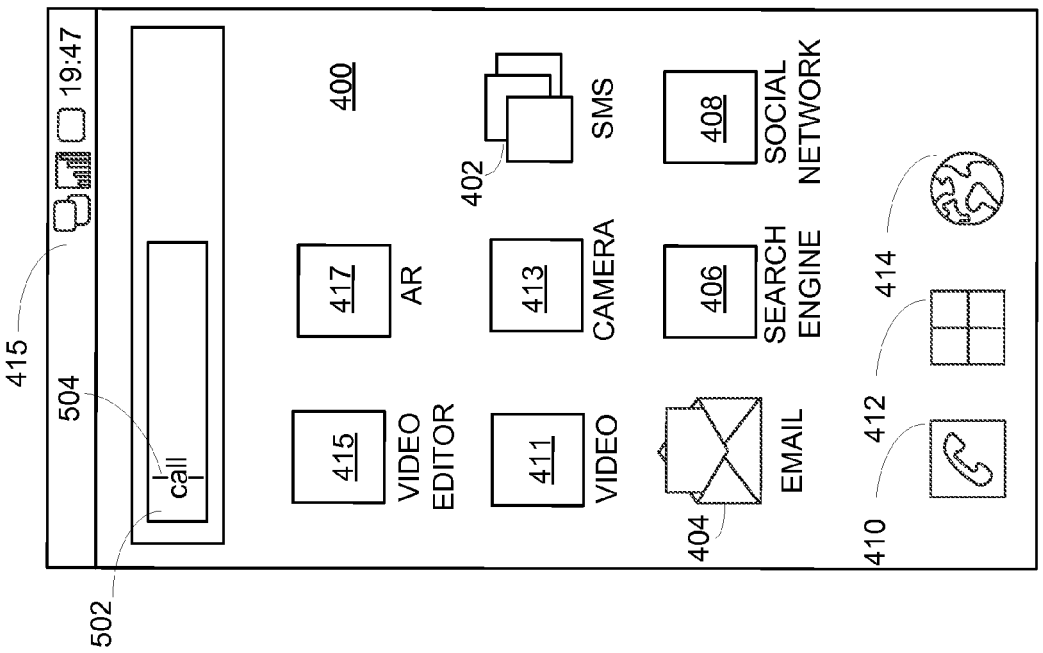

In the example illustrated in FIGS. 5a-5d, if the user selects notification marker/icon 418, DRDA 502 may be displayed on homescreen 400, and DRDA 502 may display, using RSVP, the first of two SMS messages, which reads "Martina: please call me." It should be noted that FIGS. 5a-5d illustrate time sequence snapshots of the content displayed in DRDA 502. For example, FIG. 5a shows that DRDA 502 displays "Martina:" at time 1, FIG. 5b shows that DRDA 502 displays "please" at second time, FIG. 5c shows that DRDA 502 displays "call" at third time, and FIG. 5d shows that DRDA 502 displays "me" at fourth time. DRDA 502 may display an ORP of each word at a fixed display location between hash marks 504. As previously discussed, an empirically determined ORP of each display element may be presented at a fixed location of DRDA 502, the fixed display location being between hash marks 504. It should be noted that hash marks 504 are shown in some but not all subsequent figures to avoid overcomplicating the figures, and particular embodiments of the invention may be implemented using either ORP-RSVP or conventional RSVP. In addition, although DRDA 502 is shown displayed on top of the display, DRDA 502 may be positioned in any portion of the display. Although the embodiment illustrated in FIGS. 5a-5d shows display of textual content associated with a notification event using RSVP on a homescreen, in some embodiments, content may be displayed using RSVP on a screen other than the homescreen, such as, for example, a "lock screen." As will be apparent to one of skill in the art, notification events are often displayed on a "lock screen." In such an instance, selecting the notification(s) on the lock screen may result in content associated with the notification event being displayed in a DRDA using RSVP on the "lock screen."

FIGS. 6a and 6b illustrate screenshot diagrams of an exemplary homescreen including a designated RSVP display area, along with a notification indicating the presence of an attachment or URL in accordance with one embodiment of the present invention. As shown, the RSVP content may include one or more file attachments and/or URLs. If there is an attachment and/or URL included in the RSVP content, a notification indicating the presence of an attachment and/or URL may be displayed with the DRDA. In one embodiment, a thumbnail image corresponding to the attachment or URL may be displayed in addition to, or instead of, the notification. FIG. 6a illustrates DRDA 602 with a notification 604 indicating the presence of a map attachment. Also shown is thumbnail 603, which corresponds to the map attachment. Although thumbnail 603 is shown displayed adjacent to DRDA 602, thumbnail 603 may be displayed anywhere on the display. Various types of attachments may be included with RSVP content. For example, in addition to maps, photos, documents (e.g., PDFs), etc. may also be attached to RSVP content. FIG. 6b illustrates an example with a notification 606 indicating that a URL is included with the RSVP content. As discussed above in the example of a map attachment, a thumbnail image (not shown in FIG. 6b) corresponding to the URL may be displayed in addition to, or instead of, notification 606. It should be noted that although notifications 604 and 606 are displayed underneath DRDA 602, notifications 604 and 606 may be displayed adjacent to, above, or below DRDA 602. Alternatively, the notifications may be displayed in any other location on the display. In some embodiments, the content of a webpage corresponding to the URL may be displayed using RSVP in DRDA 602. In other embodiments, an application corresponding to the attachment may be launched to open the attachment and/or URL. For example, a photo application may be launched to open a photo, or a web browser may be launched to open a URL included with RSVP content. The process of displaying content included in an attachment and/or content of a webpage corresponding to a URL included with RSVP content is described in more detail in the description of FIG. 12.

Figure 7D:
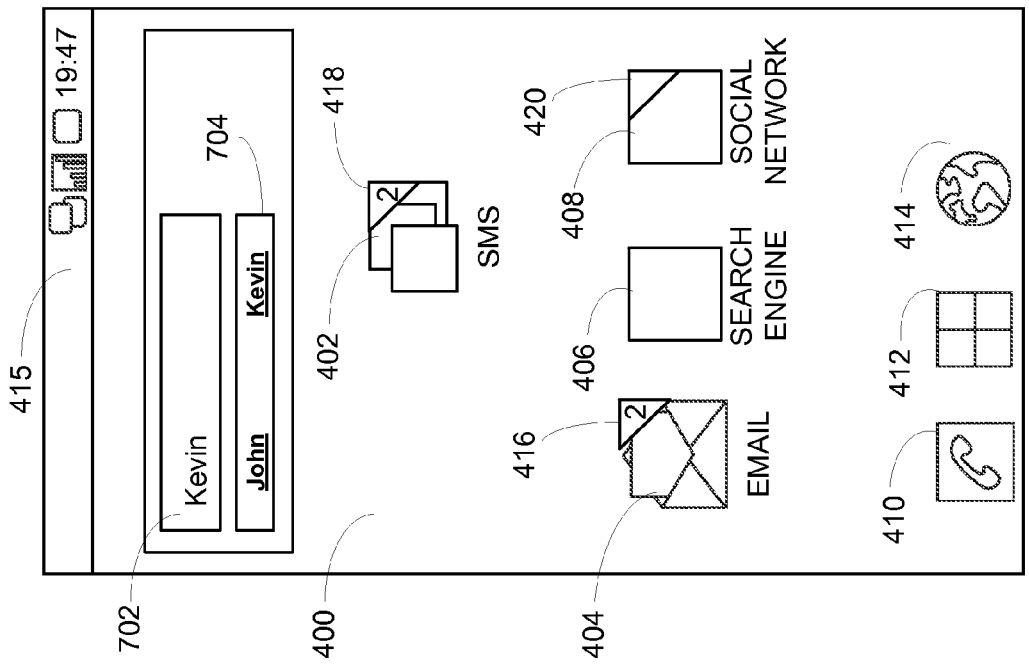
FIG. 7d illustrates a screenshot diagram of an exemplary homescreen including a designated RSVP display area, along with a notification indicating the presence of multiple levels of RSVP content in accordance with one embodiment of the present invention.
Figure 7C:
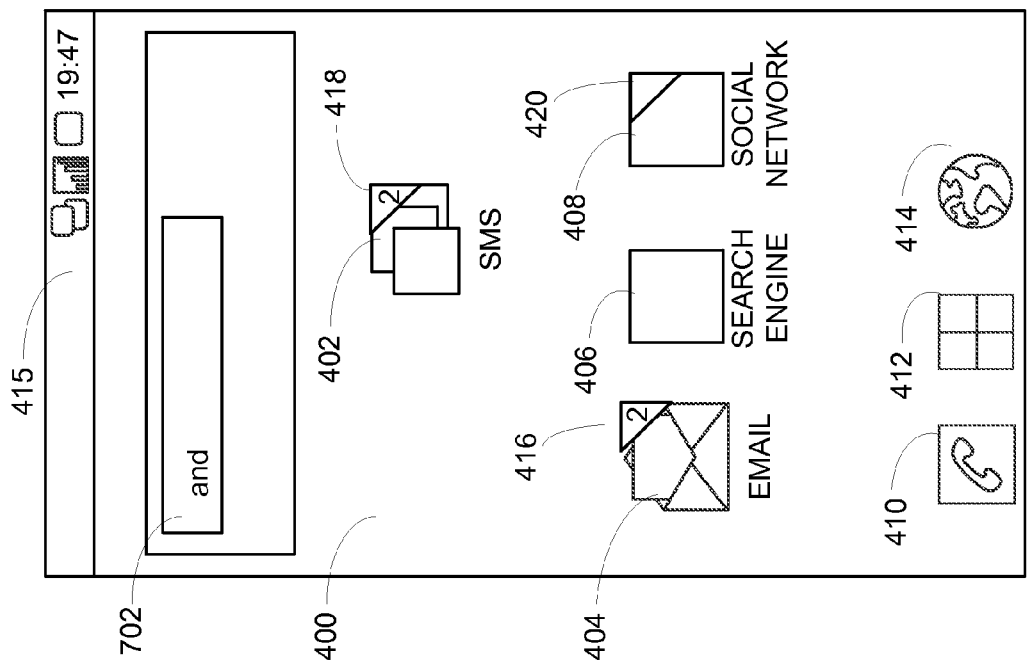
Figure 7F:
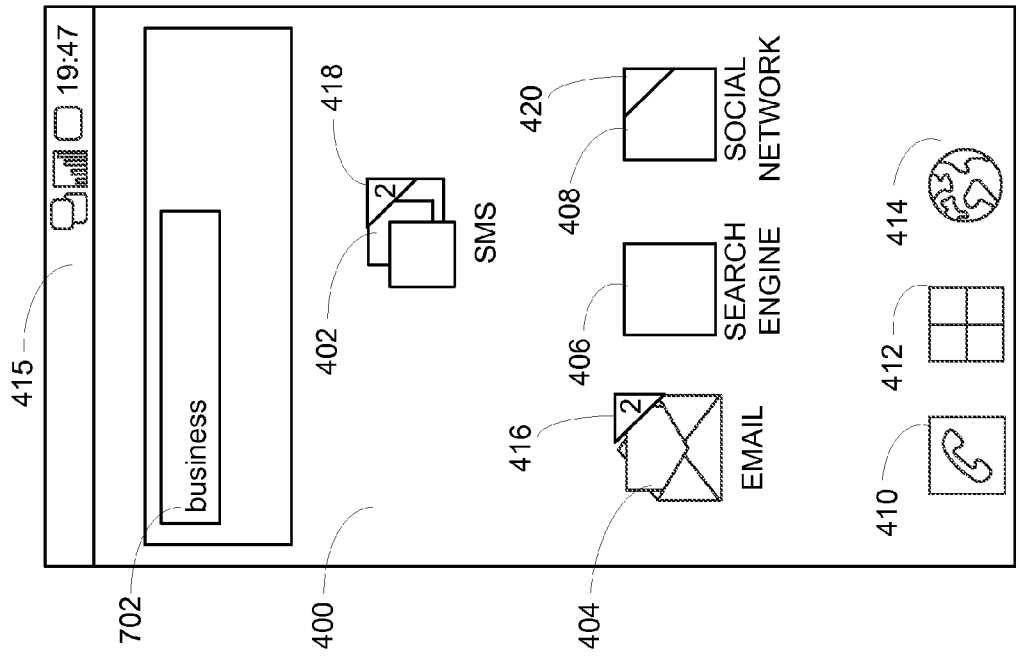
FIGS. 7e-7h illustrate screenshot diagrams of an exemplary homescreen including a designated RSVP display area displaying the additional levels of RSVP content indicated in FIG. 7d in accordance with one embodiment of the present invention.
Figure 7E:
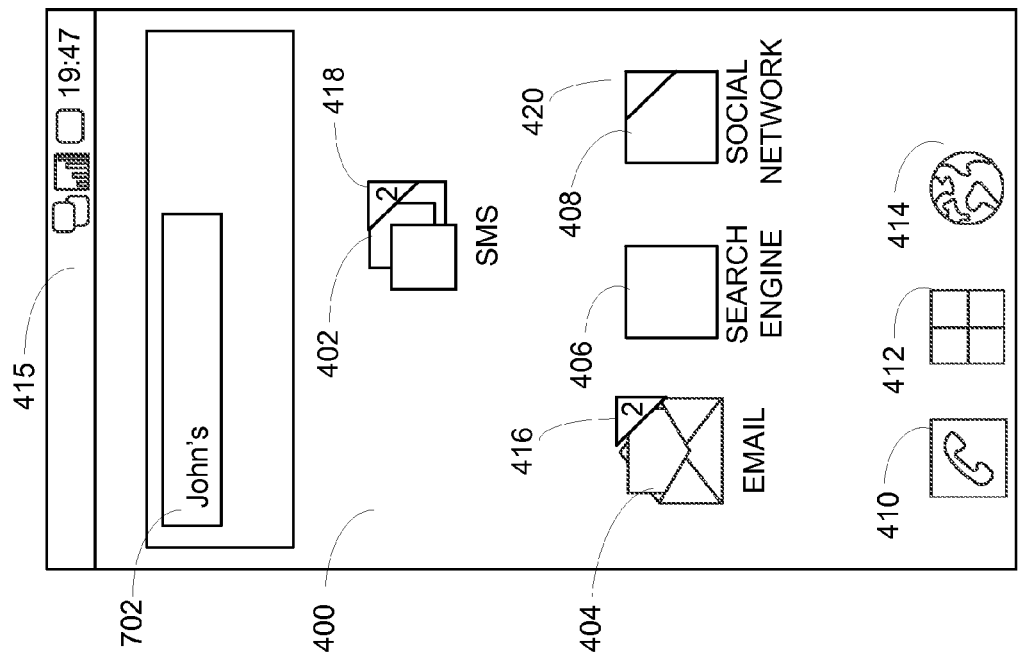
Figure 7H:
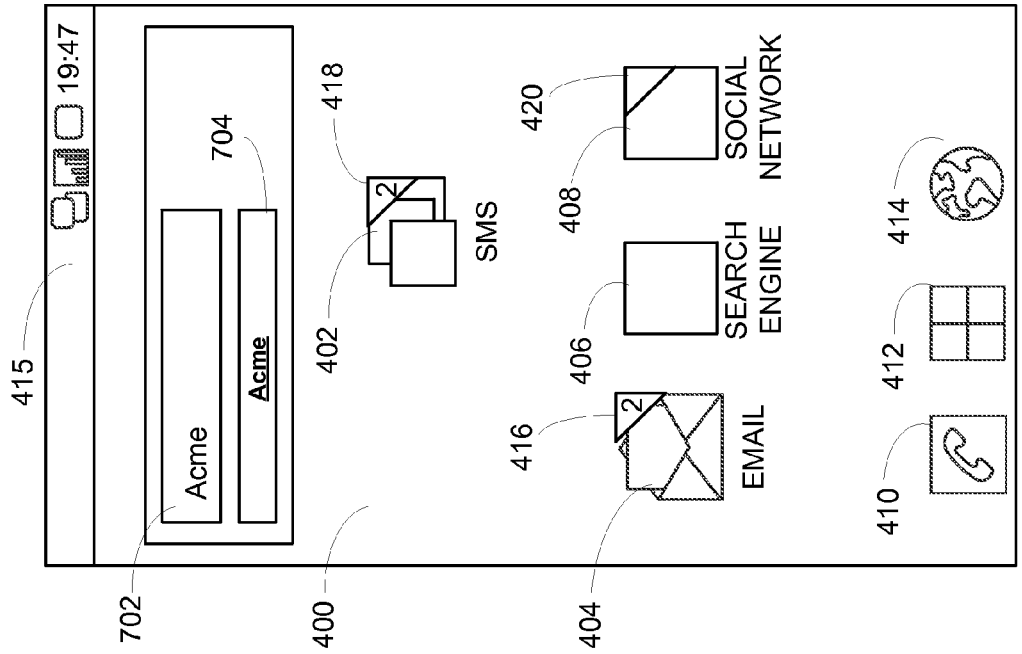
Figure 7G:
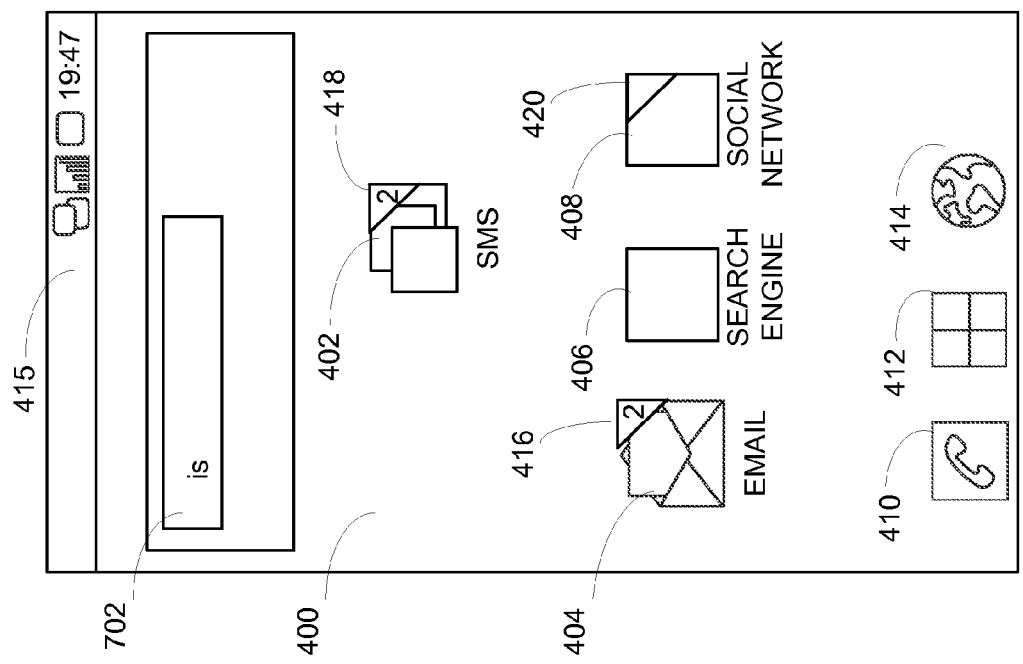

FIGS. 7a-7c illustrate screenshot diagrams of an exemplary homescreen including a designated RSVP display area, and FIG. 7d illustrates a screenshot diagram of an exemplary homescreen including a designated RSVP display area, along with a notification indicating the presence of multiple levels of RSVP content in accordance with one embodiment of the present invention. It should be noted that FIGS. 7a-7d illustrate time sequence snapshots of the content displayed in DRDA 702. For example, FIG. 7a shows that DRDA 702 displays "Meet" at time 1, FIG. 7b shows that DRDA 702 displays "John" at second time, FIG. 7c shows that DRDA 702 displays "and" at third time, and FIG. 7d shows that DRDA 702 displays "Kevin" at fourth time. In one embodiment, RSVP content may include multiple or "cascading" levels of RSVP content. For example, RSVP content may itself include further RSVP content. The presence of additional levels of RSVP content (sometimes referenced herein as "sub-content") may be indicated by, for example displaying a notification similar to the notifications used to indicate the presence of an attachment and/or URL (see FIGS. 6a and 6b). FIGS. 7a-7d illustrate DRDA 702 which displays the message "Meet John and Kevin." However, this message includes additional RSVP content as indicated by notification 704 in FIG. 7d, which displays "John" and "Kevin." "John" and "Kevin" are selectable items within notification 704 which represent further embedded RSVP content. For example, if the user selects "John", the RSVP content associated with "John" may be displayed.

FIGS. 7e-7h illustrate screenshot diagrams of an exemplary homescreen including a designated RSVP display area displaying the additional level of RSVP content associated with "John" in accordance with one embodiment of the present invention. DRDA 702 displays "John's business is Acme." As discussed above, FIGS. 7e-7h illustrate time sequence snapshots of the content displayed in DRDA 702. The message "John's business is Acme" may further include embedded RSVP content, as indicated by "Acme" in notification 704. If the user selects "Acme," the RSVP content associated with "Acme" may be displayed (not separately shown). Similarly, if the user selects "Kevin," RSVP content associated with "Kevin" may be displayed in DRDA 702 (not separately shown). It should be noted that although additional RSVP content was embedded in "John" and "Kevin," RSVP content may also be embedded in phrases, sentences, paragraphs, etc. For example, "John's business is Acme" may have been embedded in "Meet John" instead of just "John."

Figure 8A:
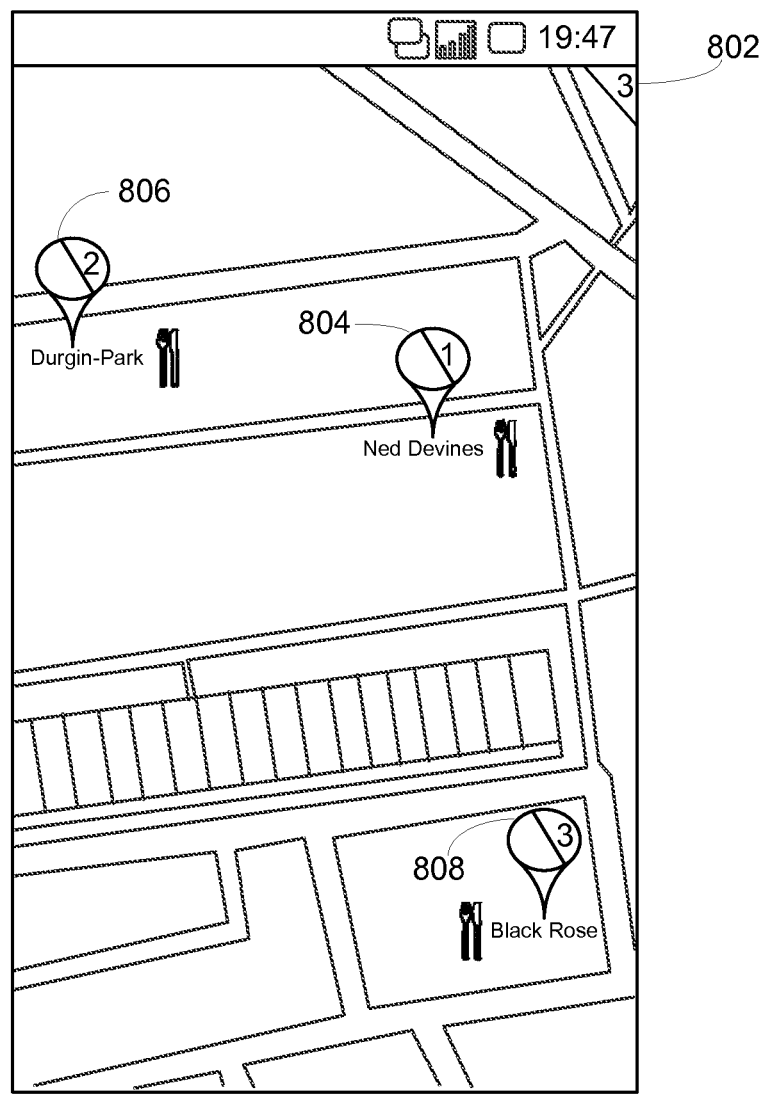
FIGS. 8a-8c illustrate screenshot diagrams of an exemplary maps application in accordance with one embodiment of the present invention.
Figure 8C:
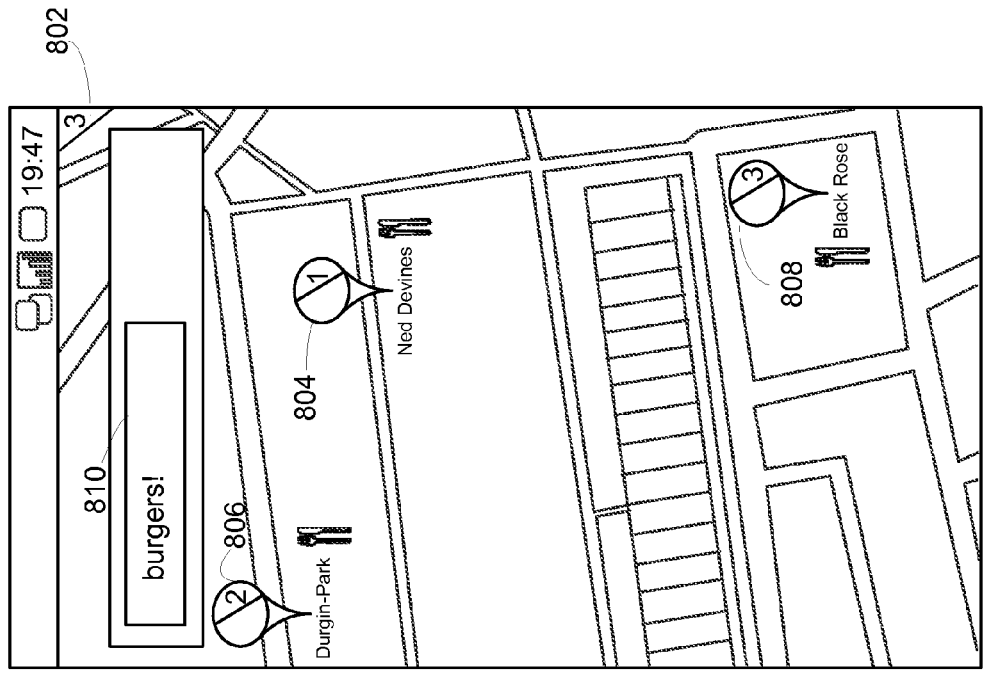
Figure 8B:
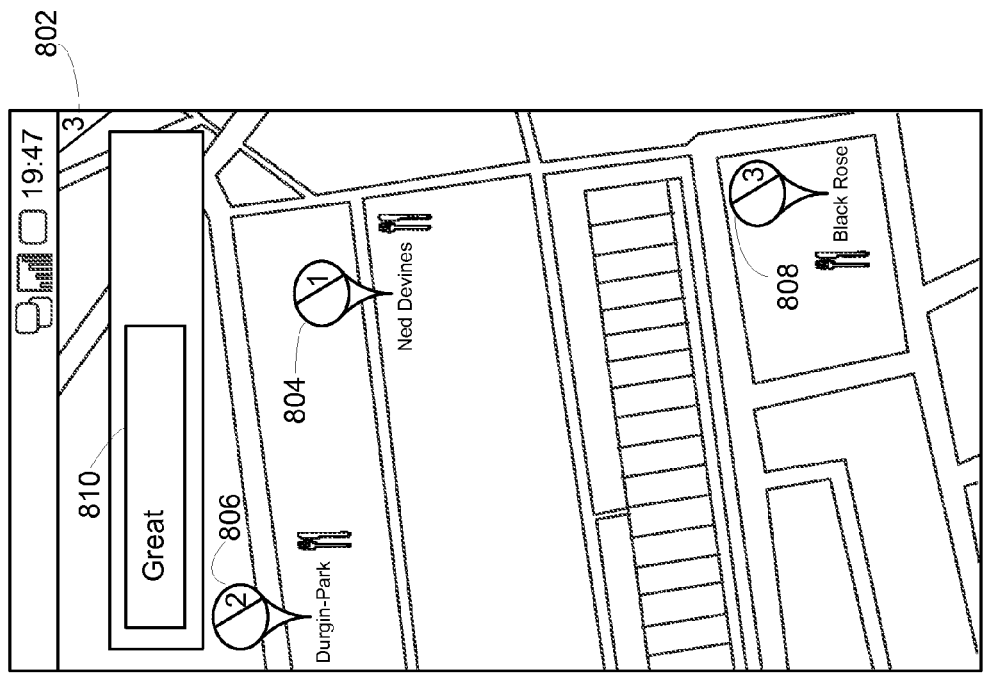

FIGS. 8a-8c illustrate a screenshot diagram of an exemplary maps application in accordance with one embodiment of the present invention. RSVP content may be implemented in virtually any application. For example, FIG. 8a shows a maps application in which the presence of RSVP content is indicated by notification markers/icons 804, 806 and 808. Notification 802 may be included to indicate the quantity of notification markers/icons displayed on the map, and to notify the user of "global" RSVP content corresponding to the whole map (as opposed to RSVP content corresponding to specific locations on the map, which are specified by markers/icons 804, 806 and 808). For example, notification 802 may have associated with it RSVP content such as "Check out these three restaurants." Thus, if notification 802 is selected by the user, DRDA 810 may display "Check out these three restaurants" (this message is not separately shown in the figures and DRDA 810 is not separately shown in FIG. 8a). It should be noted that although notification 802 is shown in the top-right corner, notification 802 may be displayed anywhere on the display. As shown, notification markers/icons 804, 806 and 808 include numerical indicators. In one embodiment, the numerical indicators may be used to denote quantity. In other embodiments, the numerical (or, alternatively, alphabetical) indicators may be used to indicate a preferred viewing order. For example, notification markers/icons 804, 806 and 808 may be used to indicate presence of RSVP content related to restaurants at specified locations on the map, and the numerical indicators alert the user to view the notifications in the specified order. If the user selects notification marker/icon 804, DRDA 810 may be displayed as shown in FIG. 8b. As shown in FIGS. 8b and 8c, DRDA 810 may display "Great burgers!," which is associated with notification marker/icon 804, using RSVP. It should be noted that FIGS. 8b-8c illustrate time sequence snapshots of the content displayed in DRDA 810. For example, FIG. 8b shows that DRDA 810 displays "Great" at time 1, and FIG. 8c shows that DRDA 810 displays "burgers" at second time. In one embodiment, DRDA 810 may automatically display RSVP content associated with markers 804, 806 and 808 in sequential order after user selection of notification 802. For example, if the user selects notification 802, DRDA 810 may display "Check out these three restaurants" and then automatically display "Great burgers!", (associated with marker 804) and then automatically display RSVP content associated with markers 806 and 808. In one alternative, the map is automatically moved to center the marker for which text is currently being displayed by RSVP.

Figure 9B:
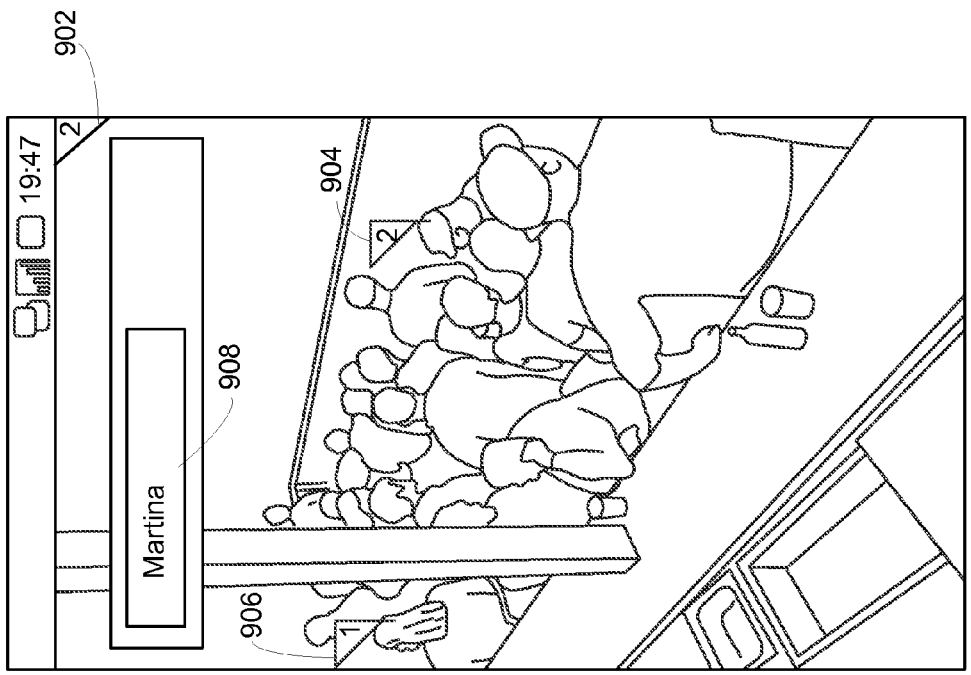
FIGS. 9a-9d illustrate screenshot diagrams of an exemplary photo application in accordance with one embodiment of the present invention.
Figure 9A:
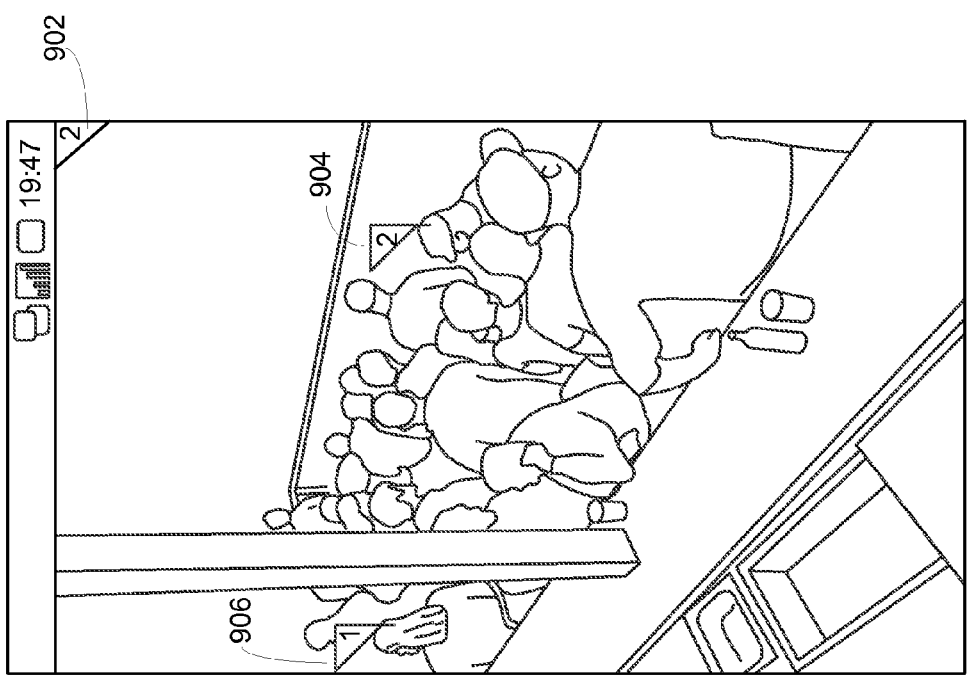
Figure 9D:
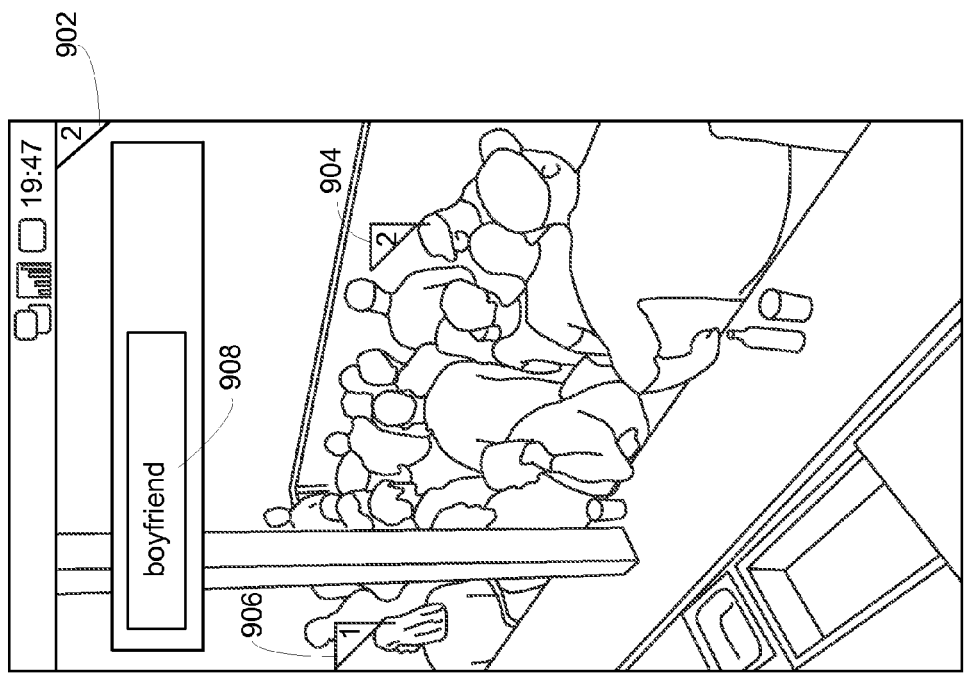
Figure 9C:
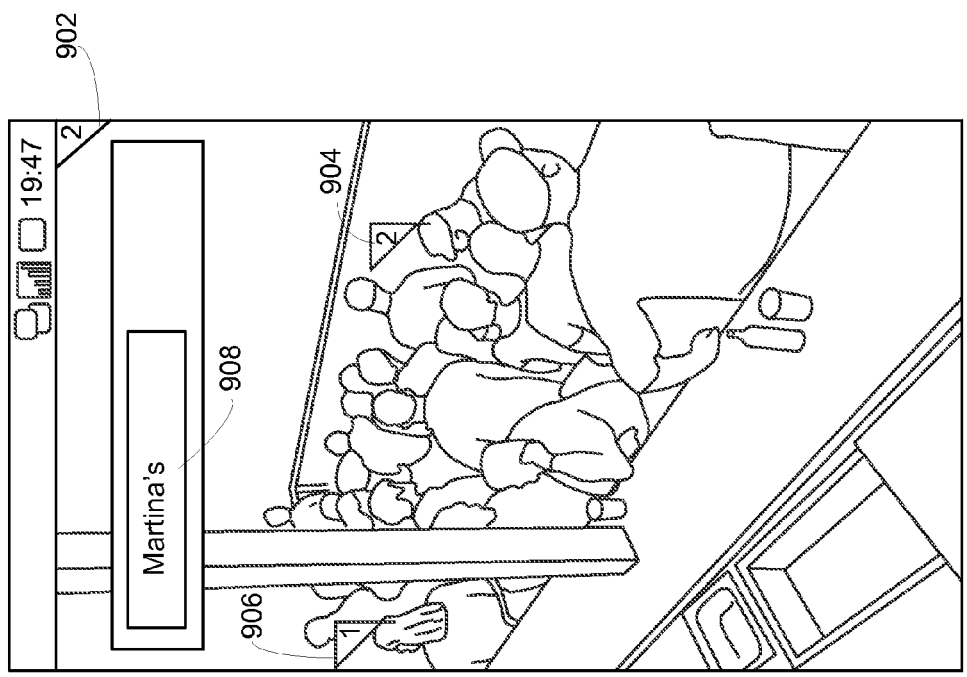

FIGS. 9a-9d illustrate screenshot diagrams of an exemplary photo application in accordance with one embodiment of the present invention. As shown in the example of FIGS. 9a-9d, RSVP content may be embedded in a photo. As shown in FIG. 9a, notification 902 may be displayed to indicate the quantity of notification markers/icons, and to notify the user of "global" RSVP content associated with the whole photo (as opposed to RSVP content associated with specific locations on the photo, which are specified by markers/icons 904, and 906). For example, notification 902 may have associated with it RSVP content such as "These are my friends." Thus, if notification 902 is selected by the user, DRDA 908 may display "These are my friends" using RSVP (this message is not separately shown in the figures and DRDA 908 is not separately shown in FIG. 9a). It should be noted that although notification 902 is shown in the top-right corner, notification 902 may be displayed anywhere on the display. Notification markers/icons 904 and 906 may be displayed to indicate presence of "local" RSVP content associated with the location on the photo specified by the notification marker/icon. For example, as shown in FIG. 9b, upon user selection of notification marker/icon 906, DRDA 908 may be displayed, and "Martina," which is associated with the location on the photo specified by notification marker/icon 906 may be displayed in DRDA 908. Similarly, as shown in FIGS. 9c and 9d, upon user selection of notification marker/icon 904, DRDA 908 may be displayed, and "Martina's boyfriend," which is associated with the location on the photo specified by notification marker/icon 904 may be displayed using RSVP in DRDA 908. It should be noted that FIGS. 9c-9d illustrate time sequence snapshots of the content displayed in DRDA 908. For example, FIG. 9c shows that DRDA 908 displays "Martina's" at time 1, and FIG. 9d shows that DRDA 908 displays "boyfriend" at second time. The process of embedding RSVP content in photos is described in more detail in the description of FIG. 17. In one embodiment, DRDA 908 may automatically display RSVP content associated with markers 904, and 906 in sequential order after user selection of notification 902. For example, if the user selects notification 902, DRDA 908 may display "These are my friends" and then automatically display "Martina" (associated with marker 906), and then automatically display "Martina's boyfriend" (associated with marker 904). In a particular embodiment, when RSVP content is played automatically for multiple markers, each marker is visually highlighted (e.g., bolded) while the RSVP content associated with that marker is being displayed.

Figure 10C:
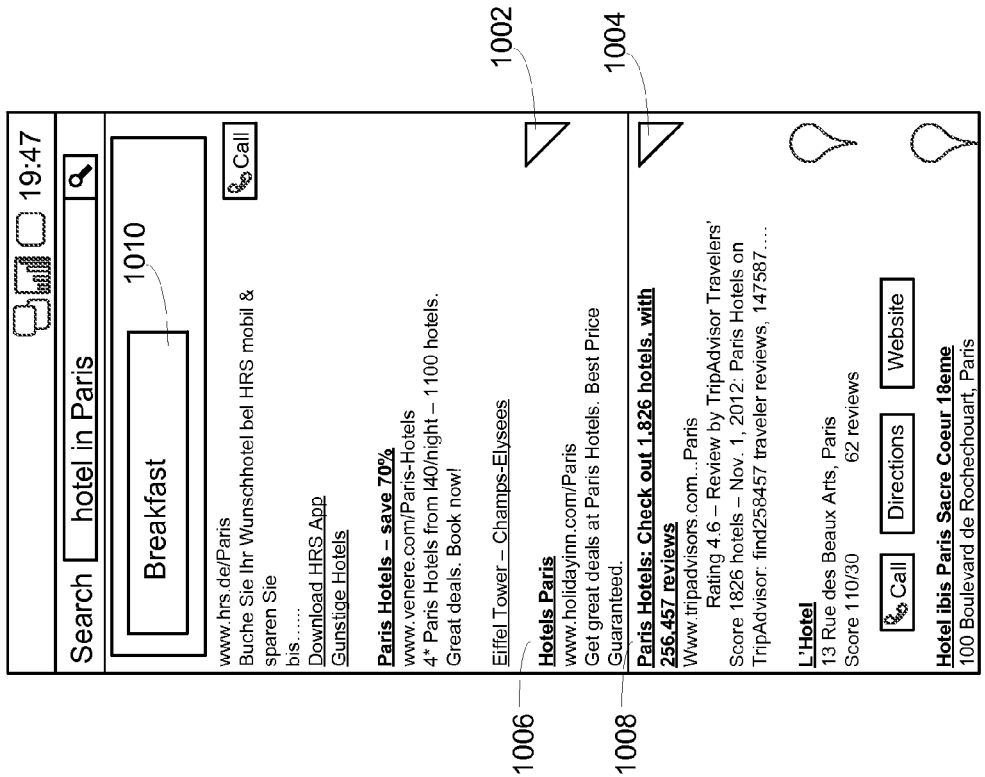

FIGS. 10a-10c illustrate screenshot diagrams of an exemplary search results page in accordance with one embodiment of the present invention. Another example in which RSVP content may be employed is in the display of search results, including sponsored search results, display advertisements, etc. FIG. 10a shows a screenshot of a search results page for a search query "hotel in paris." As shown, one or more search results corresponding to the search query may be displayed. One or more of the search results (or sponsored search results, display advertisements, etc.) may be displayed with a notification marker/icon indicating the presence of RSVP content associated with that search result (or sponsored search results, display advertisements, etc.). For example, notification markers/icons 1002 and 1004 may be displayed adjacent to search results 1006 and 1008, respectively, to indicate presence of RSVP content associated with those search results. Search result 1006 may be a sponsored search result. In some embodiments, notification markers/icons 1002 and 1004 may be displayed above, below, or in any other location on the display. In one embodiment, advertisers and/or search engine providers may choose to embed specifically chosen content as RSVP content in the search results in order to include more information than what is displayable in the provided space. In another embodiment, content from a webpage may be embedded as RSVP content. For example, in the case of sponsored search result 1006, the advertiser may provide content which the advertiser wishes to be embedded as RSVP content (e.g., "Free Breakfast" as shown in FIGS. 10b and 10c). However, in some embodiments, like in the case of search result 1008, content from the corresponding webpage (e.g., HTML text) may be embedded as RSVP content. The process of embedding RSVP content in search results (or sponsored search results, display advertisements, etc.) is described in more detail in the description of FIG. 16.

Upon user selection of notification marker/icon 1002, DRDA 1010 may be displayed as shown in FIGS. 10b and 10c, and "Free breakfast" may be displayed using RSVP in DRDA 1010. It should be noted that FIGS. 10b-10c illustrate time sequence snapshots of the content displayed in DRDA 1010. For example, FIG. 10b shows that DRDA 1010 displays "Free" at time 1, and FIG. 10c shows that DRDA 1010 displays "breakfast" at second time.

Figure 11B:
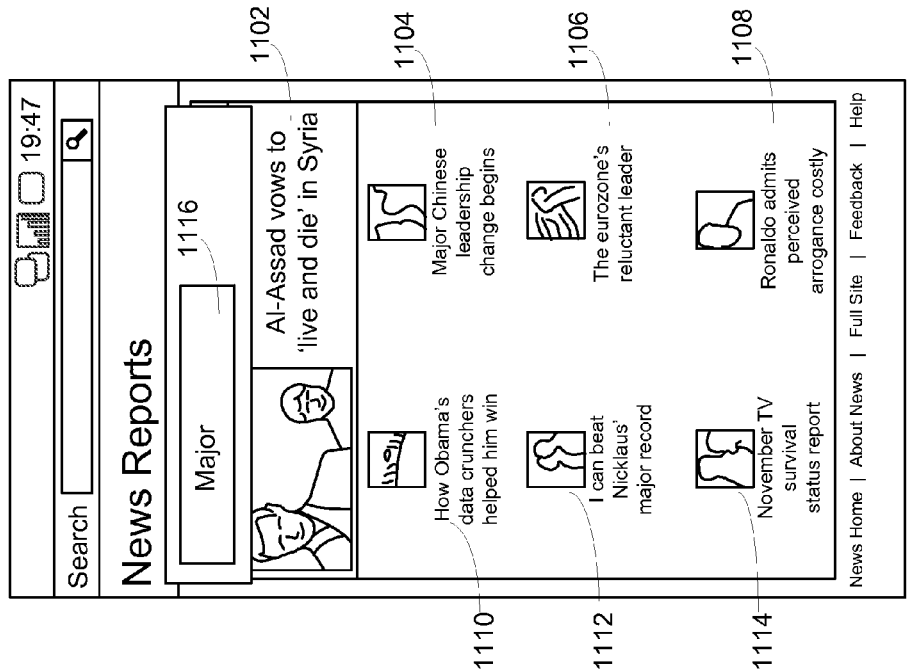
FIGS. 11a-11b illustrate screenshot diagrams of an exemplary news website homepage enabled for dense content in accordance with one embodiment of the present invention.
Figure 11A:
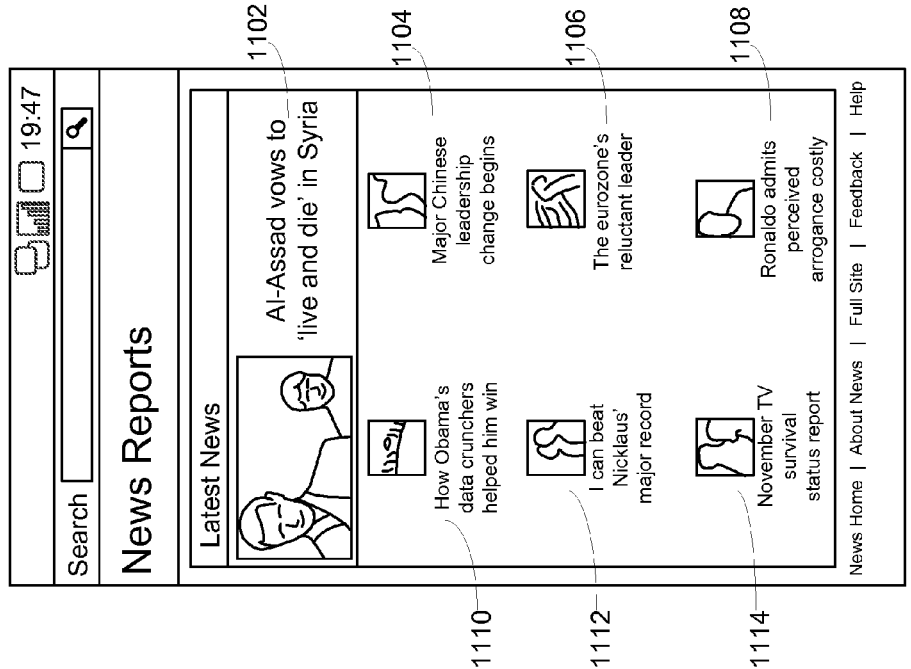

FIGS. 11a-11b illustrate screenshot diagrams of an exemplary news website homepage configured with RSVP content in accordance with one embodiment of the present invention. In one embodiment, RSVP content may be employed on websites to advantageously increase content density. This allows websites that provide large quantities of content such as, for example, news portals and ecommerce sites, to benefit from faster selection and reading of content by the visitor, especially on communication devices which have small displays. For instance, in the example of a news website, news headlines 1102, 1104, 1106, 1108, 1110, 1112, and 1114 may be presented as shown in FIG. 11a. As shown in FIG. 11b, upon user selection of one of headlines 1102, 1104, 1106, 1108, 1110, 1112, and 1114, DRDA 1116 may be displayed, and the contents of the corresponding story may be displayed using RSVP in DRDA 1116. In one embodiment, the content of the news story may be configured using a <meta> HTML tag. For example, the story may be configured using <meta name="RSVP" content="RSVP content goes here">. Thus, when the browser application opens the page, it may search for the <meta name="RSVP"> tag, and display the text included in the content parameter using RSVP.

Figure 12:
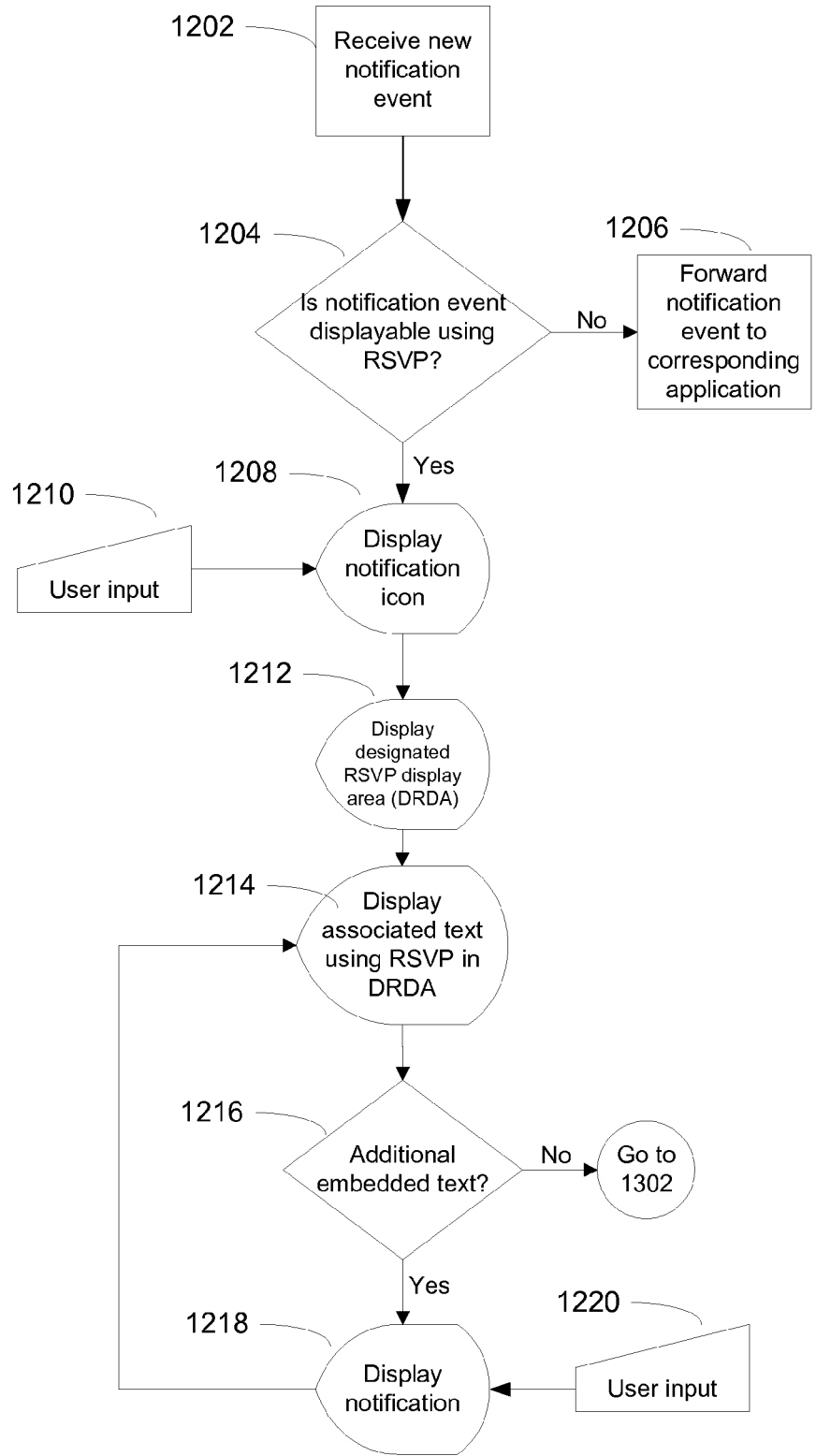
FIG. 12 is a flow chart diagram of a process of displaying RSVP content on a homescreen or desktop in accordance with one embodiment of the present invention.

FIG. 12 is a flowchart diagram of process 1200 for displaying RSVP content on a homescreen in accordance with one embodiment of the invention. A new notification event is received at step 1202. As previously described, a new notification event may include receipt of a new email message, SMS message, file transfer, etc. In one embodiment, the notification event may have been received as a result of a "push" notification. Alternatively, the notification event may have been received in response to a request from user device 210. It may be determined in step 1204 if the notification event is displayable using RSVP. In one embodiment, this determination includes determining if the corresponding application allows display of content using RSVP.

For instance, as a result of user settings, certain applications may have disabled or may not allow displaying content using RSVP. If it is determined that the notification event is not displayable using RSVP, the notification event is forwarded to the corresponding application in step 1206, which may handle the notification event in the conventional manner. For example, if the notification is for a SMS message, the notification is forwarded to the SMS application, if it for an email message, it is forwarded to the email application, etc.

However, if the notification event is determined to be displayable using RSVP, a notification marker/icon may be displayed in step 1208. In one embodiment, the notification marker/icon may be overlaid on top of the icon representing the corresponding application (see, FIG. 4b). In other embodiments the notification marker/icon may be displayed adjacent to, above or below the icon representing the corresponding application. As previously described, the notification marker/icon may also include a numerical indicator, which may correspond to the number of notification events for the corresponding application. The notification marker/icon may be selected in response to user input received at step 1210. The user input may include, for example a touch and hold of the notification marker/icon, a tap of the notification marker/icon, a selection of the notification marker/icon using a mouse or trackball, etc. As previously discussed, in some embodiments, a notification marker/icon may be selected by simply "hovering" over the notification marker/icon. In response to user selection of the notification marker/icon, the designated RSVP display area (DRDA) may be displayed in step 1212. Textual content associated with the notification event may be displayed using RSVP in the DRDA in step 1214. In one embodiment, the textual content associated with the notification event may be displayed in the DRDA as long as appropriate user input is present. For example, in the case where appropriate user input is a press and hold of the notification icon/marker, if the user releases the notification icon/marker, the DRDA stops displaying the RSVP content and is then hidden. In one embodiment, the amount and type of content that gets displayed in DRDA may be defined or selected in RSVP Settings 308 (FIG. 3). For example, in the case of an email, it may be selected that the sender name, subject of the email and the body of the email may be displayed using RSVP in DRDA. Alternatively, it may be selected that only the sender name and subject of the email be displayed using RSVP in DRDA. In some embodiments, RSVP content may contain additional embedded RSVP content as illustrated in, for example FIGS. 7a-7h. It may be determined in step 1216 if additional embedded text is present. If so, a notification (e.g., notification 704 in FIG. 7d) may be displayed in step 1218. In response to user input received at step 1220, the additional embedded text may be displayed in DRDA using RSVP. In some embodiments, steps 1218 and 1220 may be optional. In other words, all available RSVP content may be automatically displayed sequentially without awaiting user input.

Figure 13:
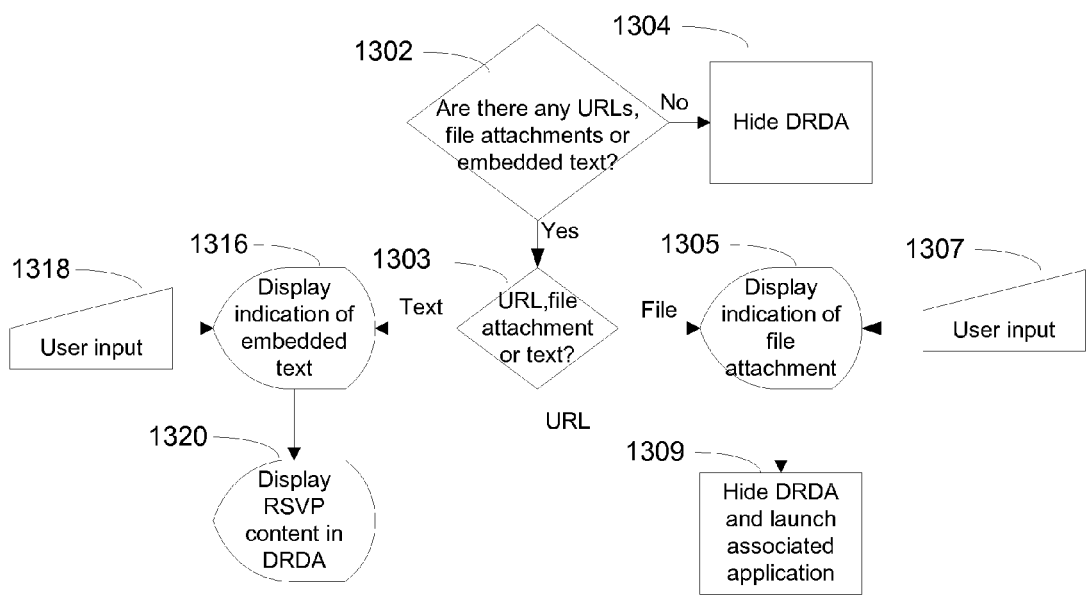
FIG. 13 is a flow chart diagram of a process of displaying RSVP content included in file attachments, embedded text, and URLs in accordance with one embodiment of the present invention.

FIG. 13 is a flowchart diagram of process 1300 for displaying embedded text (see e.g., FIG. 7d), an attachment and/or URL included with RSVP content in accordance with one embodiment of the invention. Upon completion of displaying RSVP content, which may or may not have been associated with a notification event, it is determined in step 1302 whether the RSVP content includes sub-content such as additional embedded text, an attachment and/or a URL. If the RSVP content is determined to not include embedded text, an attachment and/or a URL, the DRDA is hidden in step 1304. If the RSVP content is determined to include embedded text, an attachment and/or a URL, it is determined in step 1303 whether embedded text, a file attachment or a URL is included. If it is determined that a file attachment is included, an indication of the presence of an attachment is displayed in step 1305 (as shown in FIG. 6a). The file attachment may be, for example a photo, a map, a document, etc. User input indicating selection of the file attachment is received in step 1307. In step 1309, the DRDA is hidden and the application associated with the file attachment is launched to open the attachment. For example, if the file attachment is a photo, a photo viewer application may be launched to open the photo. In one embodiment, the file attachment itself may contain embedded RSVP content. The process of opening a file which may contain RSVP content and displaying the RSVP content within an application interface is described in more detail in the description of FIG. 14a.

If it is determined in step 1303 that a URL is included in the RSVP content, an indication of the presence of a URL is displayed in step 1306 (as shown in FIG. 6b). User input indicating selection of the URL is received in step 1308. In one embodiment, the webpage corresponding to the URL may contain RSVP content. As previously described, RSVP content may be embedded in a webpage using, for example a <meta> HTML tag. It is determined in step 1310 if the webpage corresponding to the URL contains RSVP content. If it is determined that the webpage does not contain RSVP content, the DRDA is hidden and a browser application is launched in step 1312 to display the webpage corresponding to the URL. If, however, the webpage is determined to contain RSVP content, the RSVP content is displayed in the DRDA using RSVP in step 1314.

If it is determined in step 1303 that embedded text is included in the RSVP content, an indication of the presence of embedded text is displayed in step 1316 (as shown in FIG. 7d). User input indicating selection of the embedded text is received in step 1318. In step 1320, the RSVP content is displayed in the DRDA using RSVP.

Figure 14A:
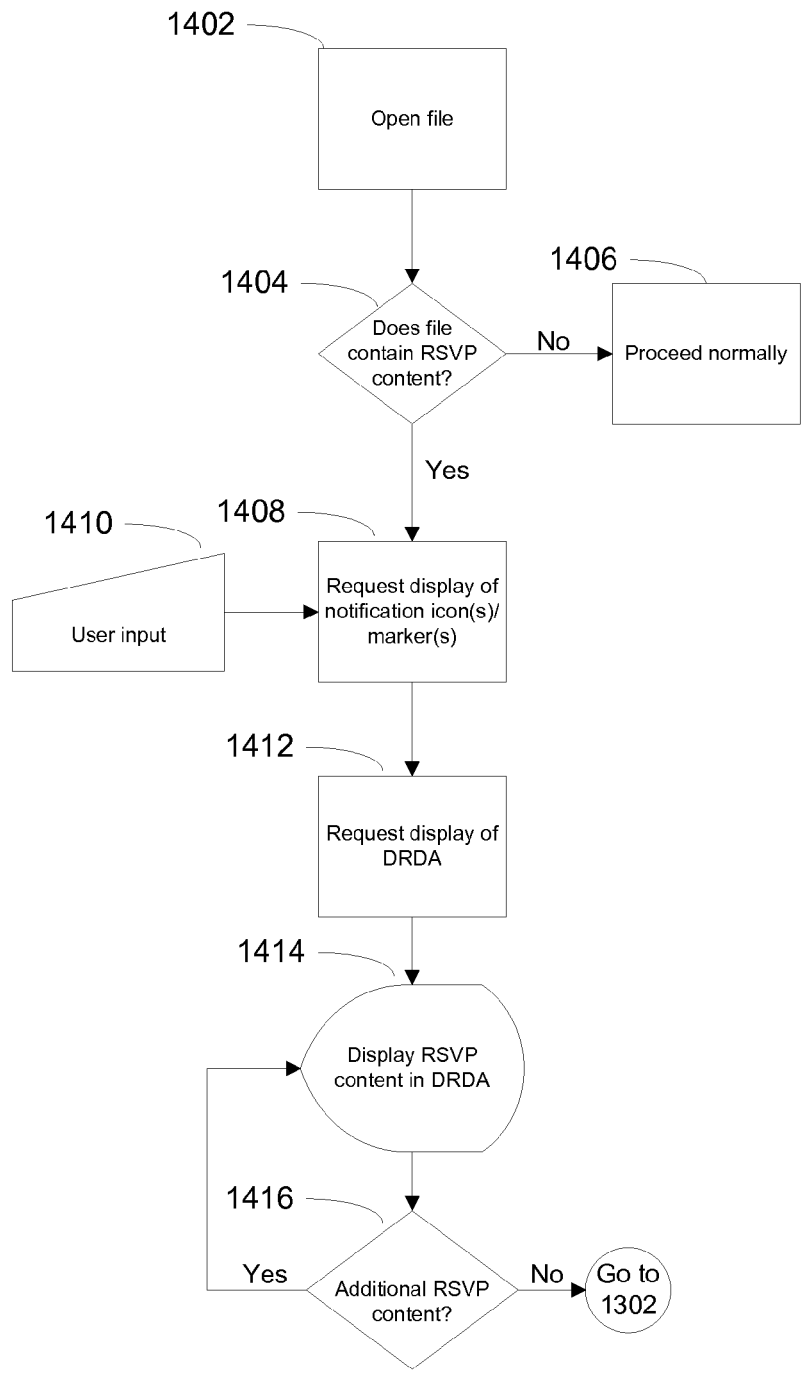
FIG. 14a is a flow chart diagram of a process of displaying RSVP content within an application in accordance with one embodiment of the present invention.

FIG. 14a is a flowchart diagram of process 1400 for displaying, within an application, RSVP content that is embedded in a file in accordance with one embodiment of the present invention. For example, process 1400 may be used by a photo application to display a photo which contains embedded RSVP content, or by a browser application to display an advertisement which contains embedded RSVP content, etc. In step 1402, the file may be opened by the application. In step 1404, it may be determined if the file contains RSVP content (e.g., content that is configured to be displayed using RSVP). In one embodiment, this determination may be made by RSVP library 204 (FIG. 2). The application may request RSVP library 204 to determine if the file includes RSVP content. In one embodiment, RSVP library 204 may detect the presence of RSVP content by searching the contents of the notification event for meta data, such as a <meta> tag in HTML pages, EXIF data in photos, etc. In another embodiment, the application may include application specific RSVP software (e.g., 209a-209c in FIG. 2), which may determine if the file contains RSVP content. Although FIG. 14a illustrates opening a file within an application interface, the same logic is applicable to initiating a stream of data within a browser or other application.

If it is determined that the file contains no RSVP content, the application may proceed as normal in step 1406. For example, if the file is a photo, and it does not contain RSVP content, the application may simply display the photo normally. If however, it is determined that the file contains RSVP content, the application requests display of notification markers/icons in appropriate locations in step 1408. In the example of a photo, the notification markers/icons may need to be displayed in specific locations on the photo. In one embodiment, the application may request, for example, RSVP library 204 to display the notification markers/icons. In another embodiment, the application may request the operating system to display the notification markers/icons. In yet another embodiment, the application may obtain the notification markers/icons from RSVP library 204, and display the notification markers/icons. In an alternate embodiment, step 1408 of displaying notification markers/icons is optional. A user device may be configured (e.g., using RSVP settings 308 in FIG. 3) such that certain applications may display all content using RSVP. For example, applications such as an email application, a SMS application, etc. which primarily receive textual data, may be configured to display all content using RSVP. In such instances, displaying a notification marker/icon indicating the presence of RSVP content is not necessary as further described with respect to FIG. 14*b*.

Continuing with the description of FIG. 14*a*, upon receiving user input comprising selection of a particular notification marker/icon at step 1410, the application may request display of the DRDA in step 1412. In one embodiment, the application may request, for example RSVP library 204 to display the DRDA. In another embodiment, the application may request the operating system to display the DRDA. In yet another embodiment, the application may itself (e.g., using RSVP software 209*a*-209*c* in FIG. 2) display the DRDA. The RSVP content associated with the user selected notification marker/icon may be displayed in the DRDA using RSVP in step 1414. It is determined in step 1416 if additional RSVP content is present. If so, the additional RSVP content may be automatically displayed sequentially. For example, as shown in FIGS. 7*a*-7*c* and 8*a*-8*d*, if there are multiple notification markers/icons, DRDA may automatically sequentially display the RSVP content associated with each marker/icon. In another embodiment, user input may be requested before displaying RSVP content associated with each marker/icon. As previously discussed, the RSVP content may include one or more attachments. After displaying RSVP content, process 1300 may be used to display any attachments included with the RSVP content.

Figure 14B:
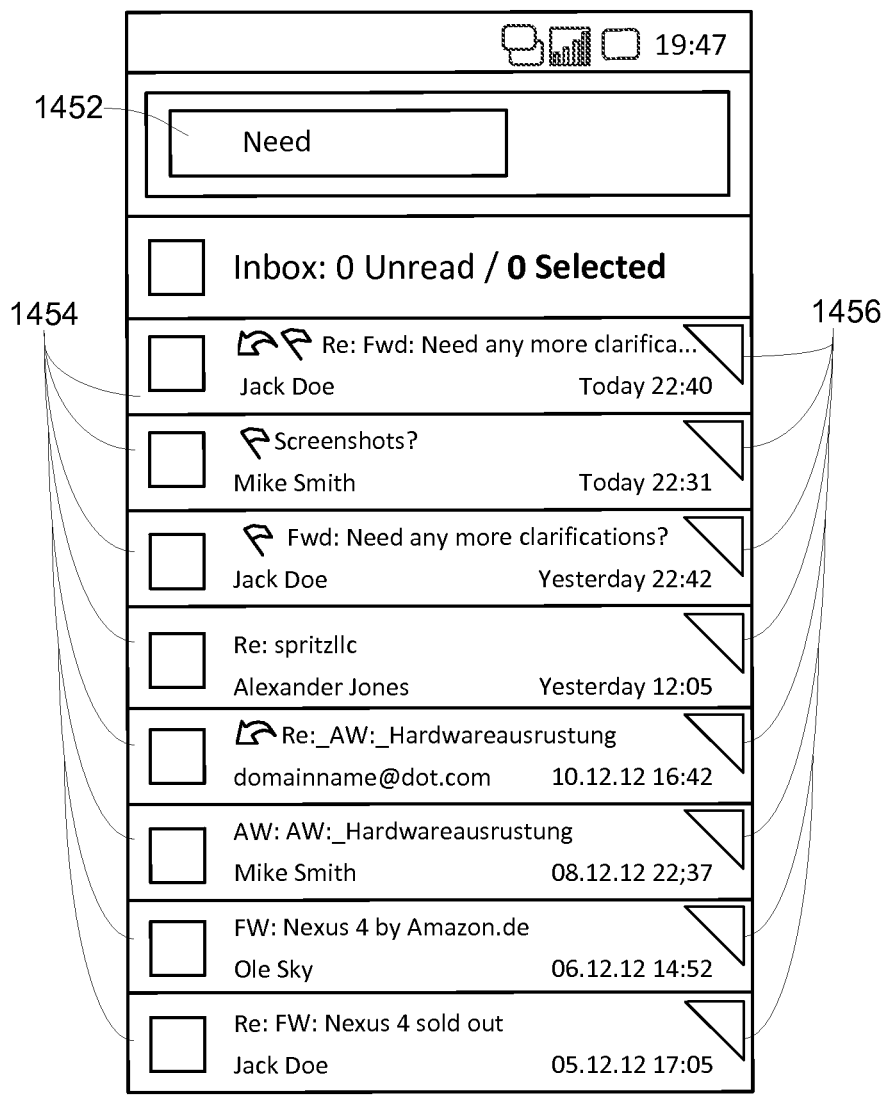
FIG. 14b is a screenshot diagram of an exemplary email application interface including a designated RSVP display area in accordance with one embodiment of the present invention.

FIG. 14*b* is a screenshot diagram 1450 of an exemplary email application on a mobile device in accordance with one embodiment of the present invention. Screenshot diagram 1450 shows a list of email items 1454 which are displayed in a user's inbox. In one embodiment, process 1400, as discussed above, may be employed by the email application to display the content of selected emails using RSVP. A user may select an email by for example, "touching and holding" an email item 1454. Upon user selection of an email, DRDA 1452 may be displayed, and the content of the email may be displayed in DRDA 1452 using RSVP. In one embodiment, the content displayed in DRDA 1452 may include the body of the email. Although notification markers/icons 1456 are shown, displaying notification markers/icons 1456 is optional. As discussed above, a user device may be configured (e.g., using RSVP settings 308 in FIG. 3) such that certain applications may display all content using RSVP. An email application, which primarily receives textual data, may display all content using RSVP. In such instances, displaying a notification marker/icon indicating the presence of RSVP content is not necessary. In one such example, an application may simply list item titles (e.g., emails) without using RSVP notification markers/icons and then, upon receipt of a particular user interface action (e.g., a tap and hold) with respect to an item, the application will display content of that item using RSVP in a DRDA while continuing to display at least a portion of the list of other items. As another example, even when an underlying application's content is non-textual, the content items may be known to be associated with textual descriptions. For example, a video application may be enabled to display a list of video items that are associated with RSVP-displayable textual descriptions and the video item's representation is selectable using a particular user interface action for RSVP display of such descriptions by default without the need for a separate RSVP-specific notification marker.

Figure 15:
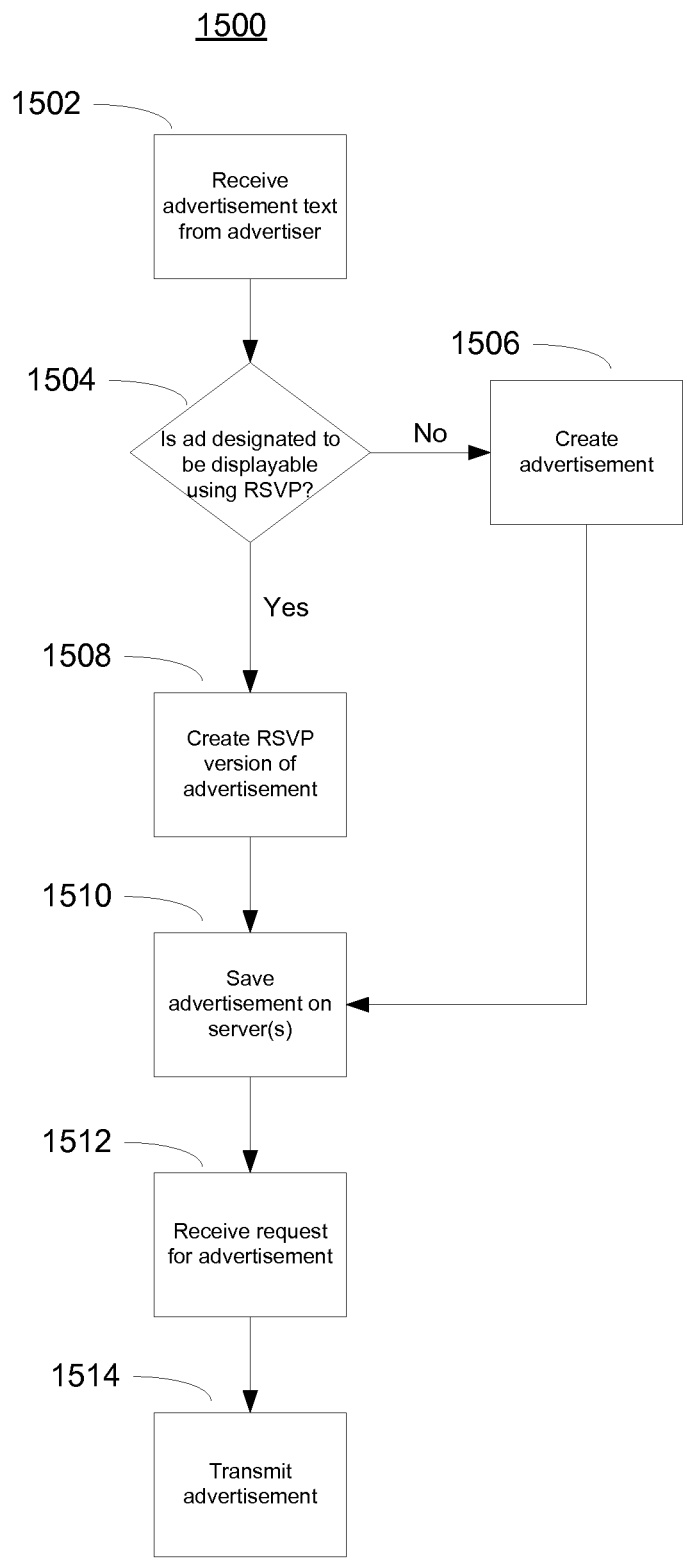
FIG. 15 is a flow chart diagram of a process of creating an RSVP version of an online advertisement in accordance with one embodiment of the present invention.

FIG. 15 is a flow chart diagram of process 1500 for creating an RSVP version of an online advertisement in accordance with one embodiment of the present invention. Online advertisers, who are looking to increase the amount of content that is presented to users in a given amount of screen space, may benefit from incorporating RSVP content into their advertisements. Textual information to be incorporated into an advertisement may be received from an advertiser in step 1502. It may be determined in step 1504, whether the advertiser would like to embed the textual information as RSVP content in the advertisement. If it is determined that the advertiser does not want to include RSVP content in the advertisement, a non-RSVP version of the advertisement may be created in step 1506. If it is determined that the advertisement is to include RSVP content, an RSVP version of the advertisement may be created in step 1508. The RSVP content may be configured using, for example meta-data tags as previously discussed. In step 1510, a RSVP or non-RSVP version of the advertisement may be saved on one or more servers. One or more servers may receive a request for an advertisement in step 1512. In one embodiment, the request may be from a browser application (e.g., for a banner advertisement). In another embodiment, the request may be from a desktop or mobile application which displays advertisements within its interface. In response to the request, the advertisement may be transmitted to the application in step 1514. In one embodiment, when the advertisement is received by the application, process 1400 may be used to display the advertisement. In one embodiment, the advertisement may be displayed with one or more notification markers/icons similar to those shown in FIG. 4*b*, 8*a*, 9*a*, or 10*a* to indicate the presence of content that is displayable using RSVP. The notification markers/icons may be overlaid on top of the advertisement, or may be displayed adjacent to, above, or below the advertisement.

Figure 16:
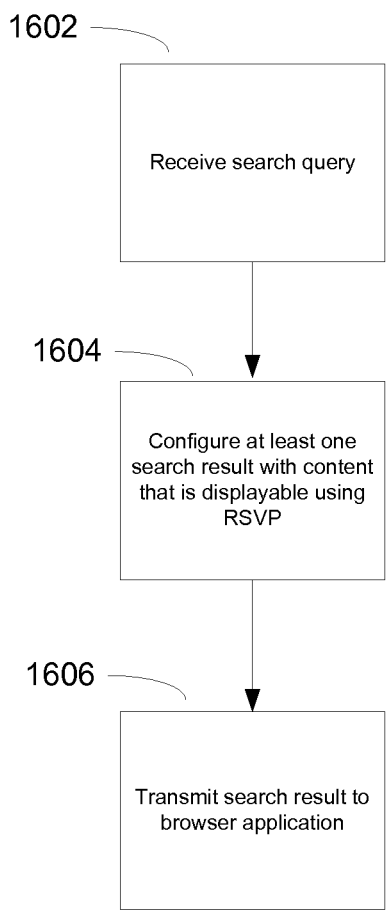
FIG. 16 is a flow chart diagram of a process of configuring search results with RSVP content in accordance with one embodiment of the present invention.

In addition to display advertisements, RSVP content may also be incorporated in, for example sponsored search results. FIG. 16 is a flow chart diagram of a process 1600 for configuring search results with RSVP content in accordance with one embodiment of the present invention. One or more servers may receive a search query in step 1602. In response to the search query, at least one search result corresponding to the search query may be configured with content that is displayable using RSVP in step 1604. In step 1606, the at least one search result may be transmitted to a browser application for display in the browser application. In one embodiment, the search result(s) may be displayed as shown in FIGS. 10*a*-10*c*.

Figure 17:
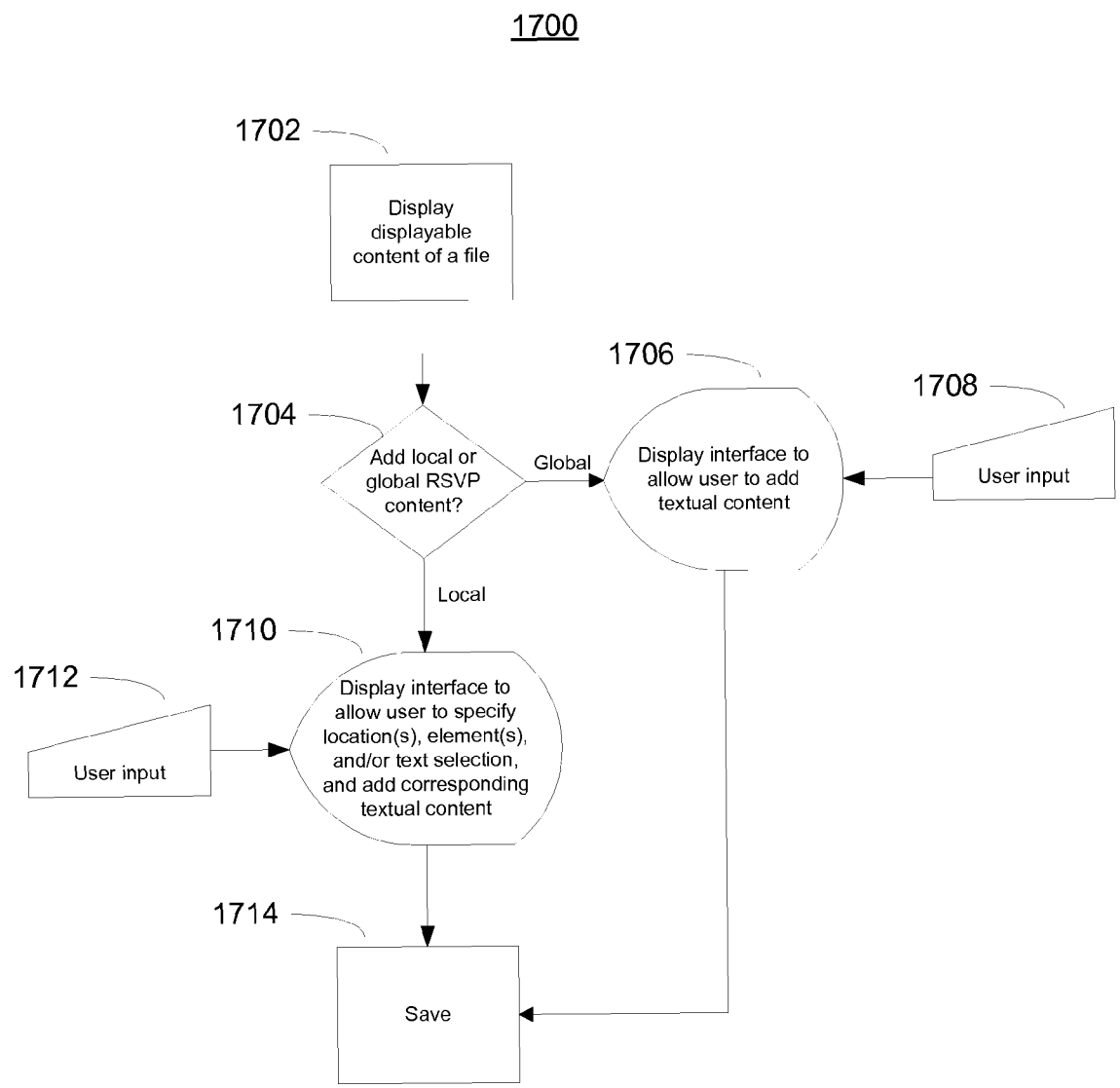
FIG. 17 is a flow chart diagram of a process of embedding RSVP content in a file in accordance with one embodiment of the present invention.

In some embodiments, users may embed RSVP content into files such as for example, photos, presentations, maps, etc. FIG. 17 is a flow chart diagram of a process 1700 for embedding RSVP content in a file (e.g., map, photo, diagram, presentation, word processing document, spreadsheet, etc.) in accordance with one embodiment of the present invention. In step 1702, displayable contents of a file may be displayed by the appropriate application. For example, a diagram may be displayed in a drawing application (e.g., Microsoft Visio™), or a presentation may be displayed in a presentation application (e.g., Microsoft PowerPoint™). In some embodiments, the application may be a desktop application while in other embodiments, the application may be a mobile application, or a web based application accessible via a browser. A user may specify whether to add "global" RSVP content or "local" RSVP content in step 1704. In one embodiment, an interface which allows the user to choose between "global" and/or "local" RSVP content may be displayed. In some embodiments, both "local" and "global" RSVP content may be embedded. As used herein, "global" content refers to RSVP content associated with the file (e.g., photo, map, presentation, and/or diagram) in its entirety. In the case of a map, in the example shown in FIG. 8*b*, notification 802 indicates presence of "global" RSVP content, such as "Check out these three restaurants" and is associated with the whole displayed map. By contrast, notifications 804, 806, and 808 indicate presence of "local" RSVP content associated with each location specified by notifications 804, 806, and 808. Similarly, in the case of a photo, in the example shown in FIG. 9*a*, notification 902 indicates presence of "global" RSVP content, such as "These are my friends," and is associated with the whole photo. By contrast, notifications 904 and 906 indicate presence of "local" RSVP content associated with each location specified by notifications 904 and 906. In another embodiment, "global" content may include a description of the file's contents. In such an embodiment, selecting a file (e.g., by clicking on, or "hovering" over the file's icon or name) that includes embedded "global" RSVP content from a file management interface (e.g., Windows Explorer™) or a homescreen may result in the "global" content being displayed using RSVP. It should be noted that in such an embodiment, viewing the "global" RSVP content does not require opening the file with an associated application.

If the user chooses to add "global" RSVP content, an interface which allows the user to input textual content, which will be embedded as "global" RSVP content is displayed in step 1706. In the embodiment described above where "global" content includes a description of the file, the "global" content may be provided in the metadata of the file. For example, a user may right-click the file icon, select an option to enter an RSVP description for the file, and input the textual content.

User input including textual content may be received in step 1708. In embodiments where text input is required, text input may be provided using a virtual (i.e., touch screen) or physical keyboard, mouse, trackball, etc. Alternatively, or in addition, the user may provide voice/speech input via a microphone. The voice/speech input may then be converted to text. If the user chooses to add "local" RSVP content, an interface which allows the user to specify location(s), element(s), and/or text selection, and add the corresponding textual content, which will be embedded as "local" RSVP content is displayed in step 1710. For example, the user may specify locations on photos, maps, etc., specify elements or objects in photos, diagrams and presentations, etc. User input including specified location(s), element(s), and/or text selection, and add the corresponding textual content may be received in step 1712. In one embodiment, the interface may also allow selection of text such that RSVP content may be associated with the selected text. In the case of a photo, in addition to specifying locations on the photo, the user may select areas of the photo, such as, for example a face of a person. The location(s), element(s), and/or text selection information and the corresponding textual content may be saved in step 1714. In one embodiment, location(s), element(s), and/or text selection information and the corresponding textual content may be saved in the meta data of the file. For example, in the case of a photo, the location(s), element(s), and/or text selection information and the corresponding textual content may be saved in the EXIF data. In one embodiment, the textual content may be saved as plain text, in which case, the textual data may be converted to RSVP content (e.g., text that is configured to be displayed using RSVP) prior to displaying. In other embodiments, the textual content may be converted to RSVP content, and the RSVP content may be saved in the meta data of the file.

Figure 18A:
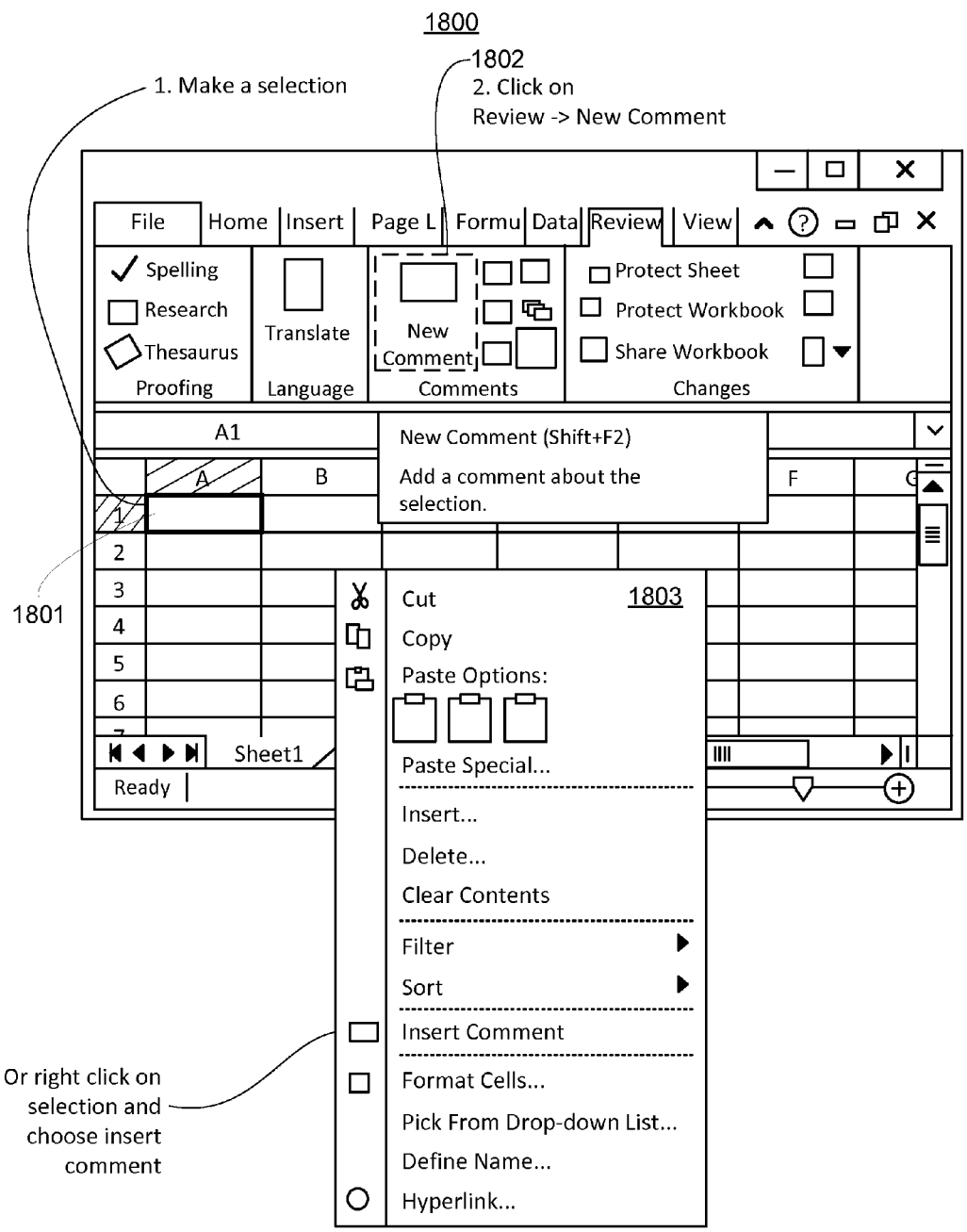
FIGS. 18a and 18b illustrate screenshot diagrams of an exemplary spreadsheet application interface illustrating a process of embedding RSVP content in a spreadsheet document in accordance with one embodiment of the present invention.
Figure 18B:
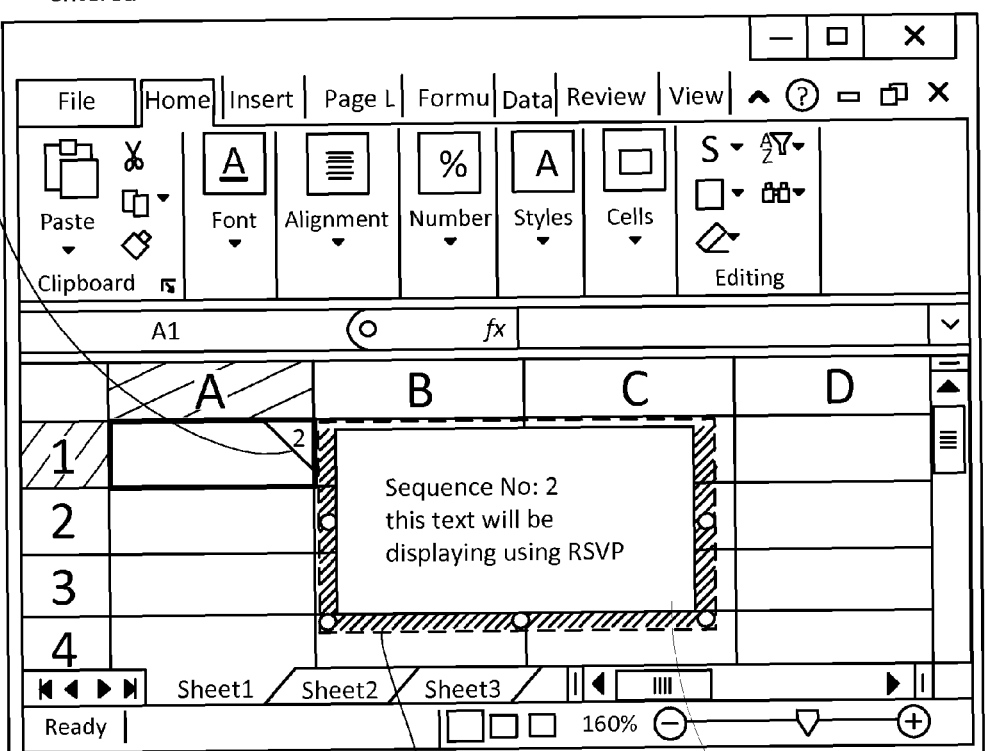

FIGS. 18*a* and 18*b* illustrate screenshot diagrams of an exemplary spreadsheet application interface illustrating a process of embedding RSVP content in a file such as for example, a spreadsheet document in accordance with one embodiment of the present invention. RSVP content may be embedded as a comment on any cell in a spreadsheet document. To embed RSVP content, a cell 1801 may be selected as shown in FIG. 18*a*. Once selected, a user may click on for example, "New Comment," icon 1802 or may right-click on the cell. Right-clicking on the cell may display a menu, from which "Insert Comment" may be selected. Selecting "New Comment" or "Insert Comment" may result in the display of input field 1804 as shown in FIG. 18*b*. The user may specify a sequence number for the comment, if any, and provide the text for the comment in input field 1804. The text entered into input field 1804 is displayable using RSVP. In one embodiment, the content of every cell and/or every comment corresponding to a cell may be displayable using RSVP. Optionally, a notification marker/icon may be displayed indicating the presence of content or a comment including RSVP content. A process similar to that shown in FIGS. 18*a* and 18*b* may be used to embed RSVP content in a word processing document. For example, text may be selected, and a corresponding comment may be input by a user. The comment may then be embedded in the word processing document, and may subsequently be displayed in a DRDA using RSVP upon user selection of the comment.

Figure 19:
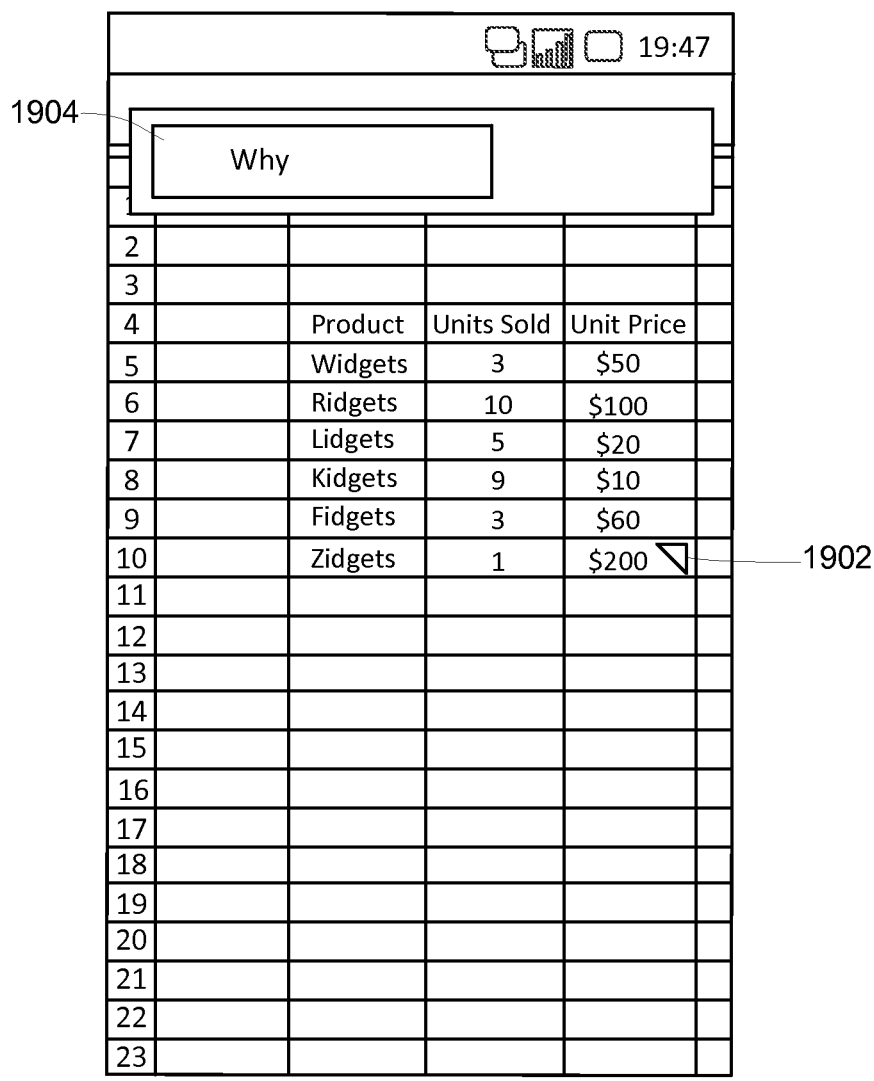
FIG. 19 illustrates a screenshot diagram of an exemplary spreadsheet application interface including a designated RSVP display area in accordance with one embodiment of the present invention.

FIG. 19 illustrates a screenshot diagram of an exemplary spreadsheet application interface including a designated RSVP display area in accordance with one embodiment of the present invention. Screenshot 1900 illustrates a spreadsheet application interface including DRDA 1904 displaying RSVP content that was embedded in the spreadsheet document. As shown, notification marker/icon 1902 indicates presence of RSVP content associated with the corresponding cell. In addition, notification marker/icon 1902 may also include a numerical indicator (not shown). Upon user selection of notification icon/marker 1902, DRDA 1904 may be displayed, and the corresponding RSVP content may be displayed in DRDA 1904. In one embodiment, the spreadsheet application may be configured to allow the content and/or comments corresponding to all cells to be displayed using RSVP whether or not an author has specially embedded content designated for RSVP display. In such an instance, notification markers/icons indicating presence of RSVP content may not be displayed. A user may for example, "touch and hold" a cell, and as a result, DRDA 1904 may be displayed. The corresponding content and/or comment may then be displayed using RSVP in DRDA 1904.

Figure 20D:
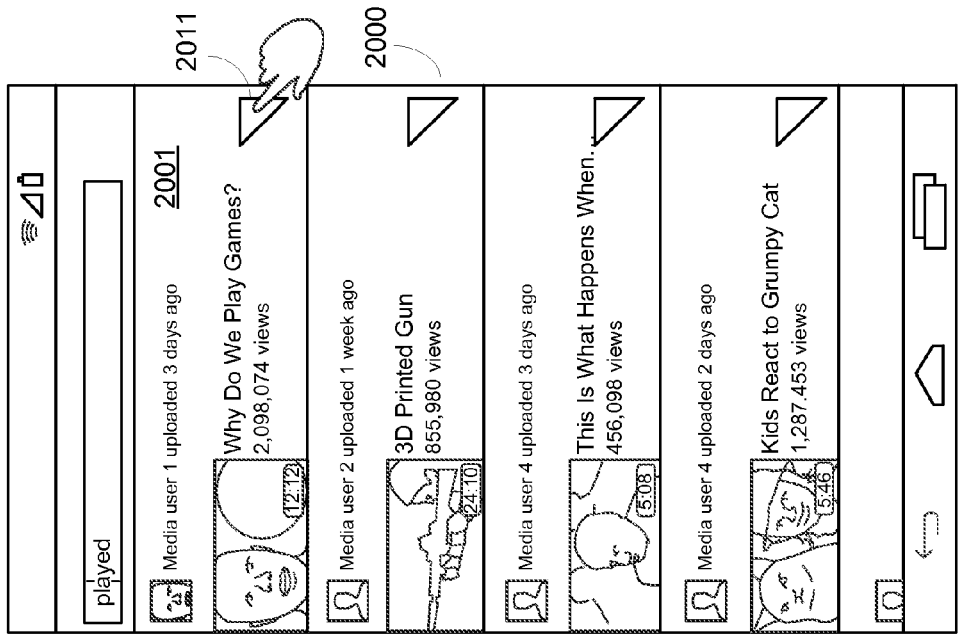

FIGS. 20*a*-20*d* show screenshot diagrams of an exemplary video item listing window in accordance with one embodiment of the present invention. FIG. 20a shows a web application window 2000 (which may correspond to a web page) including a list of featured video items within a browser-based video content application. Video item listings with links to corresponding video content are provided by many different known video content applications, e.g., YouTube™. However, in the illustrated embodiment, the video item listing is supplemented by providing access to related RSVP content. As shown, a list is displayed of featured video item representations 2001, 2002, 2003, and 2004. Markers/icons 2011, 2012, 2013, and 2014 are displayed with, respectively, video item representations 2001, 2002, 2003, and 2004. Each marker indicates the presence of RSVP content associated with the corresponding video item.

Figure 20C:
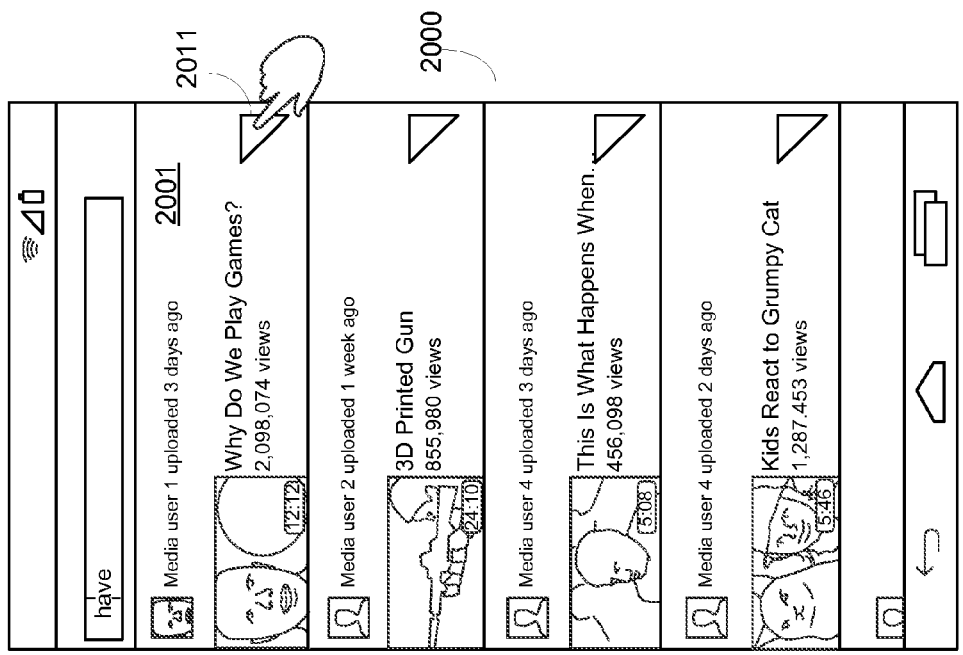

As shown in FIG. 20b, upon user selection of notification marker 2011, DRDA 2020 may be displayed and, as shown in FIGS. 20b-20d, RSVP content related to video item 2001 is displayed in DRDA 2020. FIGS. 20b-10d show time-sequence snapshots of the content displayed in DRDA 2020. For example, FIG. 20b shows that DRDA 2020 displays the word "People" at a first time; FIG. 20c shows that DRDA 2020 displays the word "have" at a next time; and FIG. 20d shows that DRDA 2020 displays the word "played" at third time.

As shown in FIGS. 20a-20d, this embodiment allows a user to receive more information about a particular video within the context of a small-screen display before deciding whether to leave window 2000 and navigate to a new window related to a particular video item. The application interface is able to continue displaying window 2000 including the illustrated list of video items while displaying additional information about a selected video item in DRDA 2020. This may be particularly useful in the context of video content applications because once the decision is made to view a particular video, a large data stream may be initiated which can take significant time to display and can also spend a significant quantity of data against monthly maximums or otherwise incur additional charges for a user. Also, it might be useful for a user to be able to quickly and easily obtain information about a particular video via RSVP text content without having to leave display of window 2000 so that a user can quickly learn additional information about several videos before selecting a video for viewing.

Although window 2000 shows a list of featured video items, in alternative embodiments, window 2000 may display a list of video items in response to a user search, or it may display items automatically recommended for a particular user.

FIGS. 21a-21g illustrate the playing of a video supplemented by RSVP content, the video and associated RSVP content being displayed by an embodiment of the present invention.

Figure 21A:
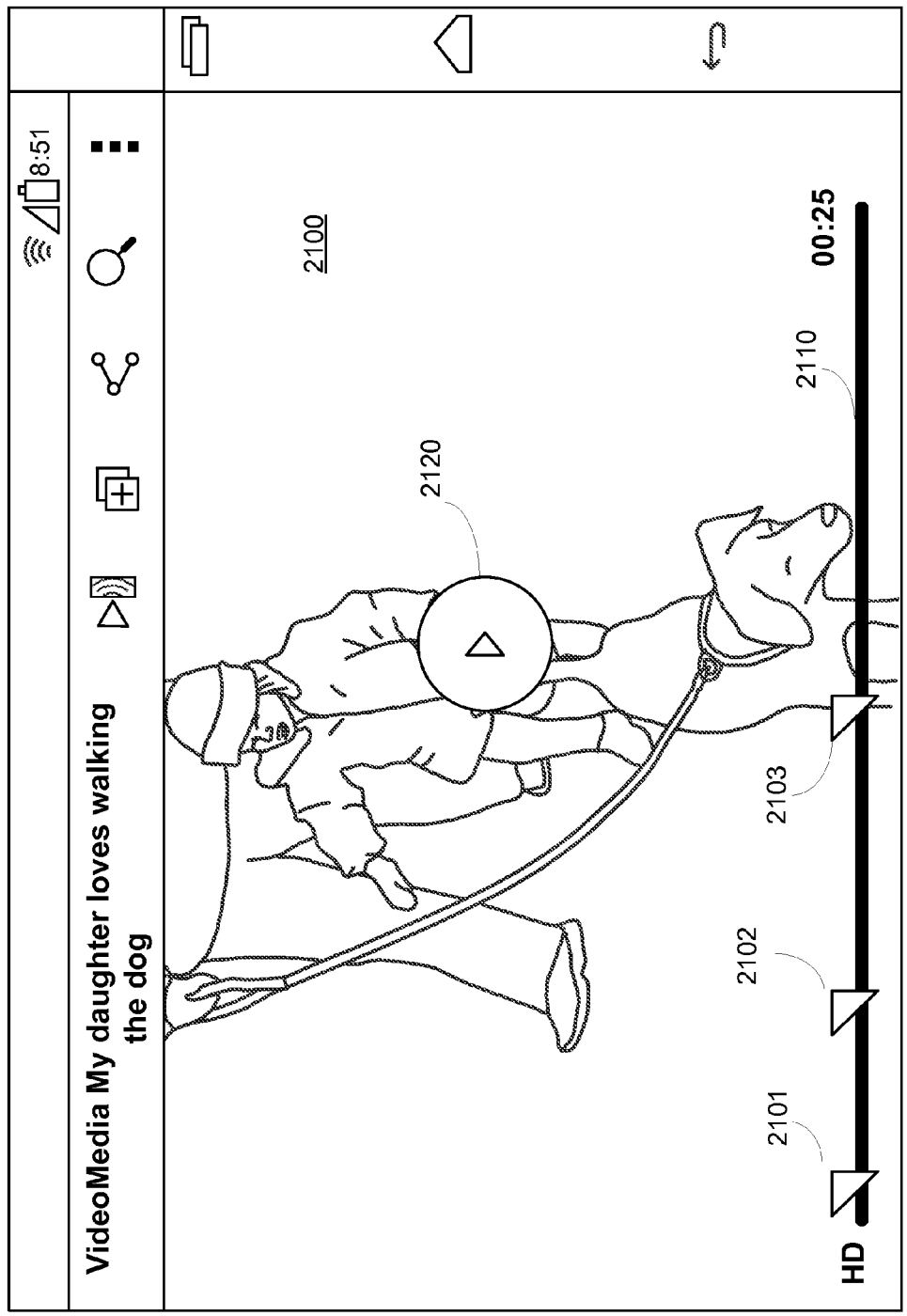
FIGS. 21a-21g illustrate the playing of a video supplemented by RSVP content, the video and associated RSVP content being displayed by an embodiment of the present invention.

In FIG. 21a, shows video display window 2100 displaying an initial frame of the video "My daughter loves walking the dog." As shown, display window 2100 includes progress bar (timeline bar) 2110. Markers 2101, 2102, and 2103 are displayed along progress bar 2110 to indicate time points in the video that are associated with RSVP content.

When a user selects start icon 2120, the video begins playing normally in window 2100. When the video reaches frames associated with RSPV content, the RSVP content associated with the relevant marker 2101, 2102, or 2103 becomes displayable in response to a user selection as shown in subsequent figures.

Figure 21B:
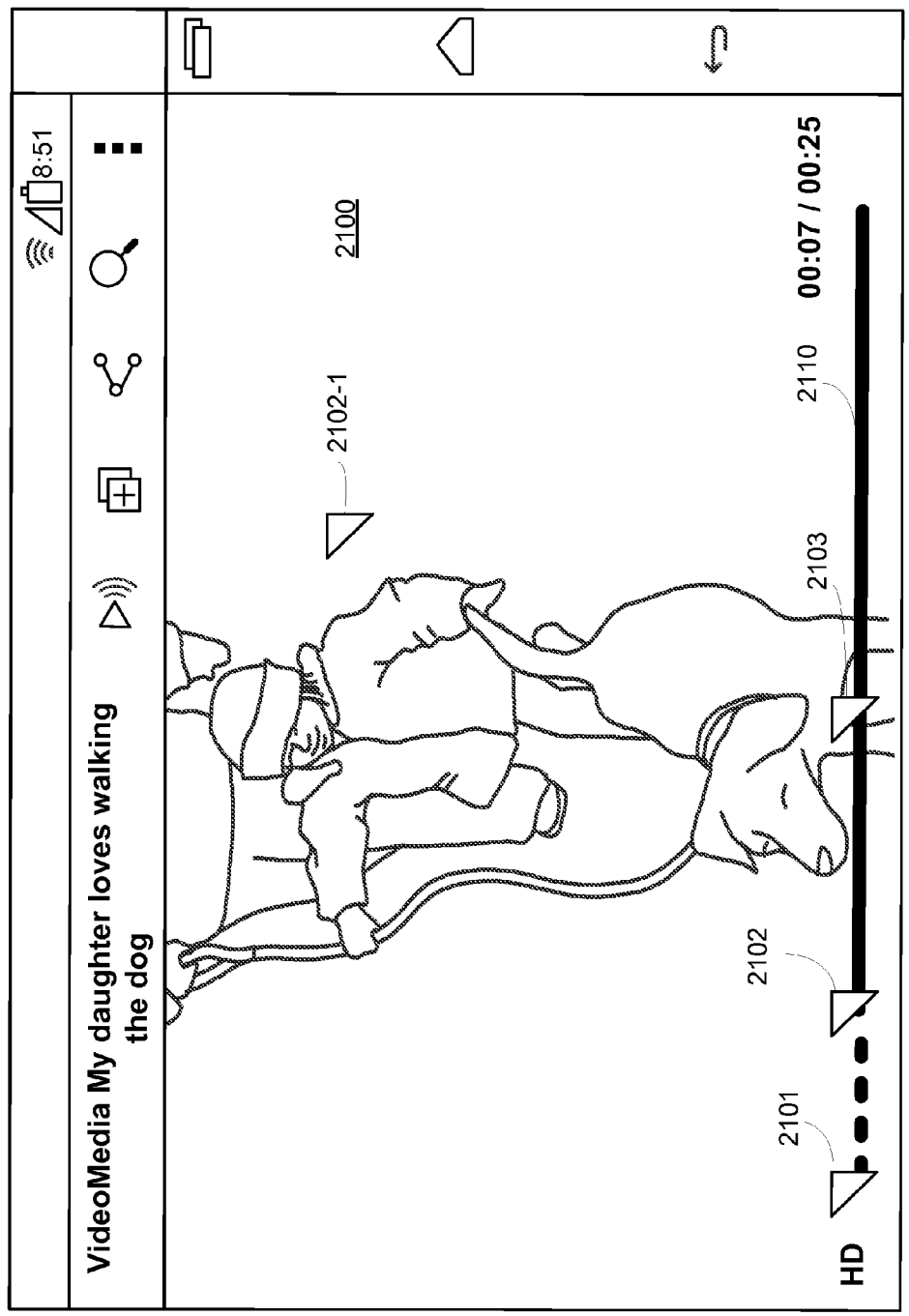
Figure 21C:
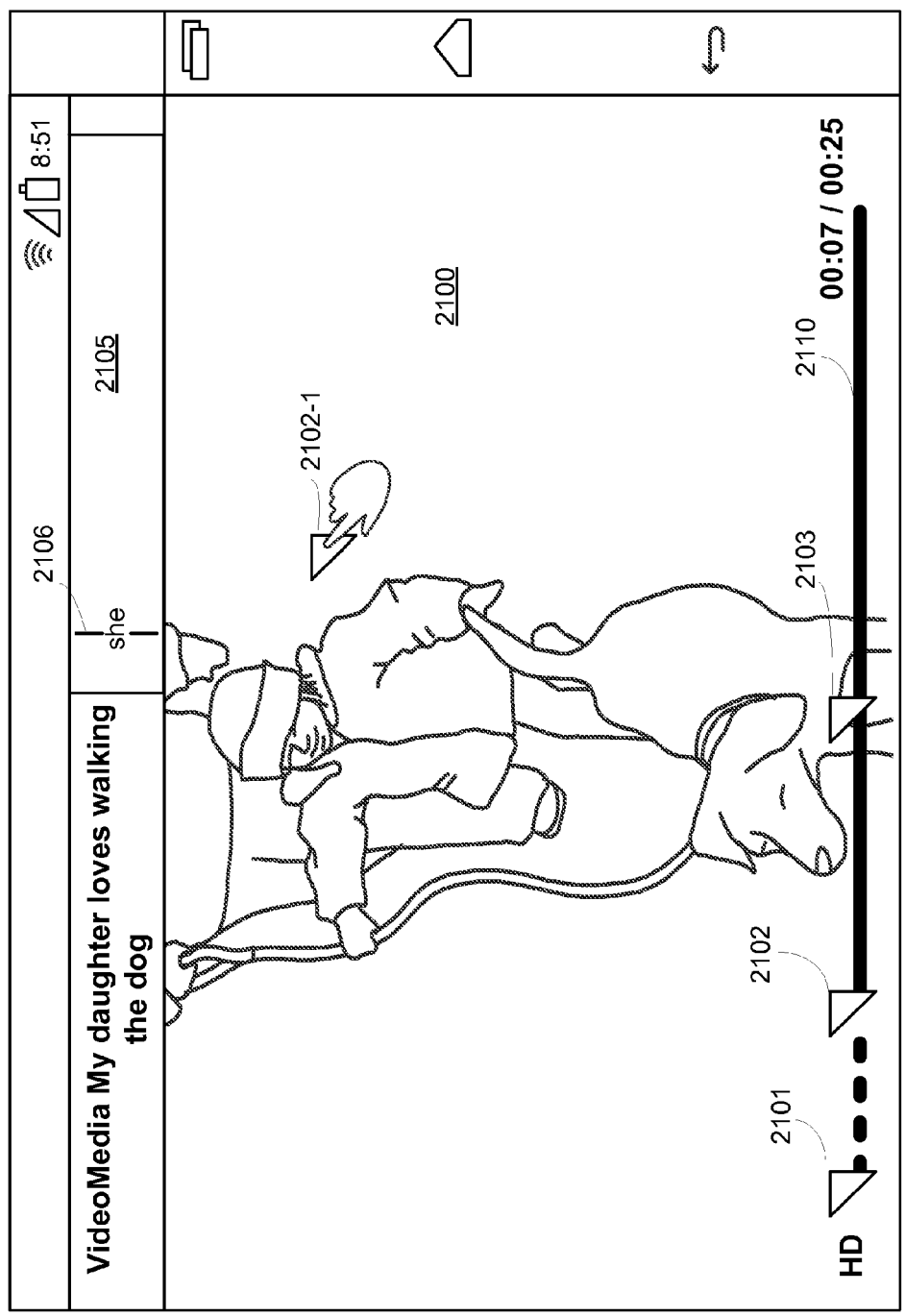
Figure 21D:
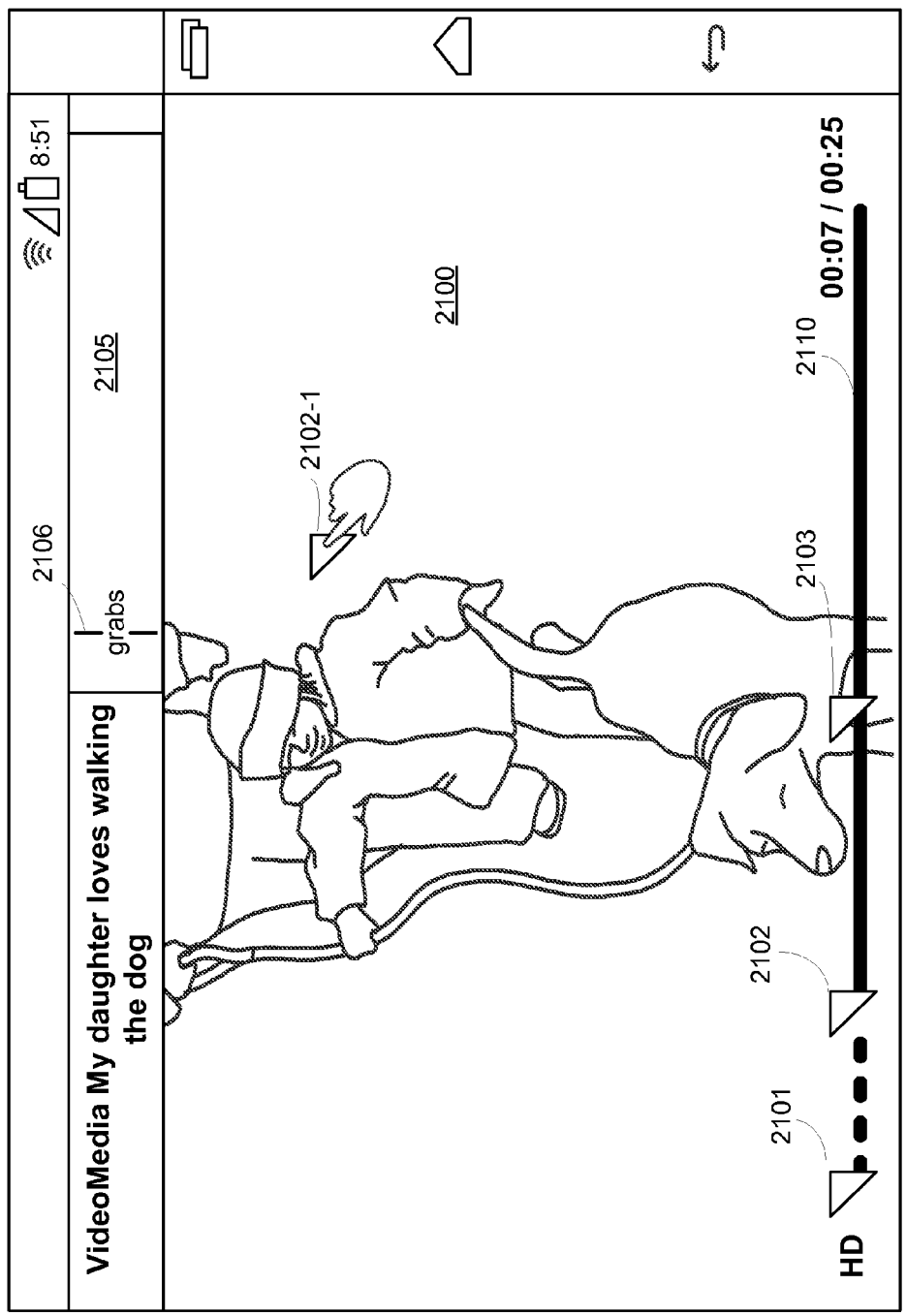
Figure 21E:
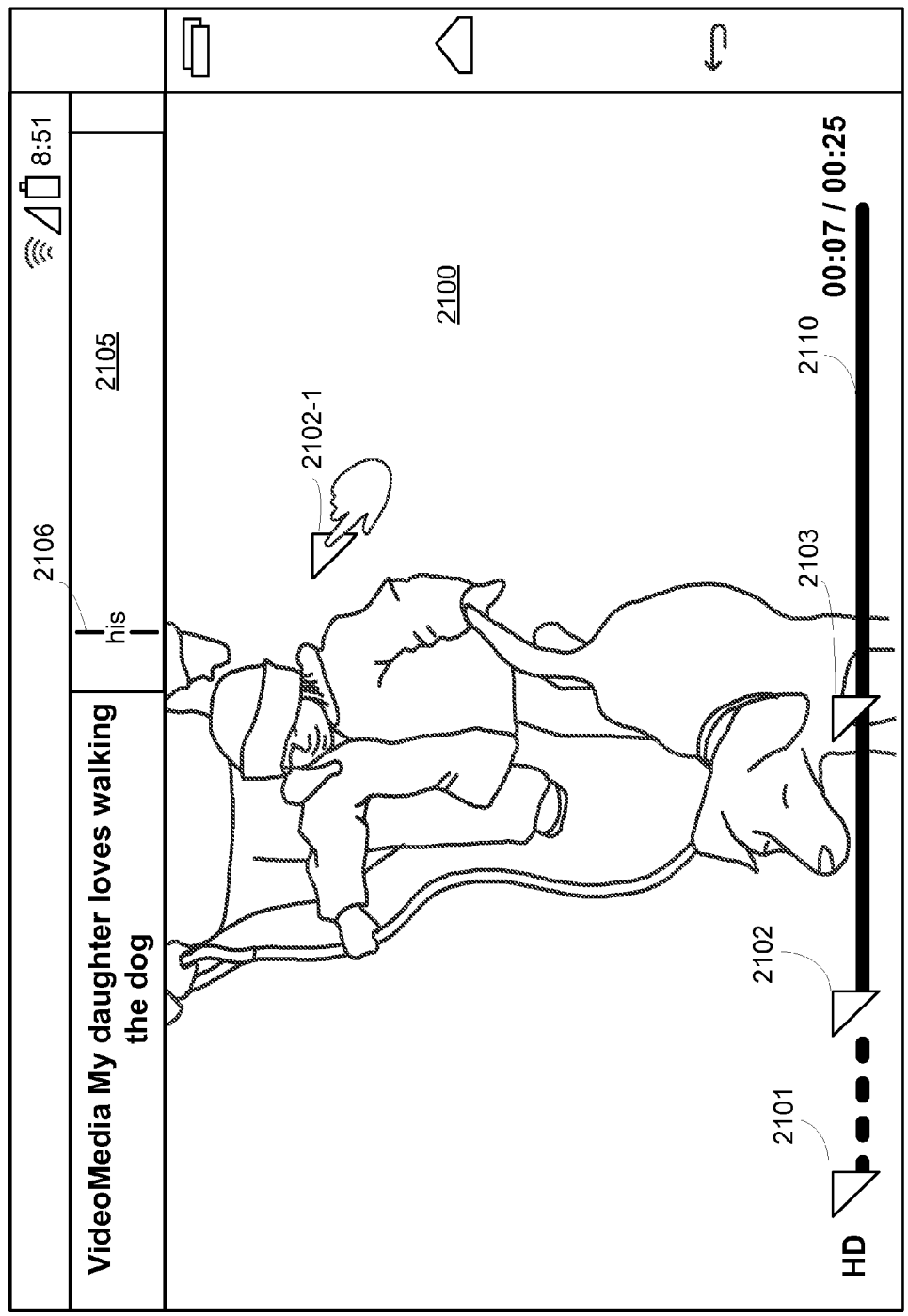
Figure 21F:
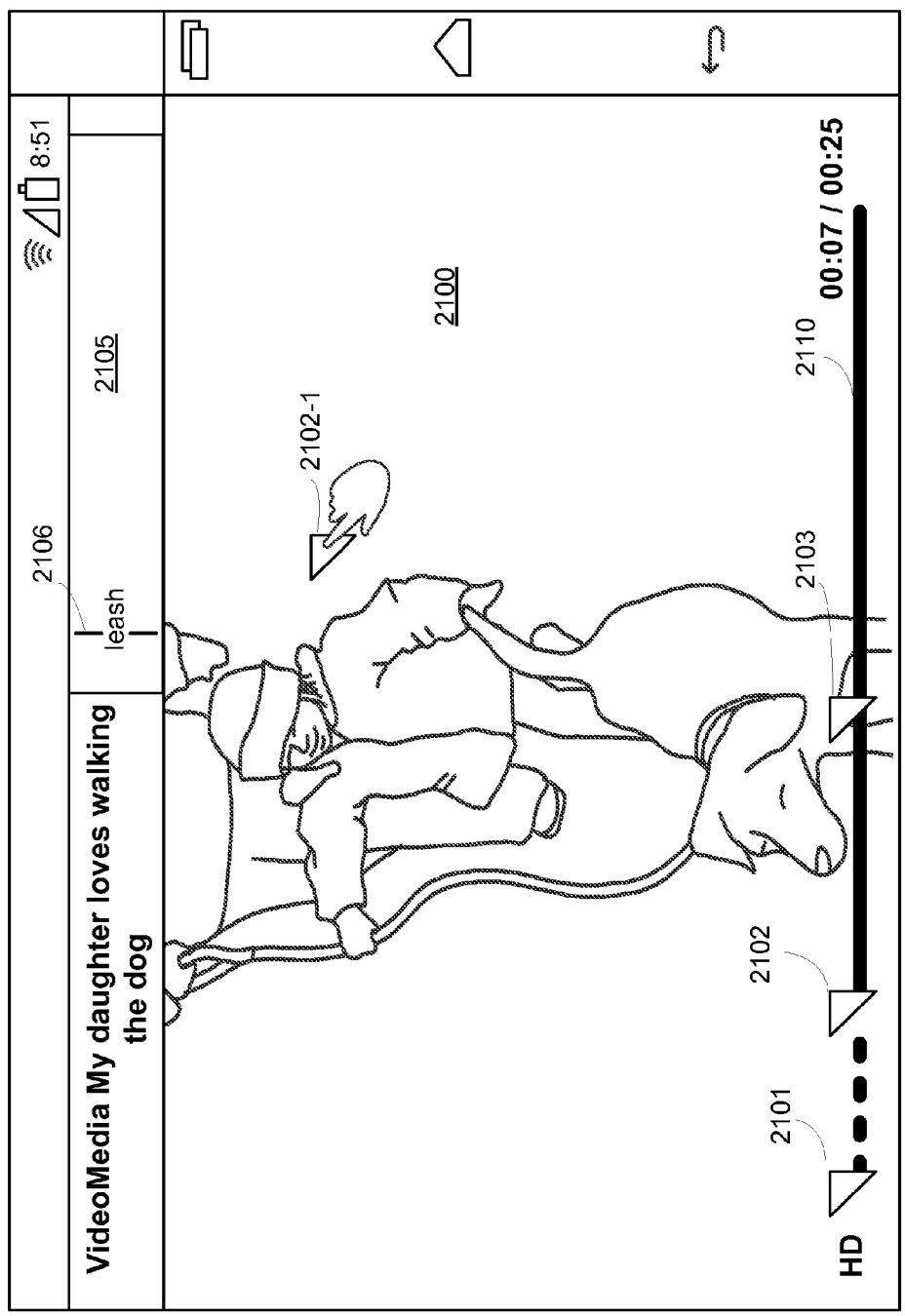

FIG. 21b illustrates the display in window 2100 at seven seconds into the video, which, as shown in the progress bar, corresponds to marker 2102. At this point in the video, window 2100 also displays marker 2102-1 within the video scene to alert the viewer to the presence of RSVP content associated with that time period in the video. As shown in FIG. 21c, when the user selects marker 2102-1, DRDA 2105 appears and begins displaying RSVP content. FIGS. 21c-21f show a time sequence as DRDA displays the content associated with display marker 2102-1. Specifically, FIG. 21c shows display at a first time of the word "she." FIG. 21d shows display at a second time of the word "grabs." FIG. 21e shows display at a third time of the word "his." FIG. 21f shows display at a fourth time of the word "leash." In this particular embodiment, the words are displayed such that an optimal recognition position of each word is at a fixed location within DRDA, the fixed location being indicated by hash marks 2106. In this particular embodiment, the video progress is stopped while the RSVP content is displayed. All the words in the RSVP content associated with marker 2102-1 are displayed while the video is stopped at a frame corresponding to seven second into the video, as shown in FIGS. 21c-21f. However, in alternative embodiments, RSPV content such as that shown in FIGS. 21c-21f could be displayed without stopping the video progress. Because RSVP content allows for faster reading speed than does traditional text presentation, a given amount of text can be presented via RSPV during a video with less time disruption to the viewing of the video than if the text were displayed without using RSVP.

In the illustrated embodiment, RSPV content is displayed in response to a user interaction. However, an alternative embodiment can be configured to display embedded RSVP content automatically at particular time points in a video.

Figure 21G:
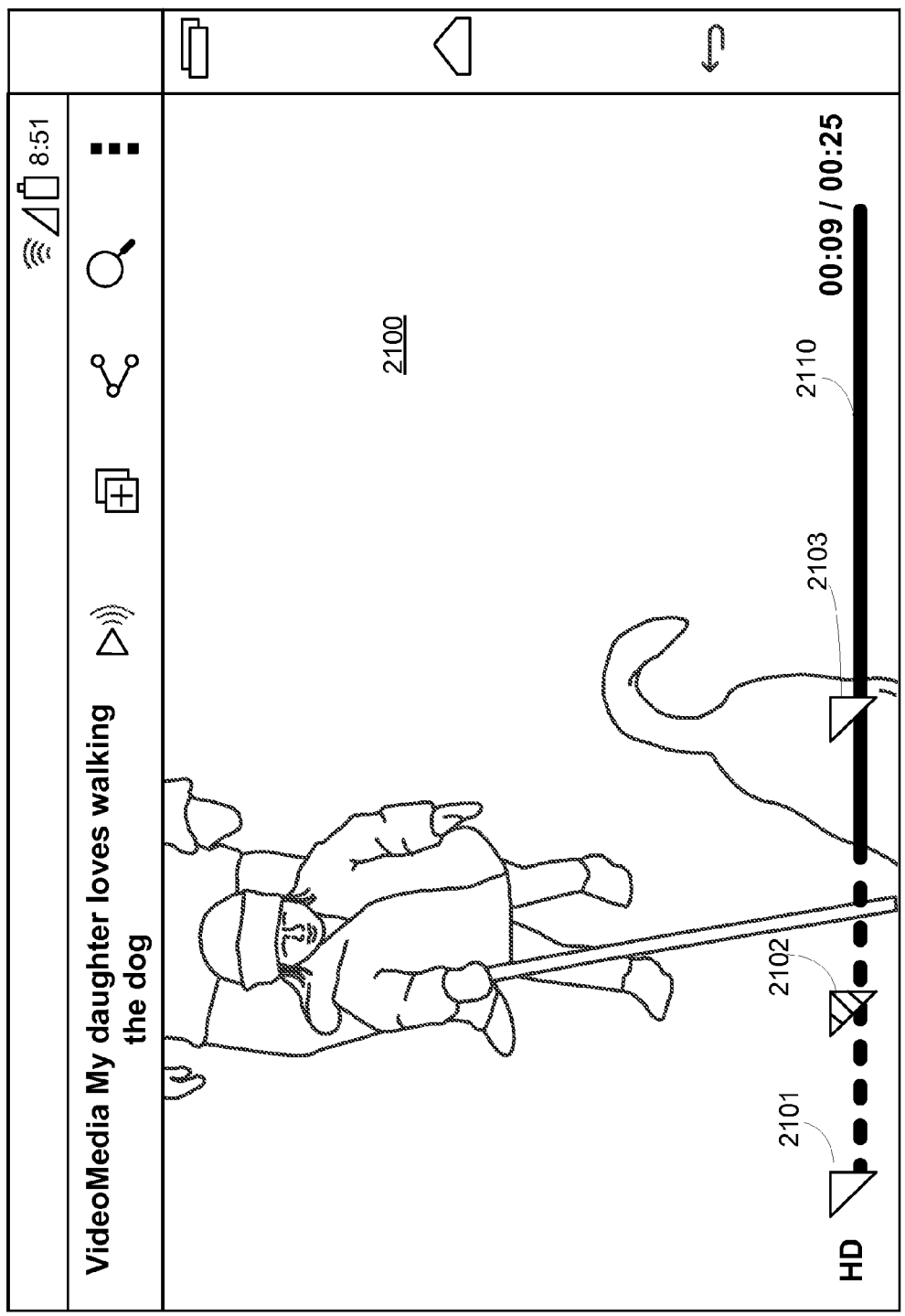

FIG. 21g illustrates the display in window 2100 at nine seconds into the video, which, as shown by progress bar 2110, is past the content associated with marker 2102. Because the RSVP content associated with 2102 has already been selected (by a selection of marker 2102-1) and displayed, marker 2102 is now grayed out to indicate that its associated content has been displayed.

FIGS. 22a-22f illustrate a variation on the example illustrated in FIGS. 21a-21g, the illustrated video and RSVP content being displayed by an embodiment of the present invention.

Figure 22A:
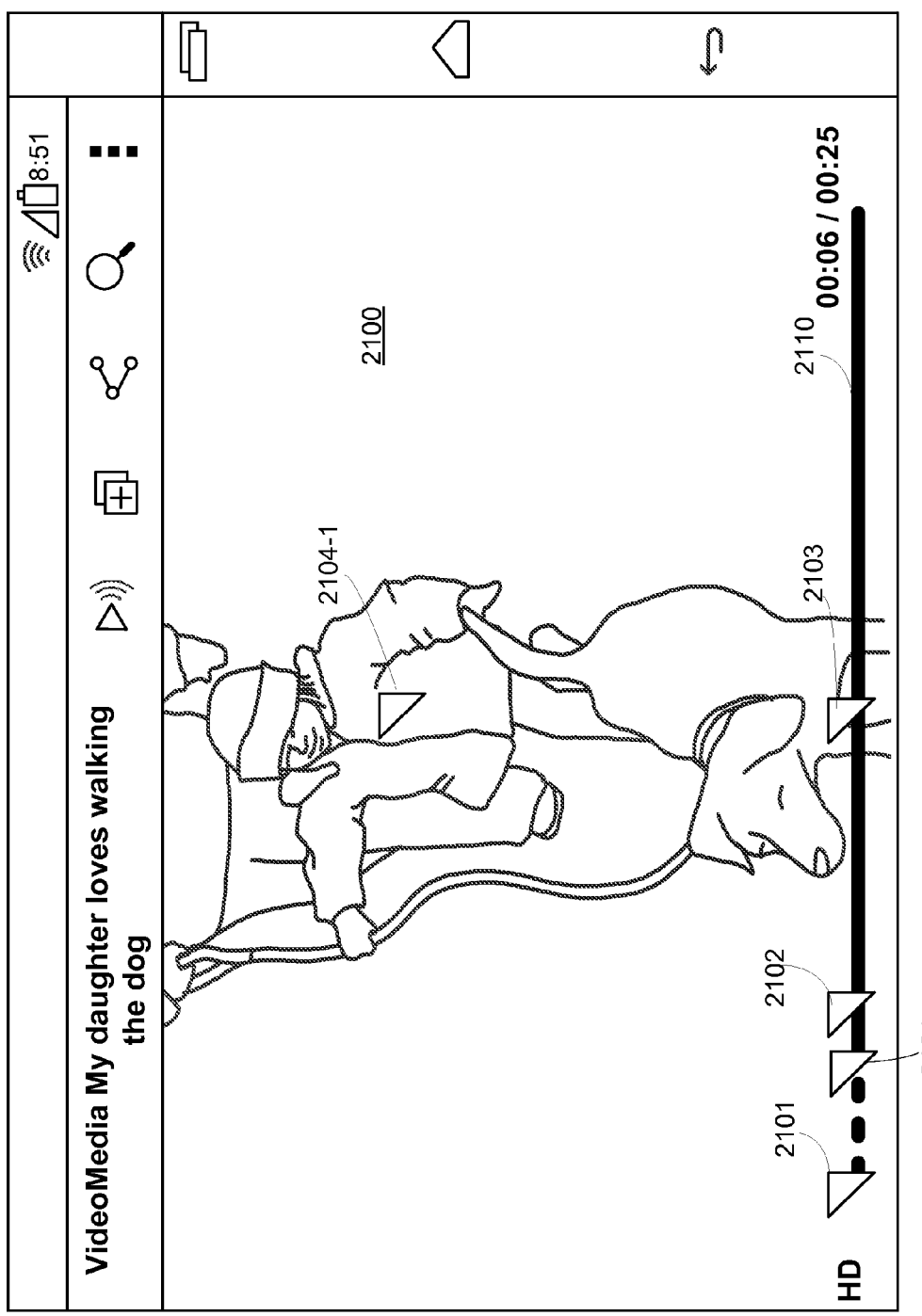
FIGS. 22a-22f illustrate a variation on the example illustrated in FIGS. 21a-21g, the illustrated video and RSVP content being displayed by an embodiment of the present invention

FIG. 22a shows video display window 2100 displaying a frame of the video "My daughter loves walking the dog." The video frame shown in FIG. 22a is at six seconds into the video. In addition to markers 2101, 2102, and 2103 shown on progress bar 2110, window 2100 also displays marker 2104 on progress bar 2110 and related marker 2104-1 on the girl who is an identified object in the video. Marker 2104-1 remains on the identified object while it remains in the frame.

Figure 22B:
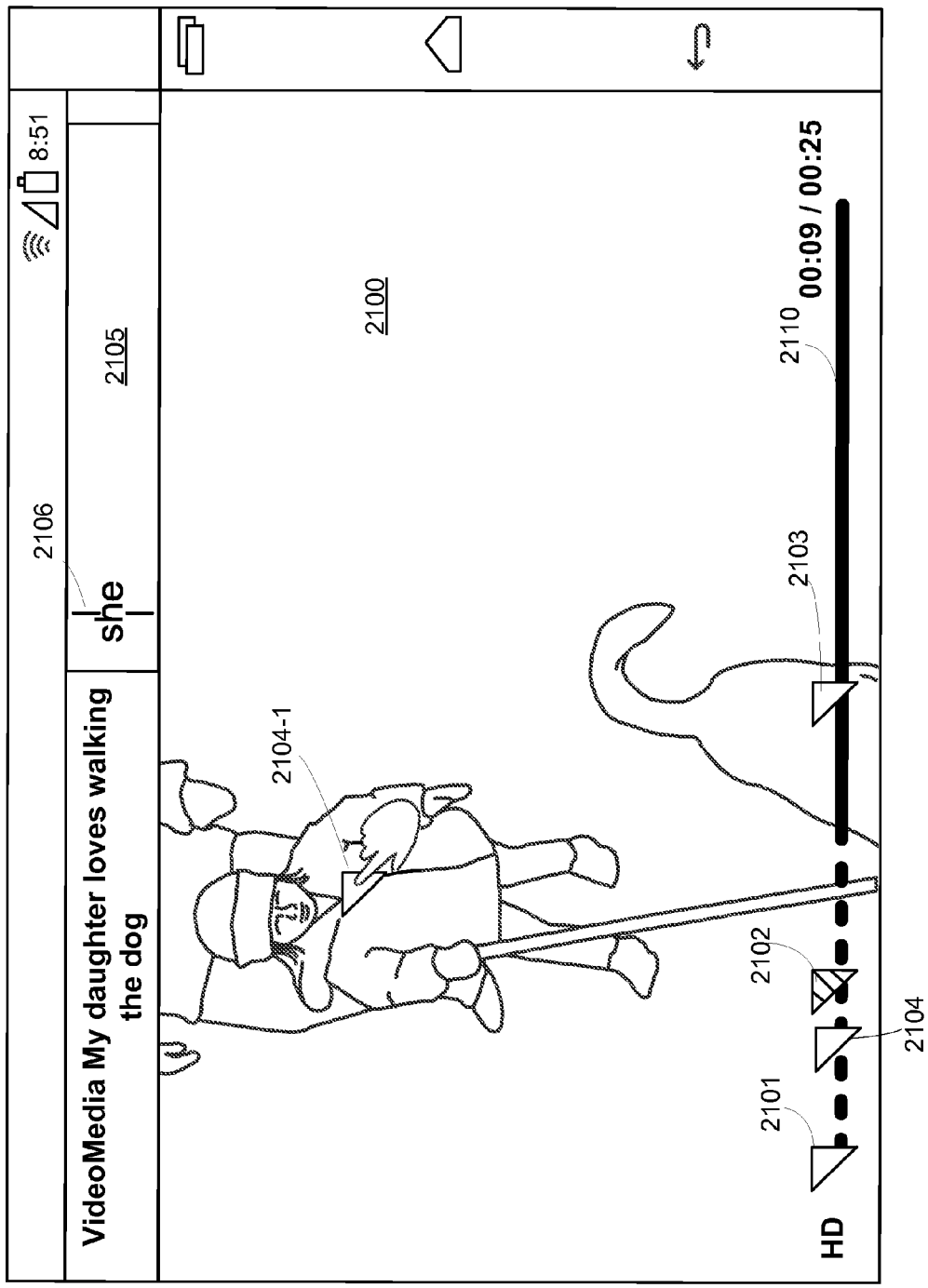
Figure 22C:
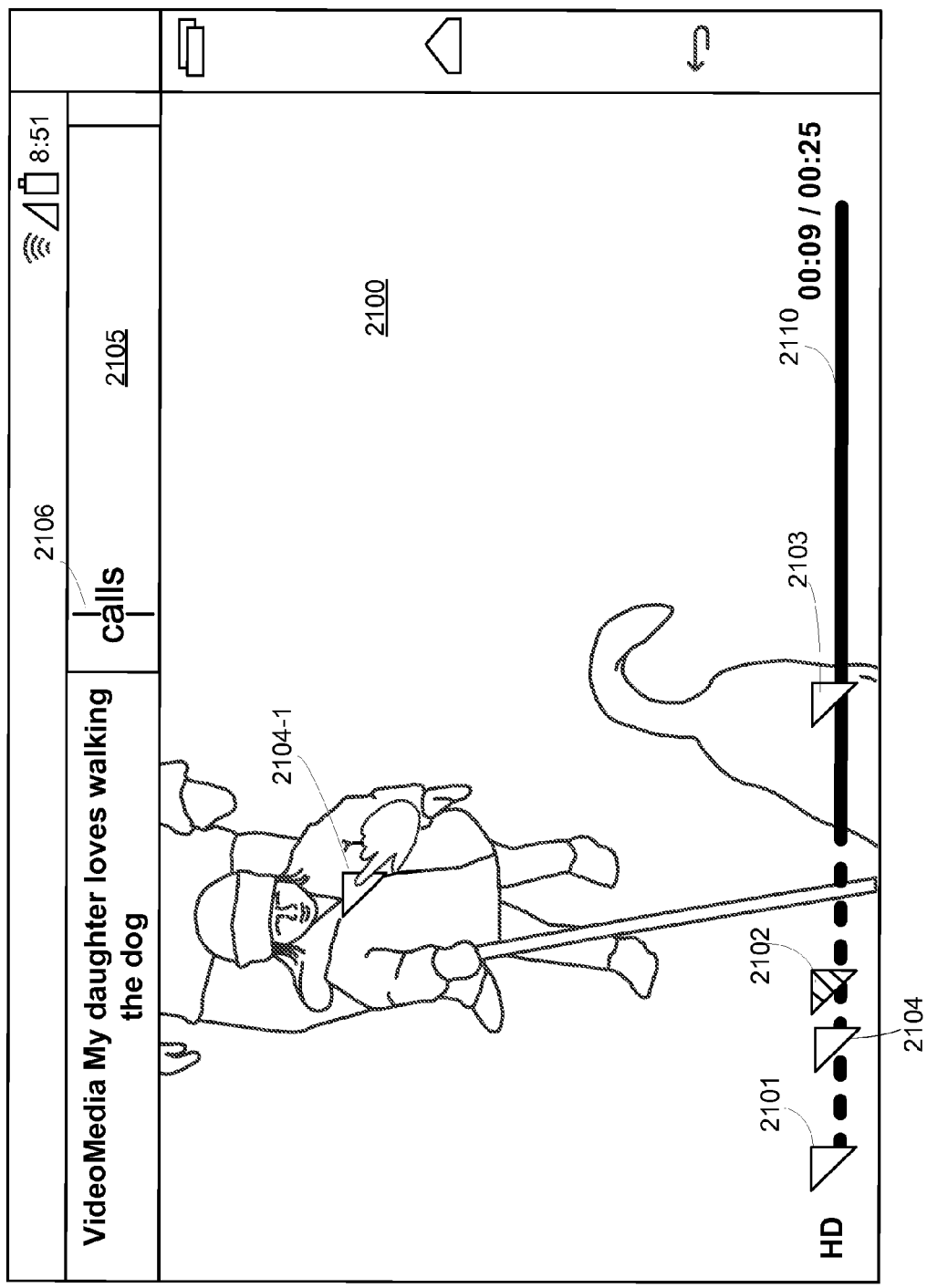
Figure 22D:
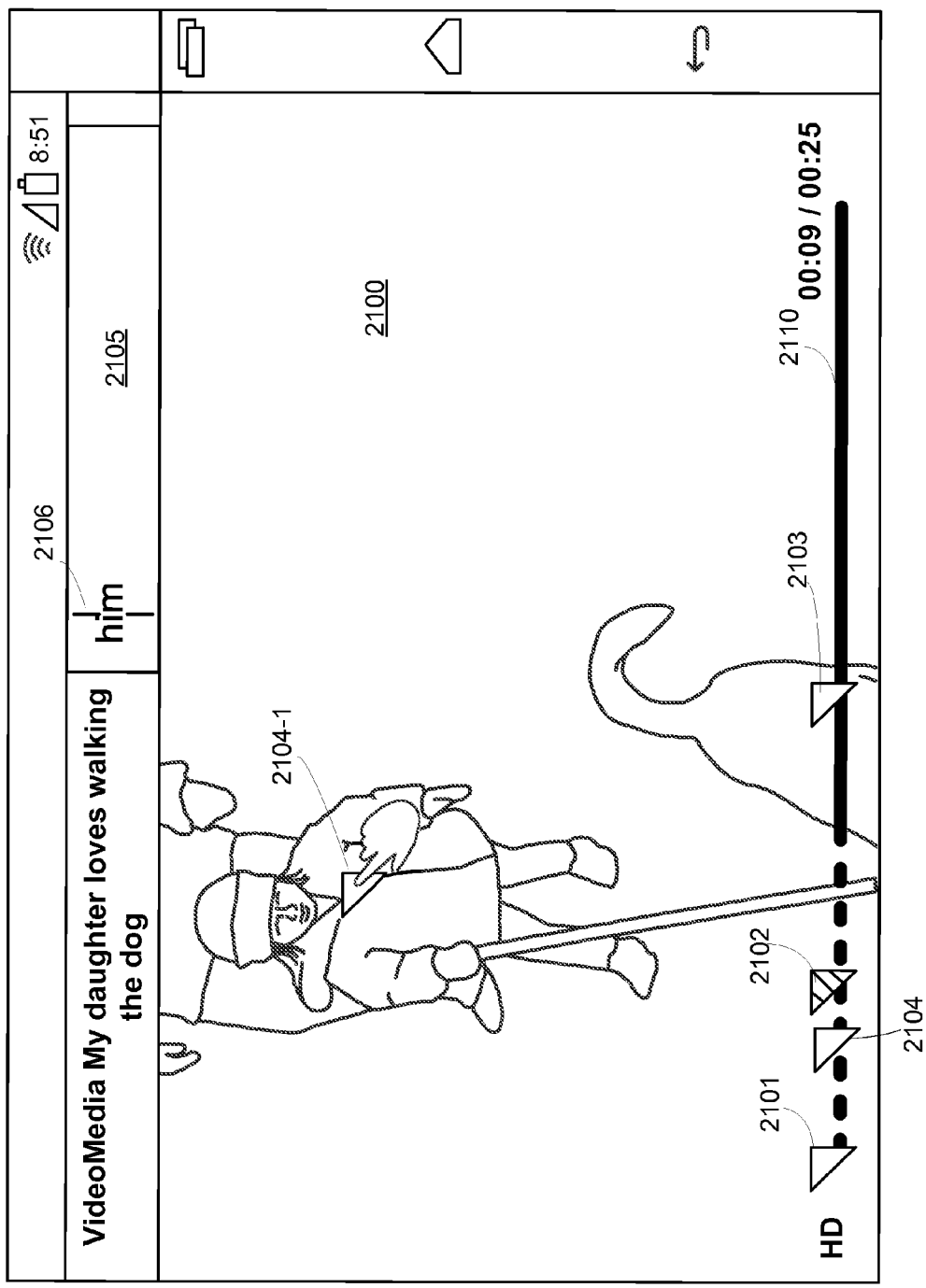
Figure 22E:
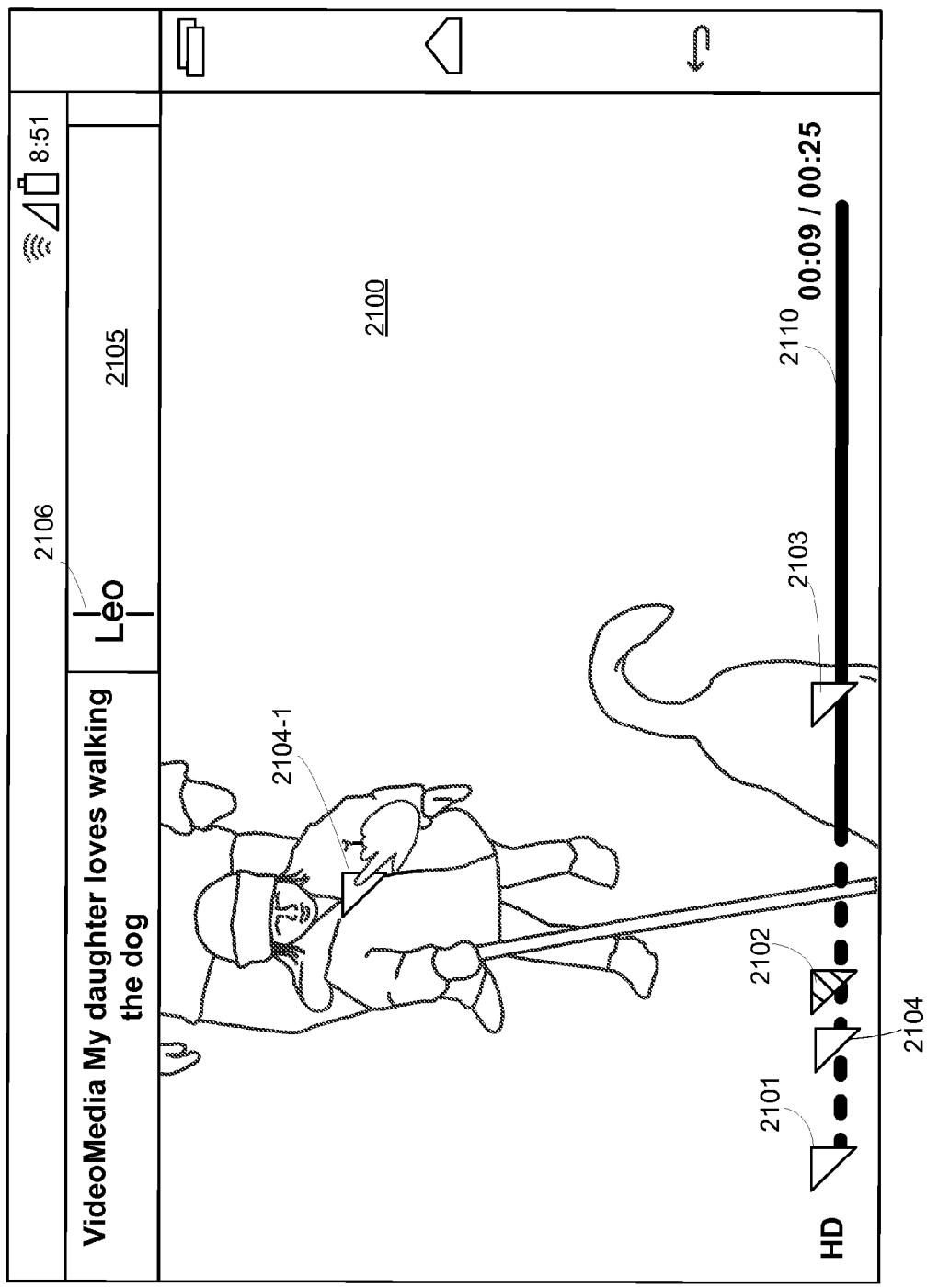

As shown in FIG. 22b, the video has progressed to nine seconds into the video and the RSPV content associated with marker 2102 has already been displayed (in the manner shown in FIGS. 21c-21f). Marker 2104-1 remains displayed on the identified object and it is now selected by a user interface action. As shown in FIG. 22b, when the user selects marker 2104-1, DRDA 2105 appears and begins displaying RSVP content. FIGS. 22c-21e show a time sequence as DRDA displays the content associated with display marker 2104-1. Specifically, FIG. 22b shows display at a first time of the word "she." FIG. 22c shows display at a second time of the word "calls." FIG. 22d shows display at a third time of the word "him." FIG. 22e shows display at a fourth time of the word "Leo." In this particular embodiment, the words are displayed such that an optimal recognition position of each word is at a fixed location within DRDA, the fixed location being indicated by hash marks 2106. In this particular embodiment, the video progress is stopped while the RSVP content is displayed. All the words in the RSVP content associated with marker 2104 are displayed while the video is stopped at a frame corresponding to nine second into the video, as shown in FIGS. 22b-22e. However, in alternative embodiments, RSPV content such as that shown in FIGS. 22b-22e could be displayed without stopping the video progress.

Figure 22F:
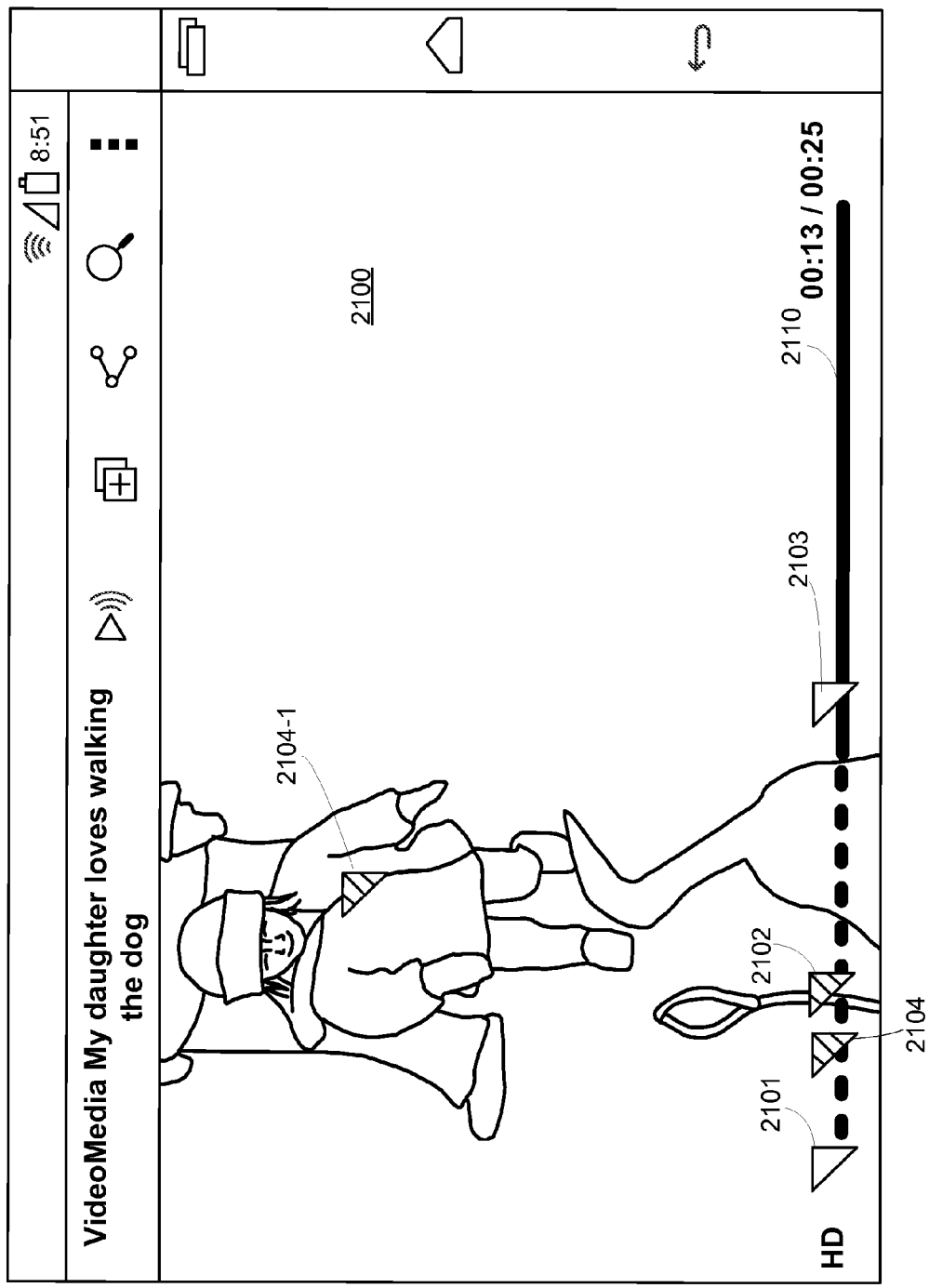

FIG. 22f illustrates the display in window 2100 at thirteen seconds into the video. In this frame, marker 2104-1 is still shown on the identified object (the girl) and it and related marker 2104 are shown as grayed out to indicate that the RSVP content associated with the object marker has already been displayed.

Figure 23A:
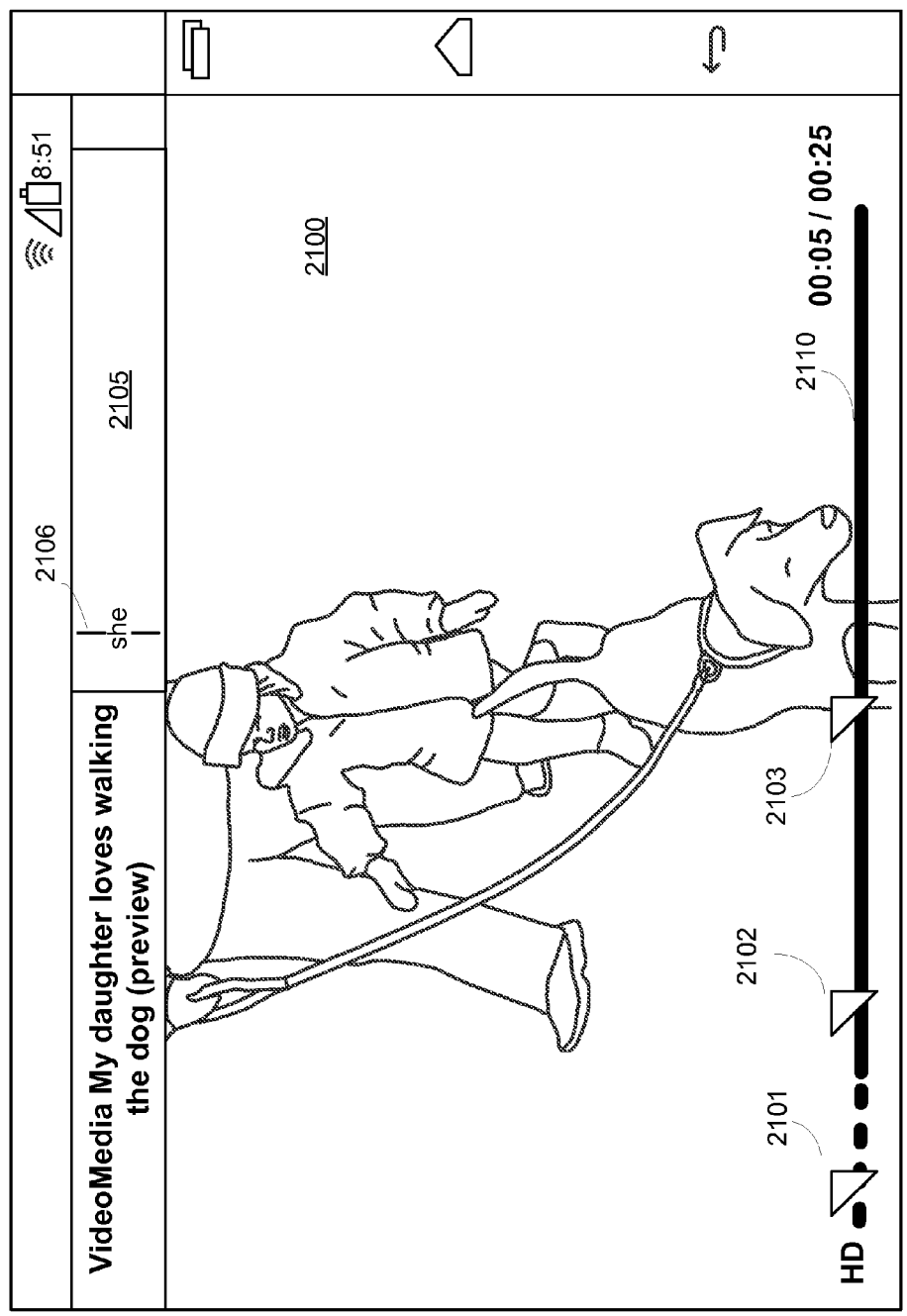
FIGS. 23a-23i show an RSVP-enabled video preview displayed by an embodiment of the present invention.
Figure 23B:
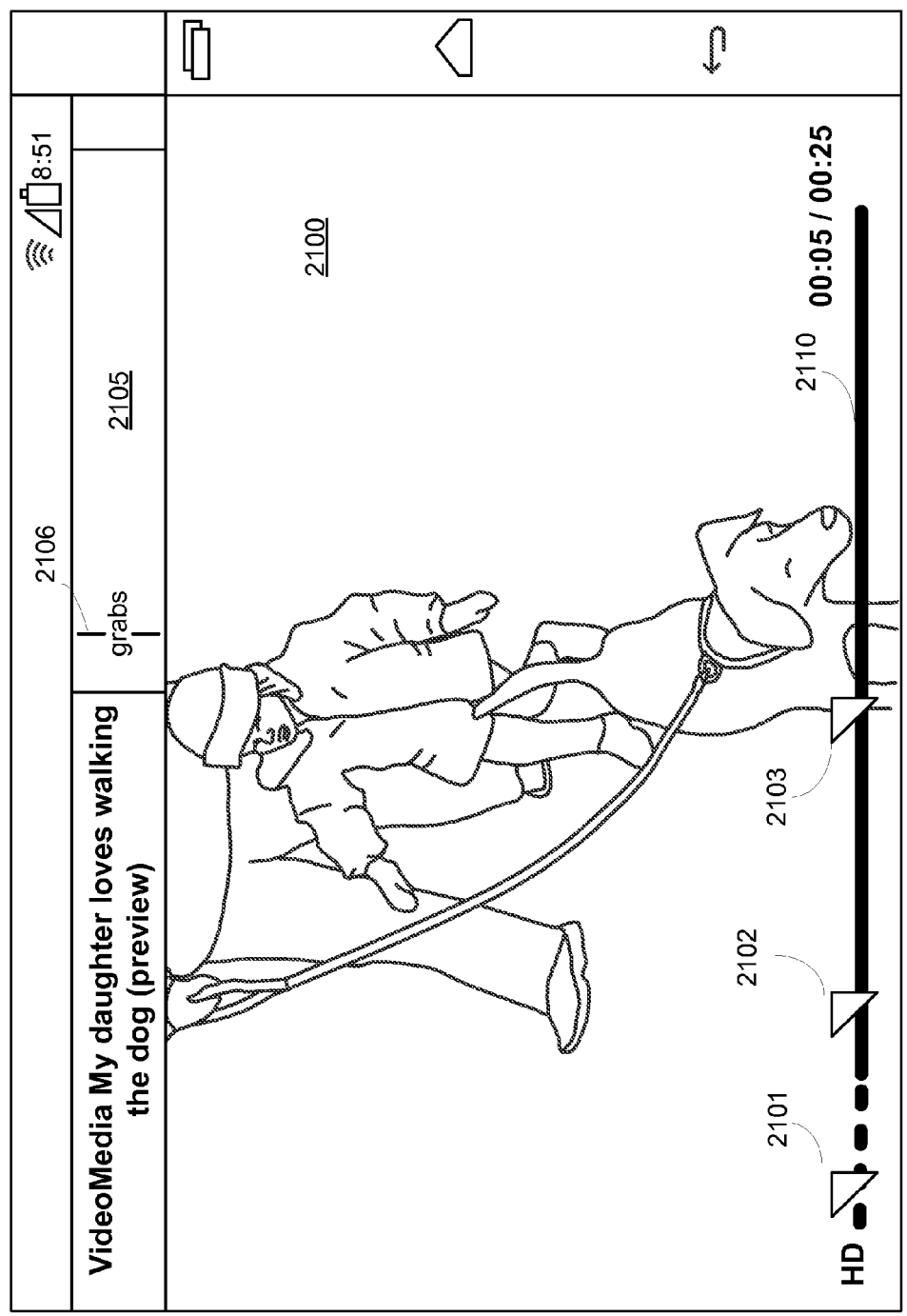
Figure 23C:
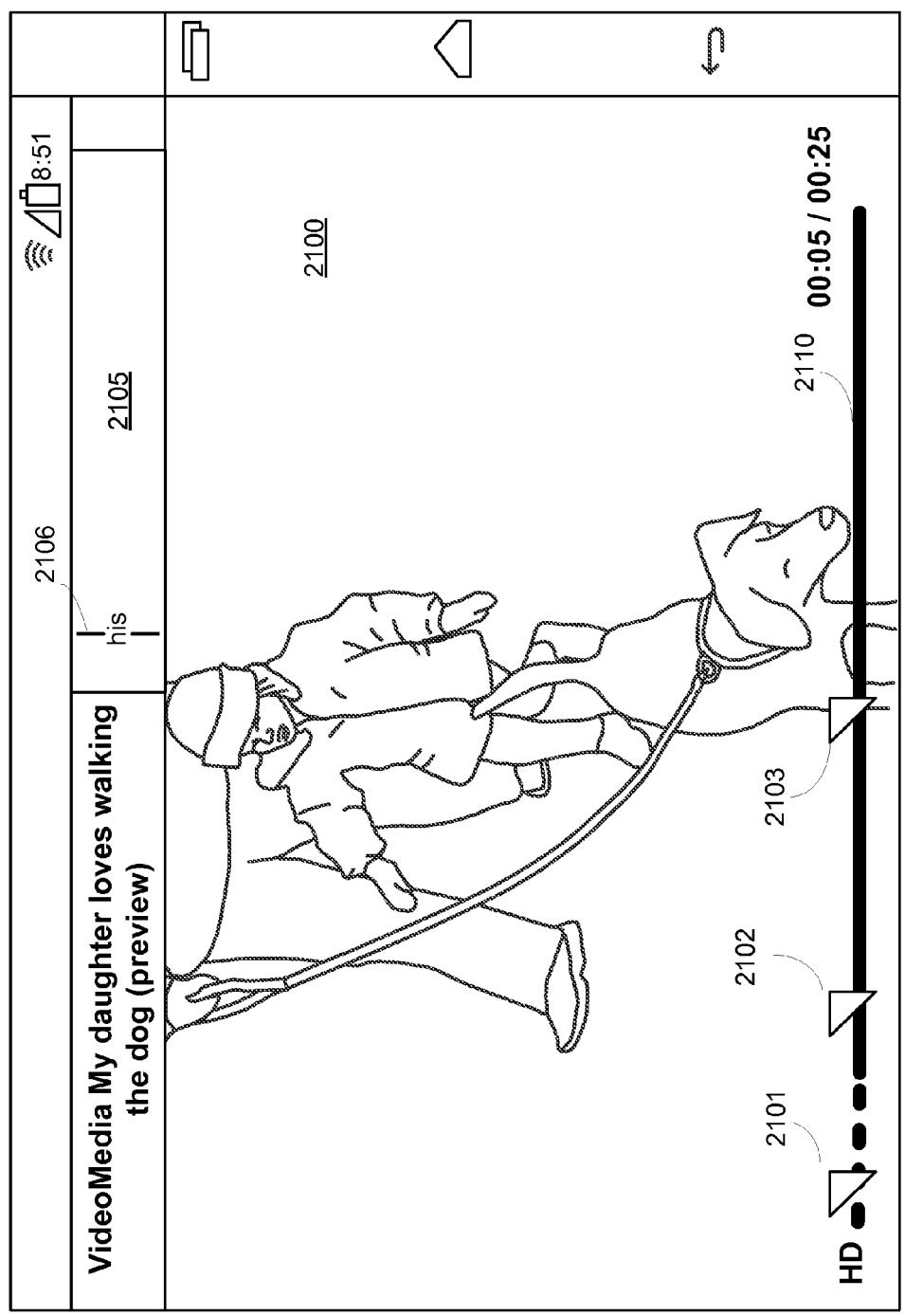
Figure 23D:
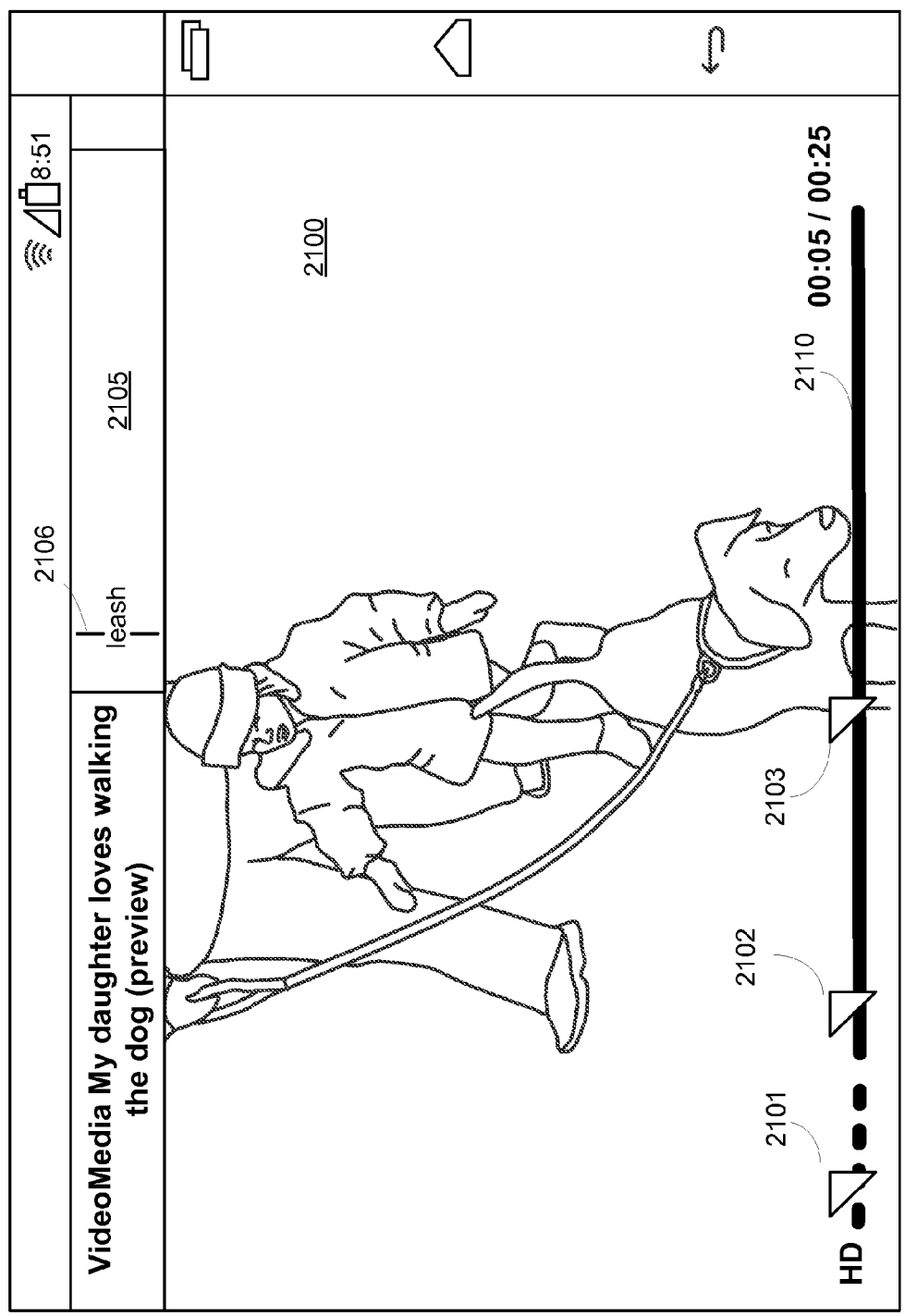
Figure 23E:
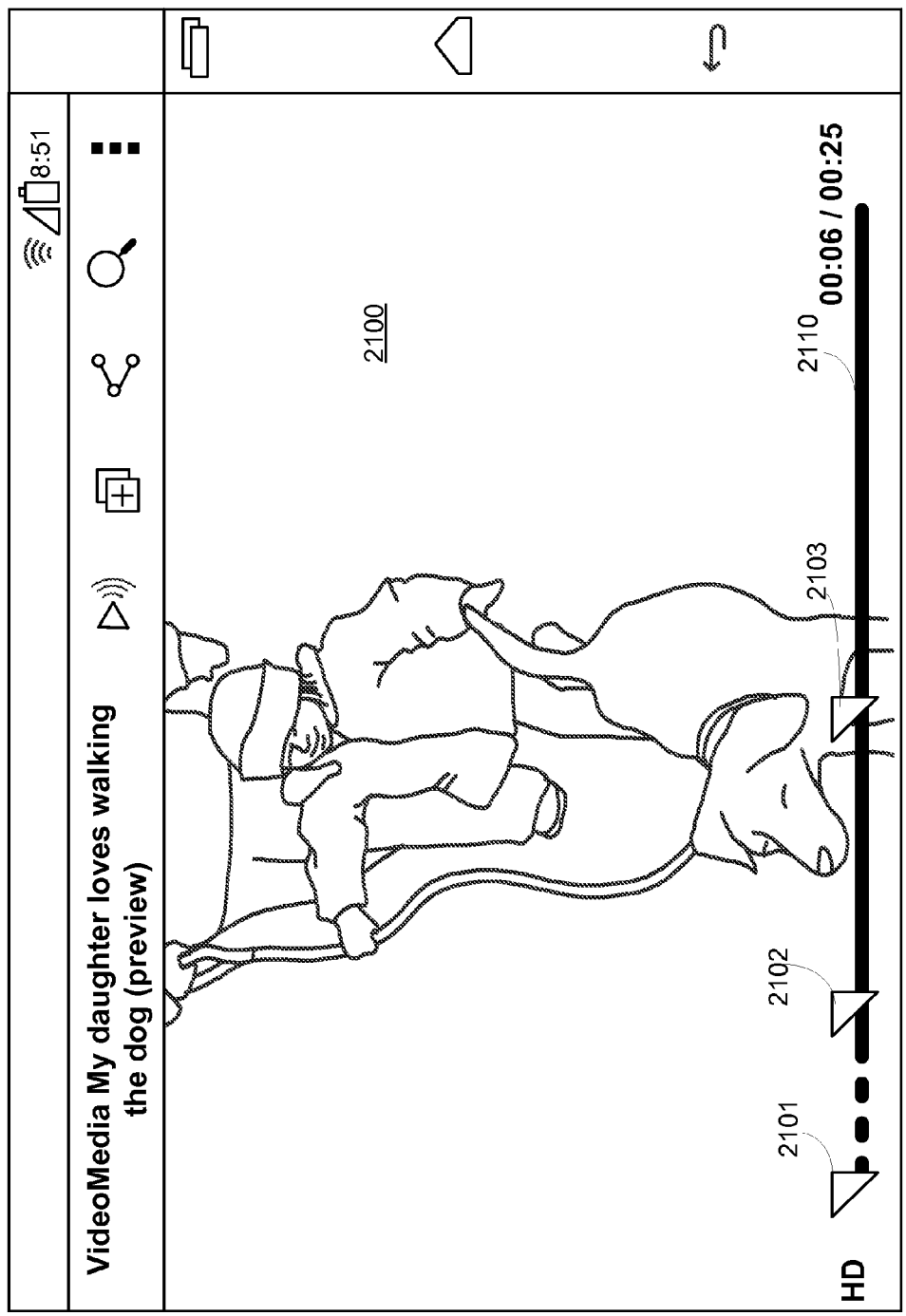
Figure 23F:
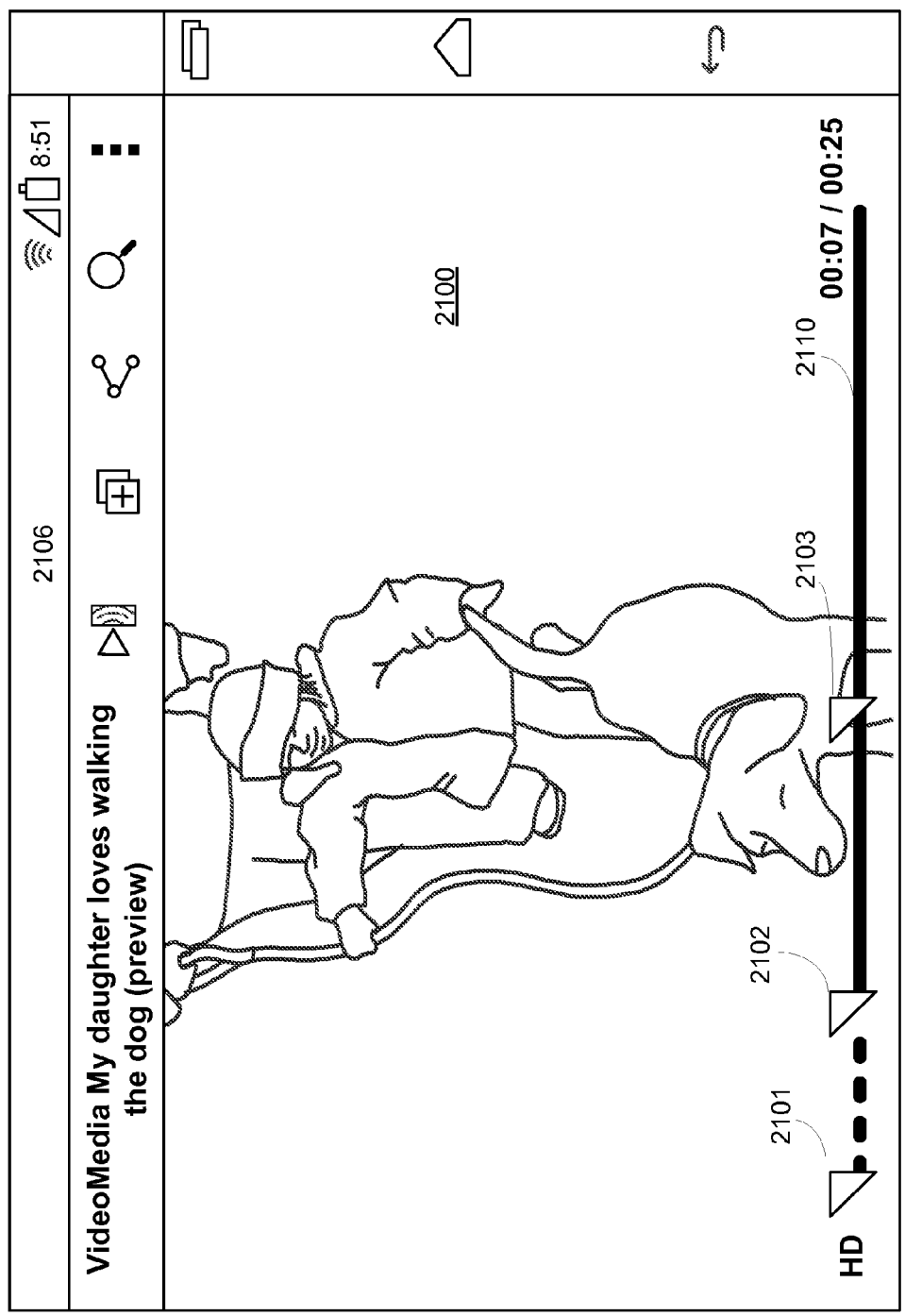
Figure 23G:
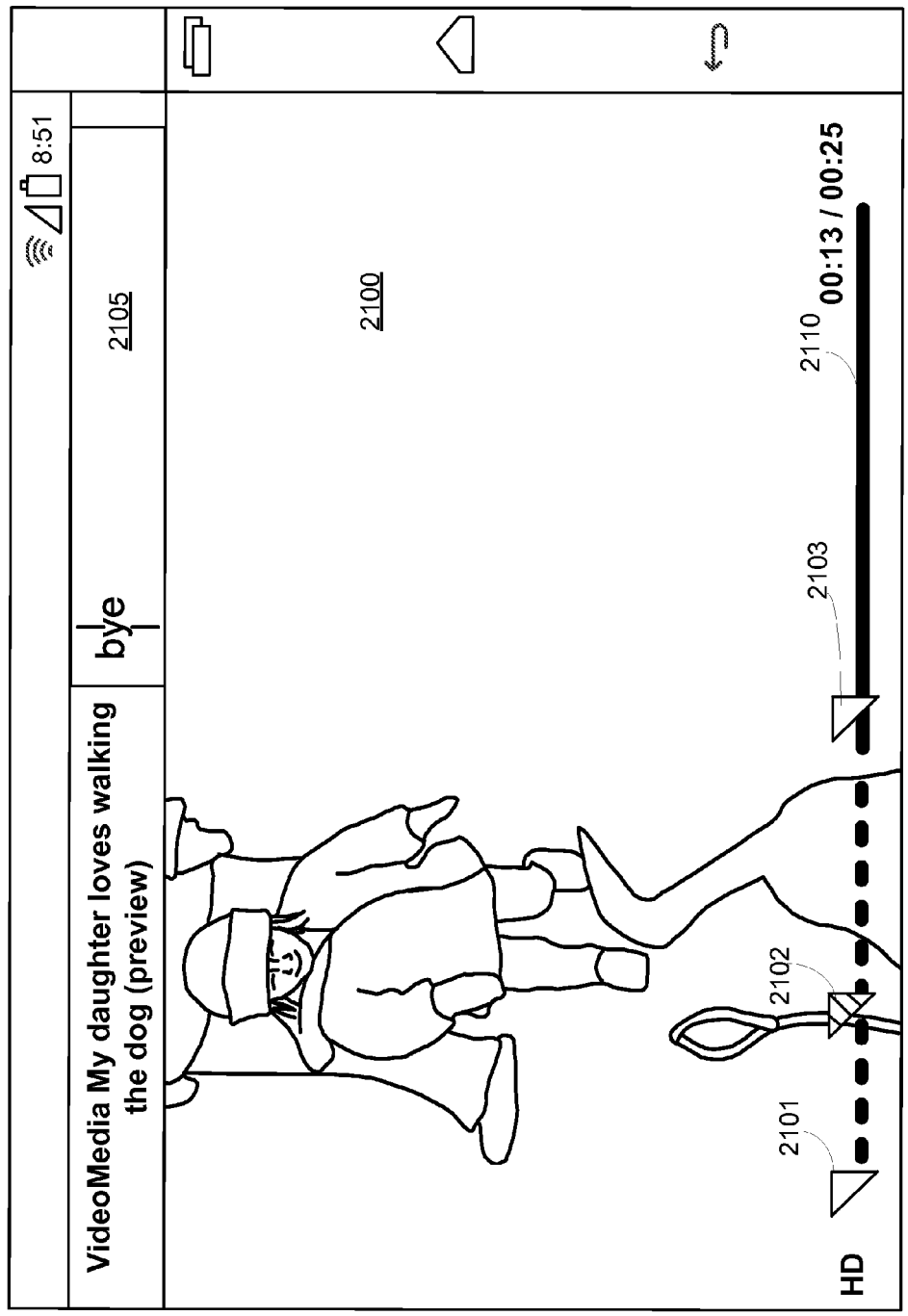
Figure 23H:
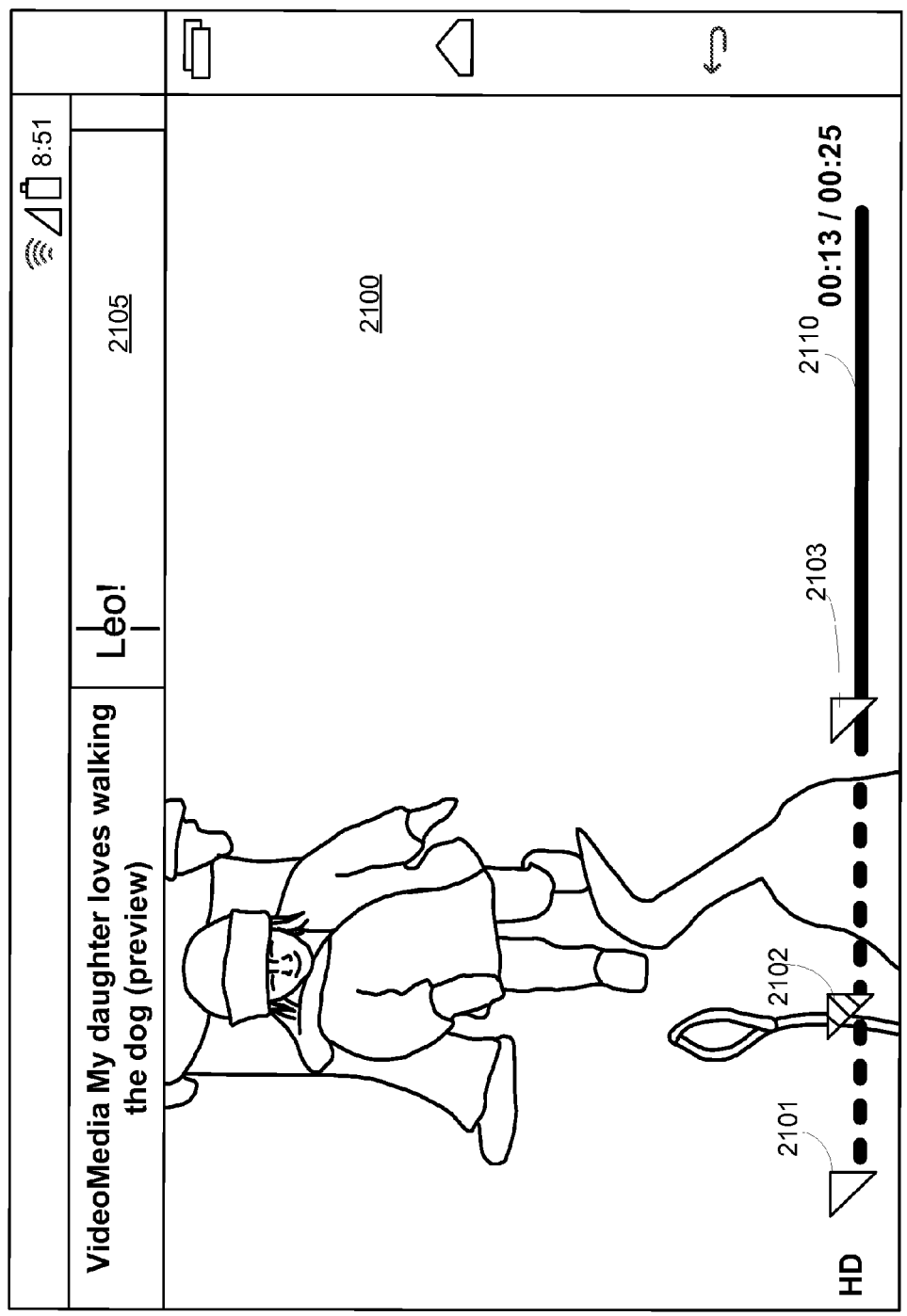
Figure 23I:
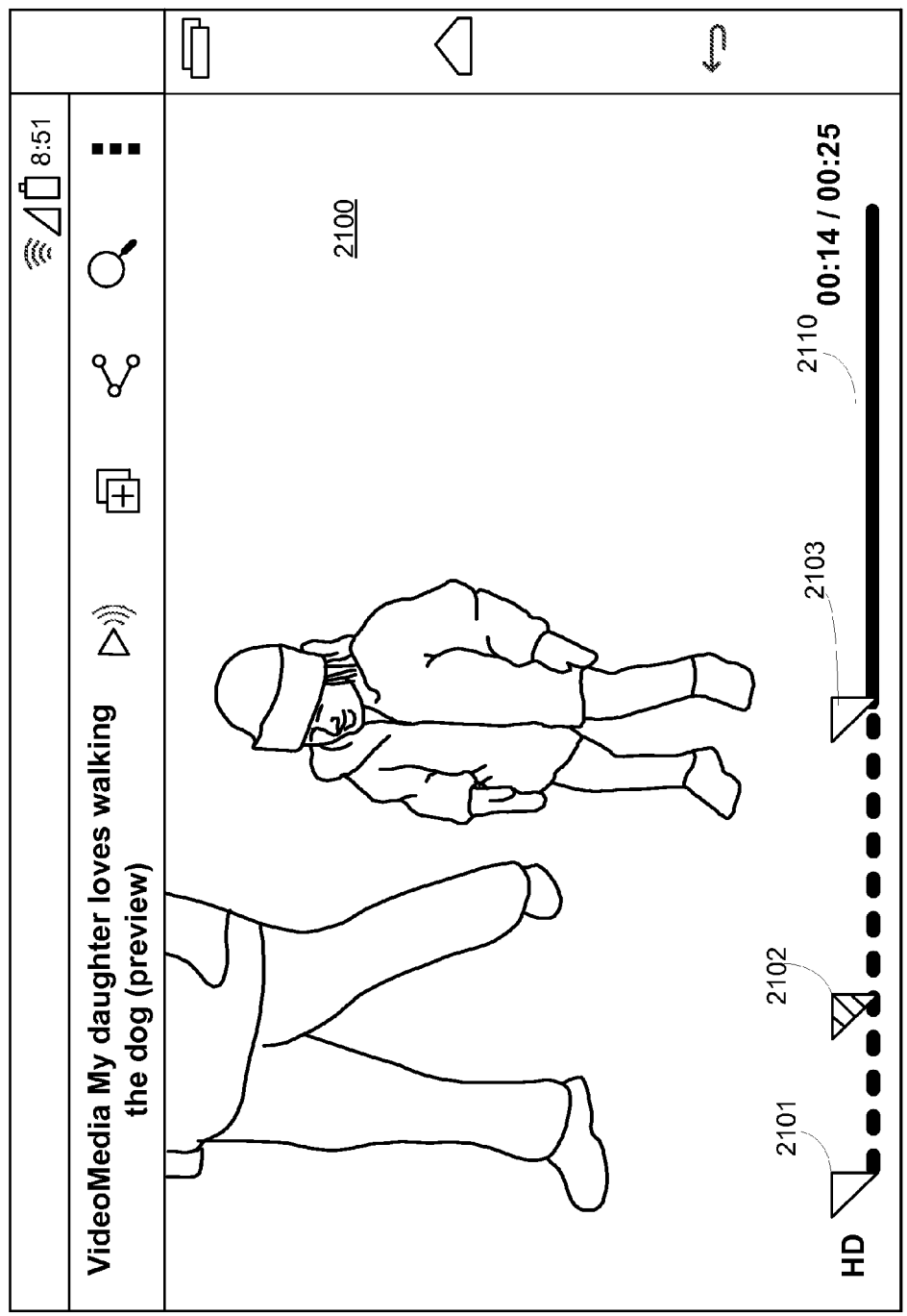

FIGS. 23a-23i show an RSVP-enabled video preview displayed by an embodiment of the present invention. In this embodiment, two excerpts, each comprising frames corresponding to a few seconds, have been selected to be included in the preview. Also, a few words of text for RSVP display have been selected to be displayed at the beginning of each excerpt. FIGS. 23a-23f show RSVP content and video frames corresponding to a first video excerpt and FIGS. 23g-23i show RSVP content and video frames associate with a second video excerpt.

FIG. 23a shows window 2100 displaying a frame at a beginning of a first excerpt, five seconds into the video. FIGS. 23a-23d show a time sequence as DRDA 2105 displays the content associated with the first excerpt. Specifically, FIG. 23a shows display at a time 1 of the word "she." FIG. 23b shows display at a second time of the word "grabs." FIG. 23c shows display at a third time of the word "his." FIG. 23d shows display at a fourth time of the word "leash." FIGS. 23e-23f show two additional video frames of the first except. In this embodiment, the initial frame of the first excerpt (5 seconds into the video) remains displayed while the RSPV content associated with the excerpt is displayed, as shown in FIGS. 23a-23d. Once that segment of RSPV content finishes, window 2100 displays the remaining frames of the first video excerpt. Two of those frames are shown in FIGS. 23e-23f.

In this embodiment, the RSPV content is displayed at the beginning of the excerpt, while the video remains frozen at five seconds into the video. However, in alternative embodiments, RSVP content associated with an excerpt including in a video preview may be presented before and/or during and/or after the playing of the video frames of the excerpt.

FIG. 23g shows window 2100 displaying a frame at a beginning of a second excerpt, thirteen seconds into the video. FIGS. 23g-23h show a time sequence as DRDA 2105 displays the content associated with the first excerpt. Specifically, FIG. 23g shows display at a first time of the word "bye." FIG. 23h shows display at a second time of the word "Leo!" FIG. 23i shows an additional video frame of the second except. In this embodiment, the initial frame of the second excerpt (thirteen seconds into the video) remains displayed while the RSPV content associated with the excerpt is displayed, as shown in FIGS. 23g-23h. Once that segment of RSPV content finishes, window 2100 displays the remaining frames of the second video excerpt. One of those frames is shown in FIG. 23i.

FIGS. 24a-24e illustrate an interface 2400 of a computerized system in accordance with an embodiment of the present invention for adding RSVP content to a video and creating or editing an RSVP-enabled preview of the video.

Figure 24A:
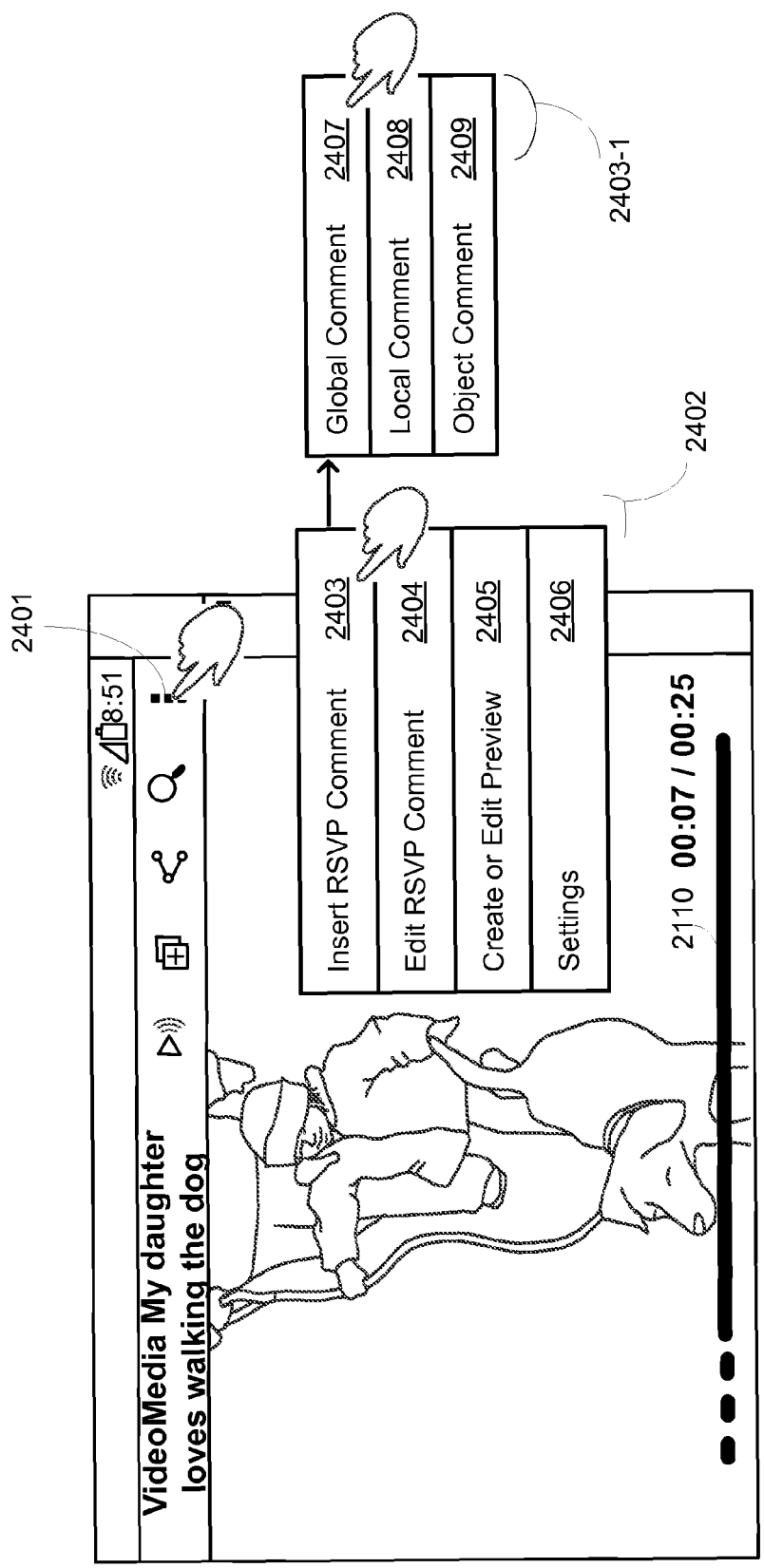
FIGS. 24a-24e illustrate an interface of a computerized system in accordance with an embodiment of the present invention for adding RSVP content to a video and creating or editing an RSVP-enabled preview of the video.

FIG. 24a illustrates an application interface menu 2402 that is activated within a video editing application by selecting menu activation icon 2401. Menu 2402 includes option 2403 for inserting an RSVP comment, option 2404 for editing an existing RSVP comment, option 2405 for creating or editing an RSPV-enabled preview, and settings option 2406.

When a user selects option 2403 from menu 2402 to insert an RSVP comment, a secondary menu 2403-1 appears. Secondary menu 2403-1 includes option 2407 for entering a global comment, option 2408 for inserting a local comment, and option 2409 for inserting an object comment. If option 2407 is selected for inserting a global comment (as shown in FIG. 24a), then a virtual keyboard appears (not separately shown) and the user can type in a comment that will be associated with the entire video. Such a comment will be displayable by RSVP upon, for example, selection of an RSVP marker displayed with a representation of the video as a video item included in a list of items as illustrated and described, for example, in the context of FIGS. 20a-20d. Alternatively, the user may be directed to speak the comment for entry by a speech recognition system (not separately shown); type the comment into a physical keyboard (not separately shown); or provide the comment through other known input techniques (not separately shown).

Figure 24B:
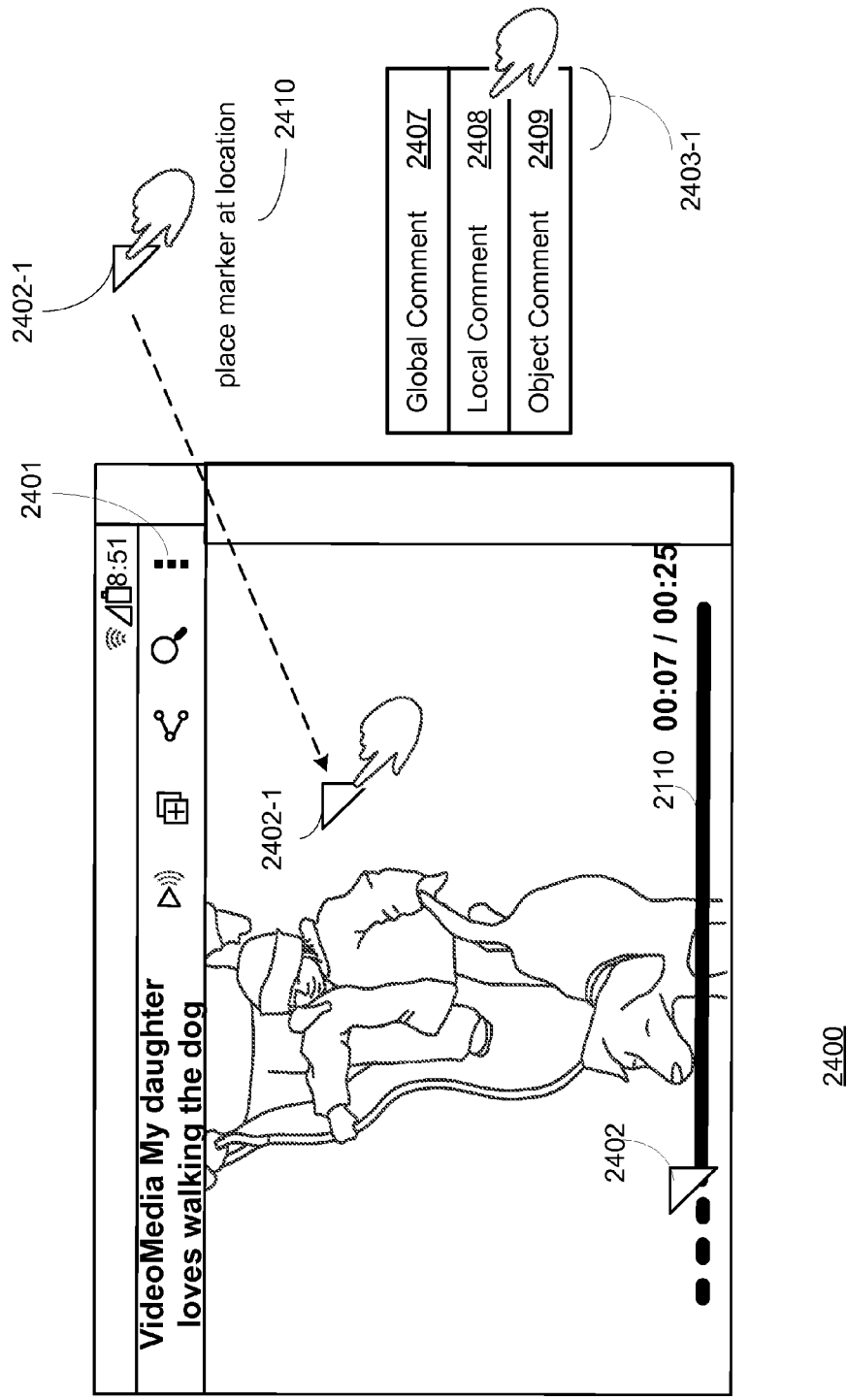

FIG. 24b illustrates further aspects of interface 2400 of FIG. 24a. In particular, when a user selects option 2408 from menu 2403-1 to insert a local RSVP comment, then an RSVP marker such as marker 2402-1 appears to the right of the video window. Instruction 2410 also appears instructing the user to place the marker at the location within the currently displaying video frame at which the user would like the RSVP marker 2402-1 to appear. After the user drags the marker to place it within the video frame, a representation 2402 of the marker also appears along progress bar 2110. Also, upon placement of the marker within the video frame, a virtual keyboard appears (not separately shown) and the user can type in a comment to be displayable by RSVP that will be associated with the displayed frame (which corresponds to a time point in the video). Alternatively, the user may be directed to speak the comment for entry by a speech recognition system (not separately shown); type the comment into a physical keyboard (not separately shown); or provide the comment through other known input techniques (not separately shown). The entered comment (whether entered by text or by speech) will be displayable by RSVP upon, for example, selection of an RSVP marker displayed during play back of the video as illustrated and described in the context of FIGS. 21b-21f.

Figure 24C:
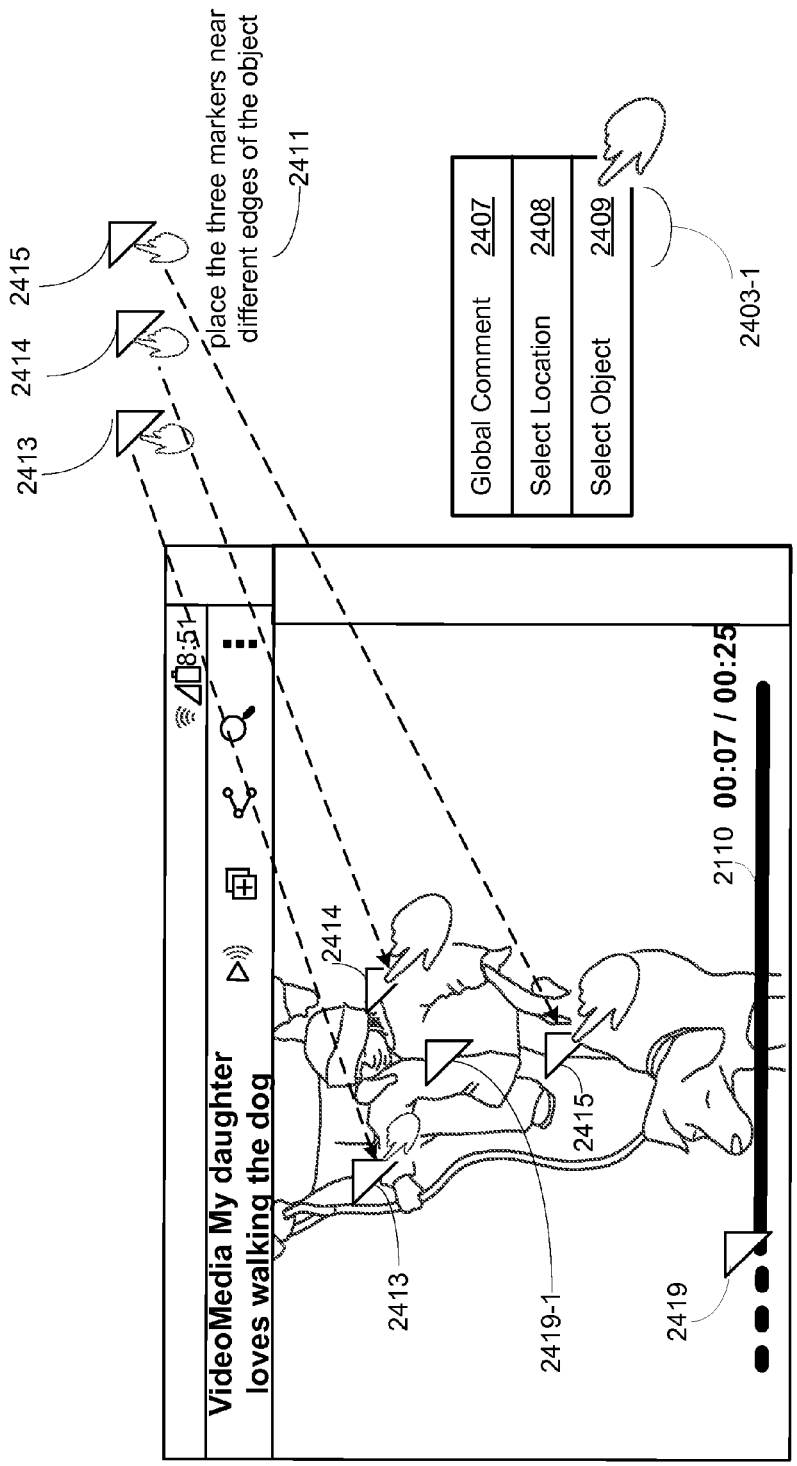

FIG. 24c illustrates further aspects of interface 2400 of FIG. 24a. In particular, when a user selects option 2409 from menu 2403-1 to insert an RSVP comment to be associated with an object, then object selection markers such as markers 2413, 2414, and 2415 appear to the right of the video window. Instruction 2411 also appears instructing the user to place the markers near different edges of the object with which the RSVP comment is to be associated. Once the user places markers 2413, 2414, and 2415 within the frame near edges of the selected object (in this example, the little girl) then RSVP marker 2419-1 appears on a spot near the center of the identified object. In one known video object recognition technique, markers on the perimeter of an object can be used to identify a "hot spot" which tracks the object as it moves in successive frames of the video. A related marker 2419 also appears on progress bar 2110 to indicate the time at which the object-related RSVP comment will first become selectable by a viewer of the video. Also, once the object is identified and the hot spot marker 2419-1 appears on the object, a virtual keyboard appears (not separately shown)

and the user can type in a comment to be displayable by RSVP that will be associated with the identified object. Alternatively, the user may be directed to speak the comment for entry by a speech recognition system (not separately shown); type the comment into a physical keyboard (not separately shown); or provide the comment through other known input techniques (not separately shown). The entered comment (whether entered by text or by speech) will be displayable by RSVP upon, for example, selection of an RSVP marker displayed on the object during play back of the video as illustrated and described in the context of FIGS. 22a-22f.

Figure 24D:
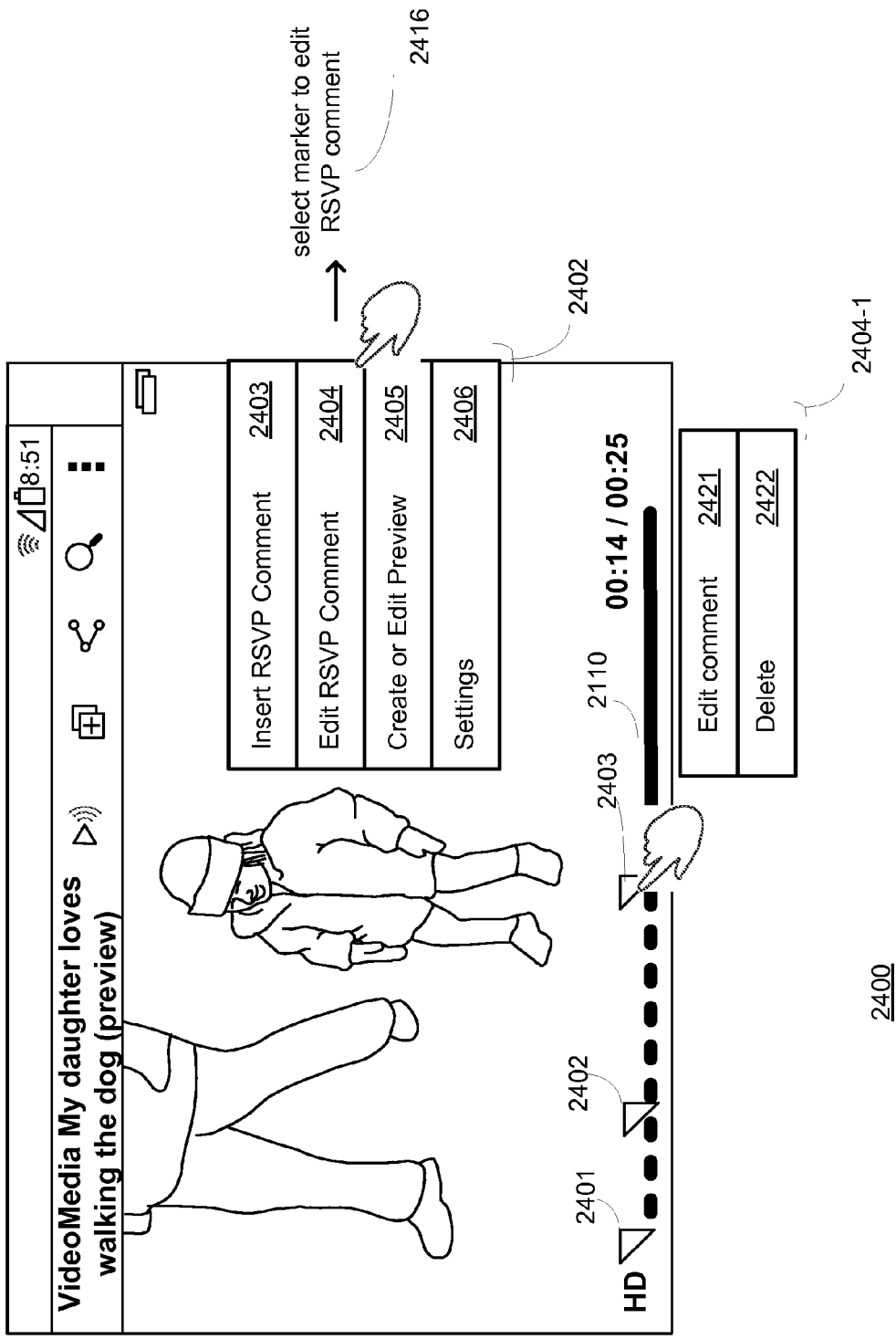

FIG. 24d illustrates further aspects of interface 2400 of FIG. 24a. When a user selects option 2404 from menu 2402 to edit an existing RSVP comment, instruction 2416 then appears asking the user to select the marker associated with the comment that the user would like to edit. This example illustrates the user selecting marker 2403. After the user indicates selection of marker 2403 (for example, by touching it on a touchscreen display), then menu 2404-1 appears. Menu 2404-1 indicates option 2421 to edit the RSVP comment or option 2422 to delete the comment. If option 2422 is selected, a confirmation button appears (not separately shown) and, if the selection to delete is confirmed, the associated marker and comment are removed from the video. If option 2421 is selected, then a virtual keyboard (not separately shown) and a window showing the text of the comment (not separately shown) appear for the user to make edits to the text of the comment. Alternatively, the user may be directed to speak edits to the comment for entry by a speech recognition system (not separately shown); type edits to the comment into a physical keyboard (not separately shown); or provide edits to the comment through other known input techniques (not separately shown).

Figure 24E:
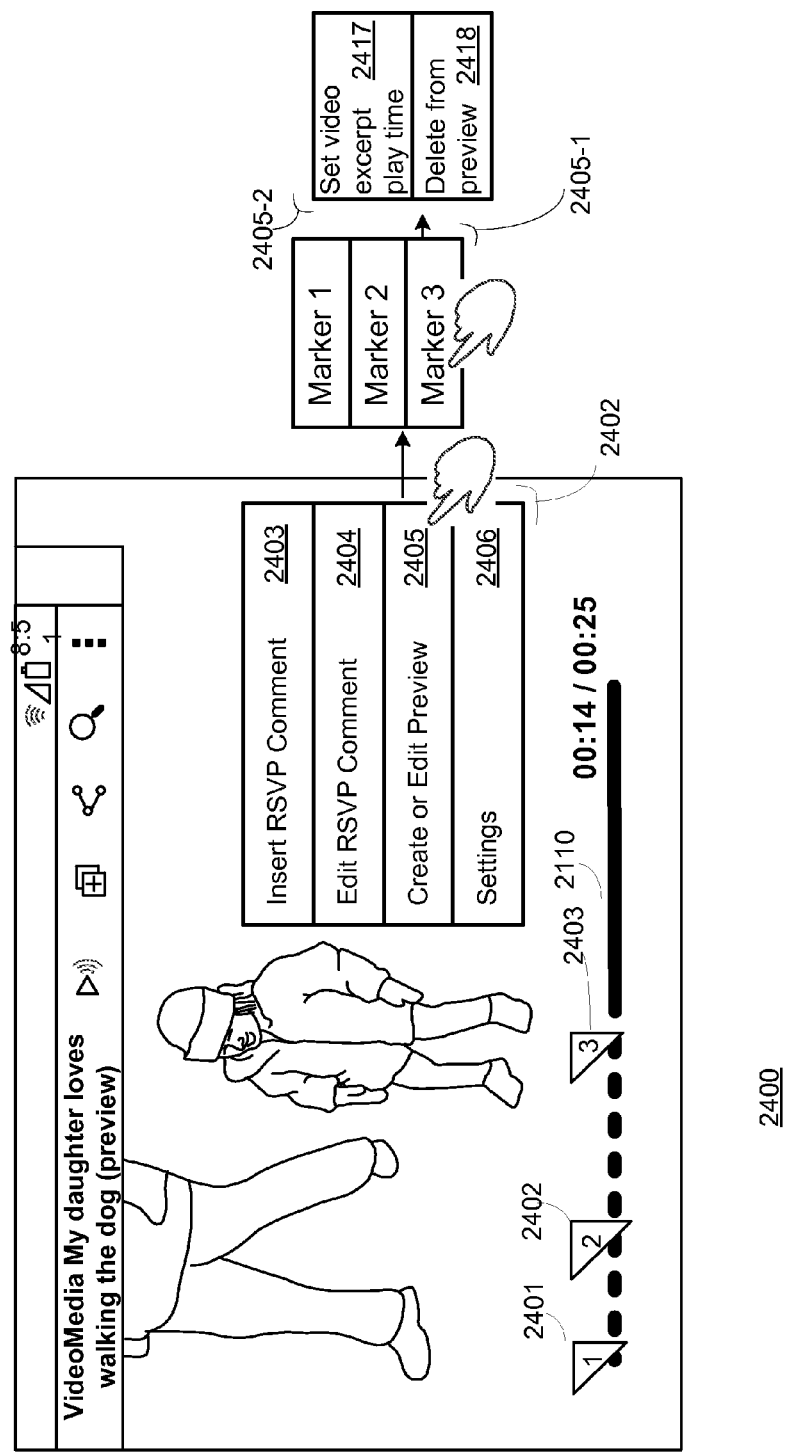

FIG. 24e illustrates further aspects of interface 2400 of FIG. 24a. When a user selects option 2405 from menu 2402 to create or edit an RSVP preview, then secondary menu 2405-1 appears including options for each marker along progress bar 2110 including markers 2401, 2401, and 2403, which are referenced respectively in menu 2405-1 by selectable options for "Marker 1," "Marker 2," and "Marker 3." The interface also displays the numerals 1, 2, 3 on those markers along the timeline for the user's reference. This example shows the user selecting "Marker 3" from menu 2405-1. A tertiary menu 2405-2 then appears including option 2417 for setting the duration of the video excerpt that is to be displayed in the preview along the RSVP content associated with this marker. Menu 2405-2 also includes option 2418 for deleting Marker 3 and its associated RSVP and video content from a video preview created by the user. Upon selection of option 2417, a user interface (not separately shown) appears allowing the user to enter a video excerpt duration in seconds or in frames that will include video frames including and immediately following the time point of the marker. The interface may be implemented through a virtual keyboard, speech recognition feature, or other human-to-computer interface.

FIGS. 25a-25k illustrate an augmented reality (AR) application supplemented by RSVP content in accordance with an embodiment of the present invention. AR is well known and typically involves viewing real world objects through an AR viewer which provides information about those objects. One example of a device in which an AR viewer may be implemented is a camera view finder associated with a smart phone camera application. Another example is through a head mounted or other near eye display. Examples of such displays and associated RSVP implementations are illustrated and described further in the context of FIGS. 26a-26c and 27a-27d. In some implementations, the user may view the real world either directly (unmediated by any optical material) or through an optical material, and then view relevant information about the real world objects in a near-eye display placed near or in a portion of the user's field of vision. Such implementations are compatible with embodiments of the present invention. However, the implementation illustrated in FIGS. 25a-25k assumes that the user is viewing the real world through an AR application window implemented in conjunction with a camera view finder of a smartphone.

Figure 25B:
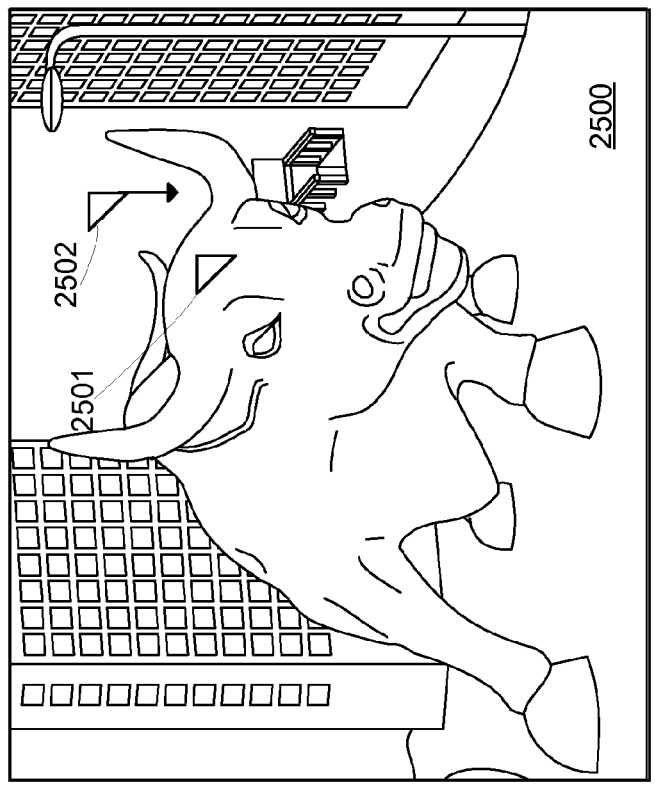
FIGS. 25a-25k illustrate an augmented reality (AR) application supplemented by RSVP content in accordance with an embodiment of the present invention.
Figure 25A:
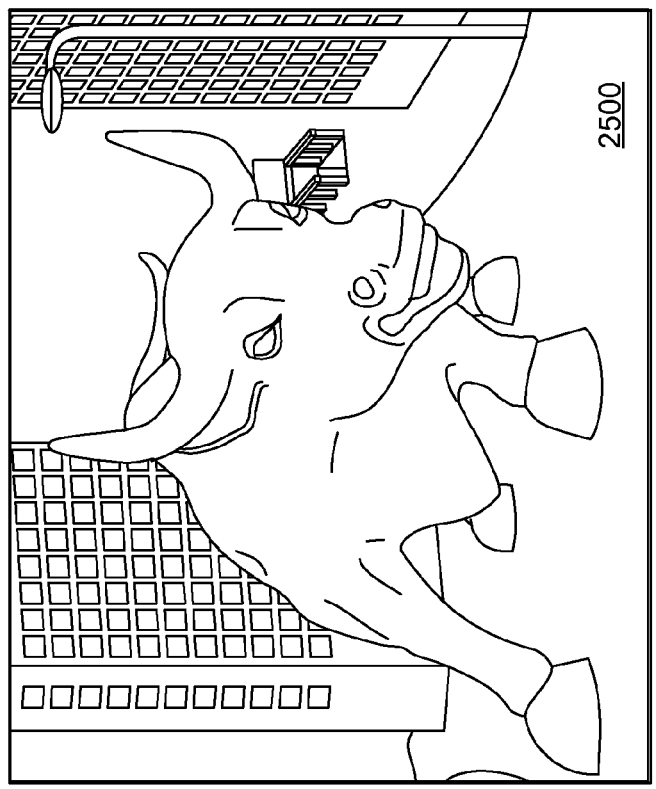

FIG. 25a illustrates an AR application window 2500 prior to activation of AR-related display objects. As shown, a user is viewing a real-world urban scene (in New York City) through the screen view of a smart phone camera application (which typically is able to display a real-world scene on the smart phone display screen).

FIG. 25b illustrates the same scene after the associated AR application has recognized particular real world objects. As shown, window 2500 now displays markers 2501 and 2502 to indicate the presence of RSVP content associated with particular real world objects. Specifically, marker 2501 indicates the presence of RSVP content associated with the statue of a bull and marker 2502 indicates the presence of RSVP content associated with the subway station entrance located by the bull and visible just beneath the bull's left ear.

Figure 25D:
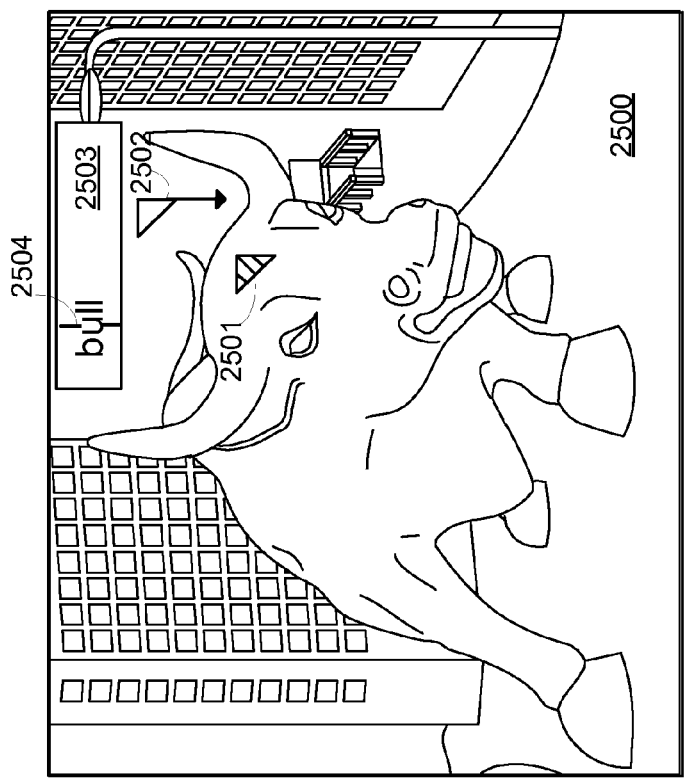
Figure 25C:
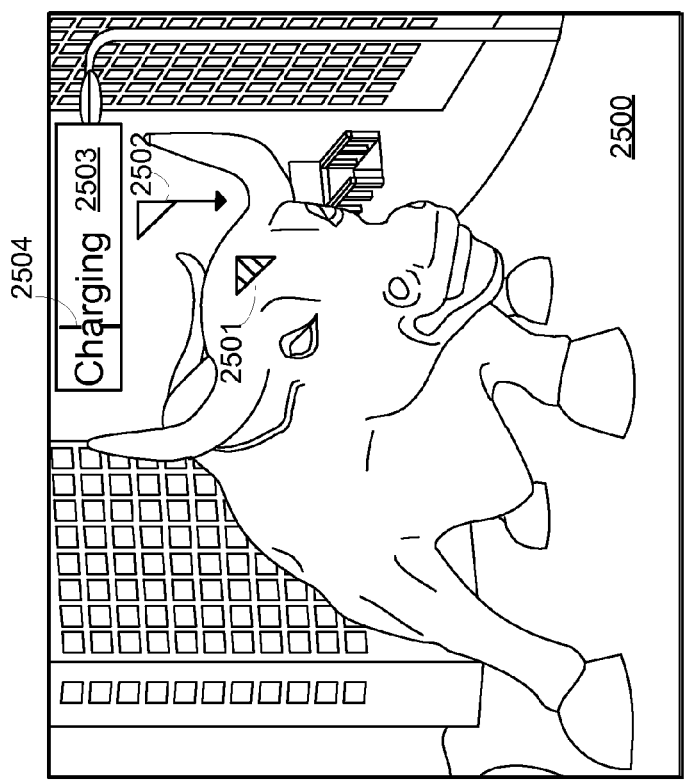
Figure 25F:
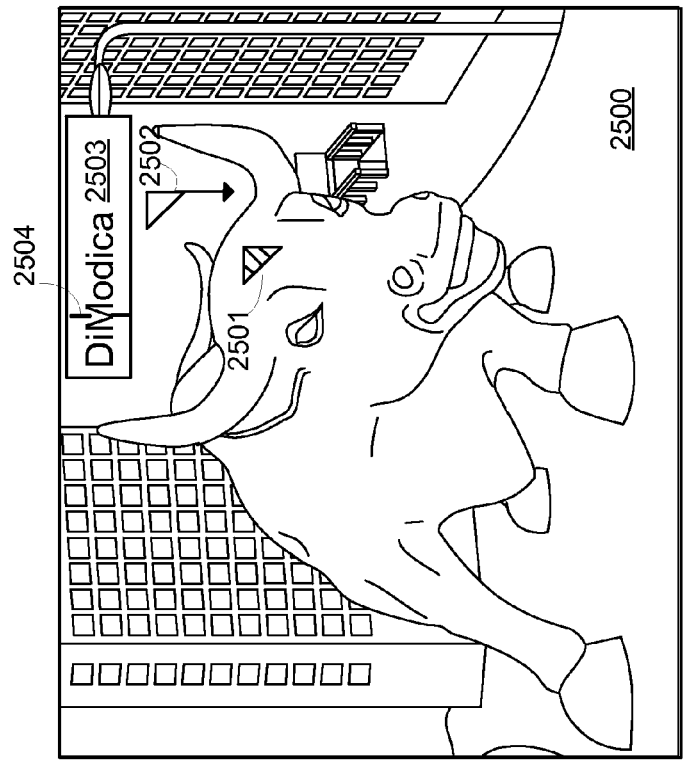
Figure 25E:
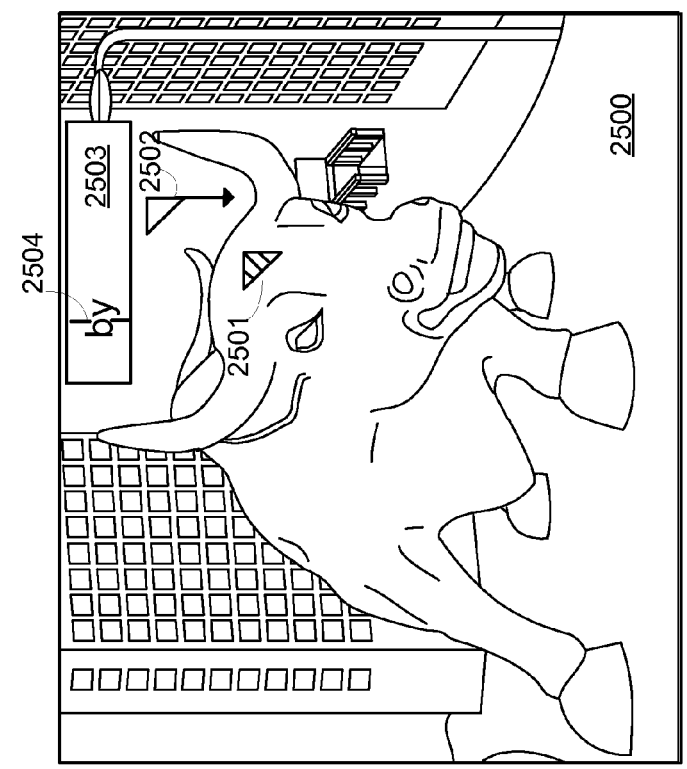

FIGS. 25c-25f show a time sequence of the display of RSVP content associated with the statue after a user-interface action indicates selection of marker 2501. Upon selection of the marker, DDRA 2503 appears and begins displaying words. In this embodiment, DDRA displays the words such that an optimal recognition character position is place a fixed location of the display indicated by hash marks 2504. FIG. 25c shows display of the word "Charging" at a first time. FIG. 25d shows display of the word "Bull" at a second time. FIG. 25e shows display of the word "by" at a third time. FIG. 25f shows display of the word "DiModica" at a fourth time. Window 2500 shows marker 2501 as grayed out in FIGS. 25c-25f to indicate that display of the RSVP content associated with the marker has been initiated. In the illustrated embodiment, the marker is grayed out as soon as the associated RSVP display begins. In alternative embodiments, the marker can be grayed out when or after the RSVP display is finished.

Figure 25G:
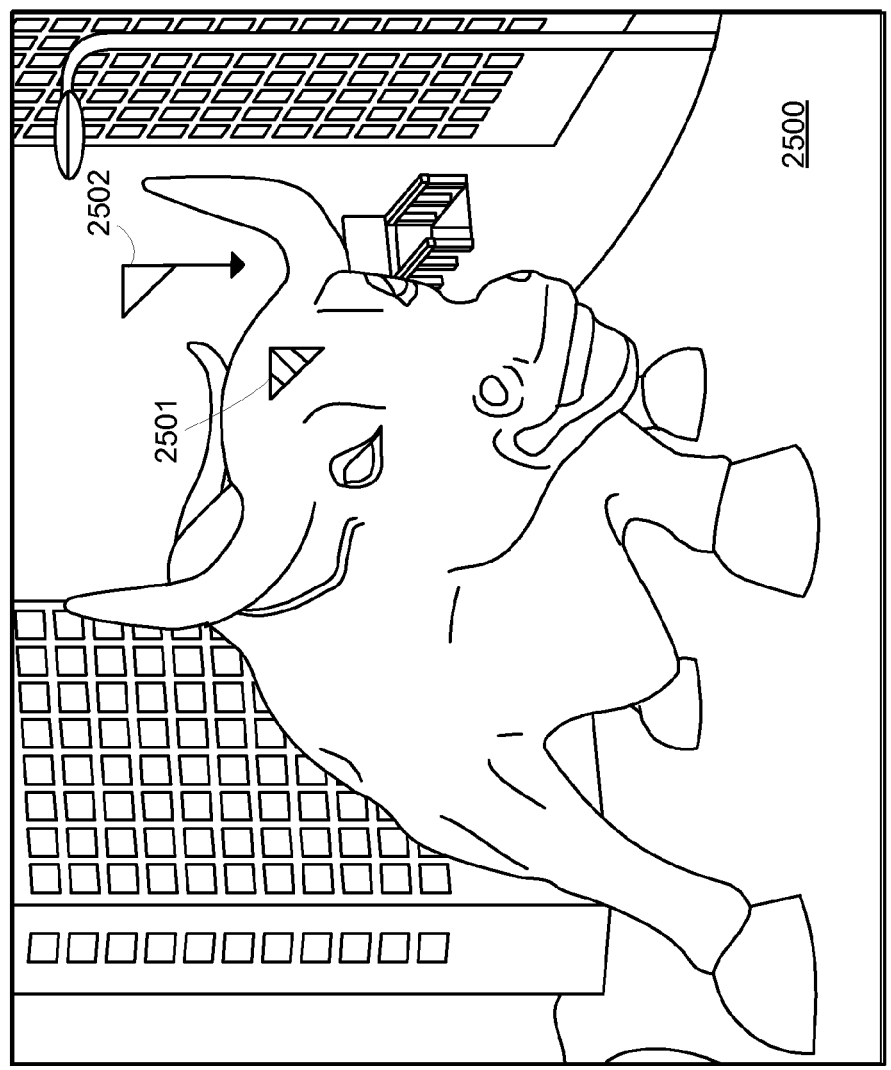

FIG. 25g shows window 2500 after the RSVP content associated with marker 2501 has finished displaying. In this embodiment, the DDRA is no longer displayed when RSVP content is either not selected or has finished displaying. This minimizes obstruction of the user's view of real world objects when RSPV content is not actively displaying. However, in alternative embodiments, a DDRA such as DDRA 2503 may remain on the display view when RSVP content is temporarily not displayed.

Figure 25I:
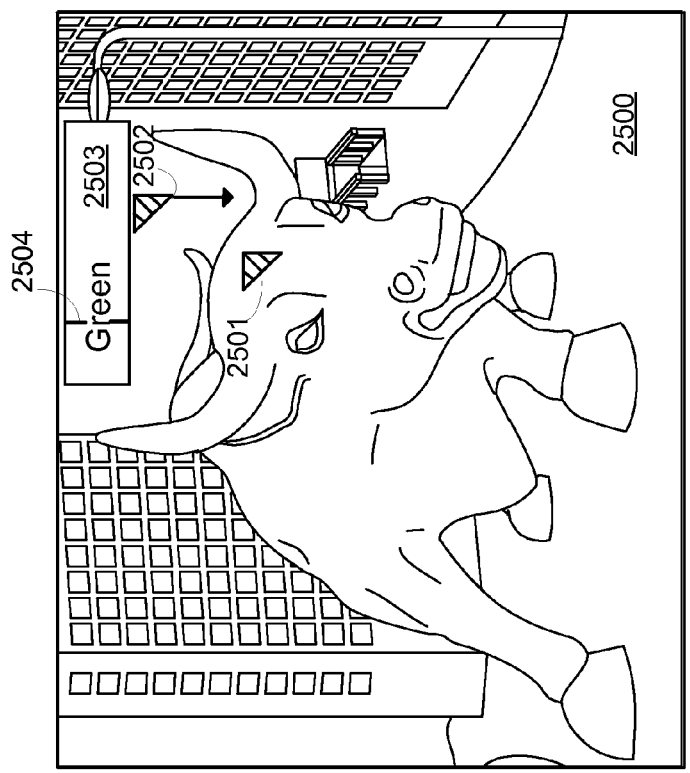
Figure 25H:
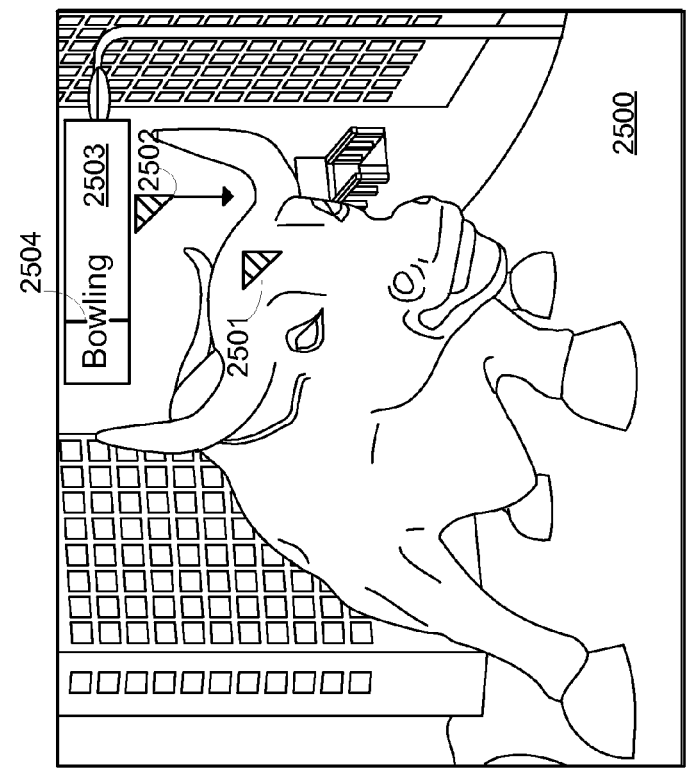
Figure 25K:
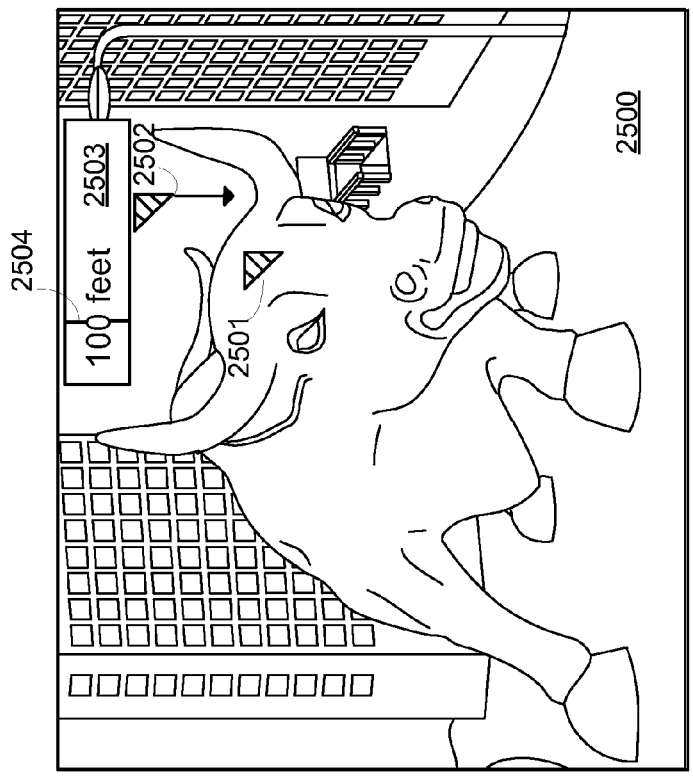
Figure 25J:
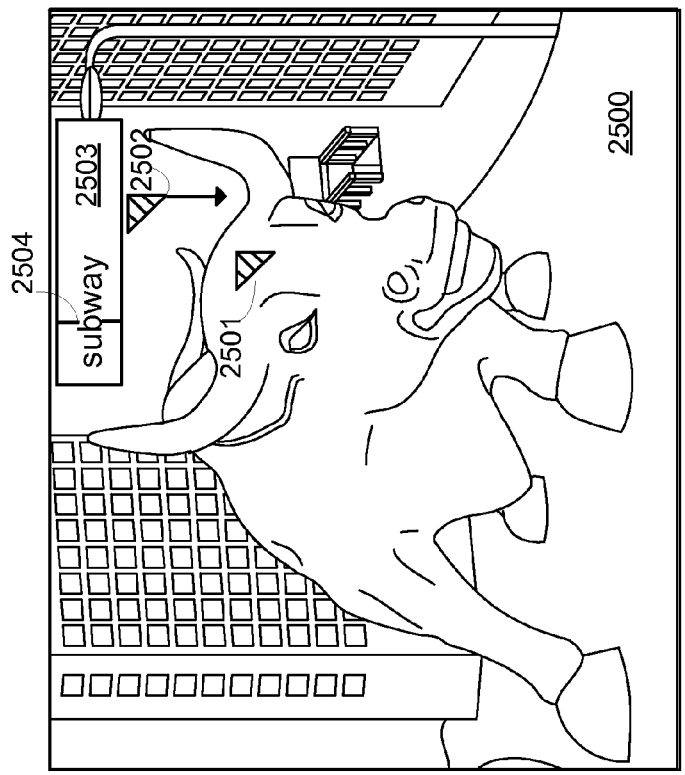

FIGS. 25h-25k show a time sequence of the display of RSVP content associated with the subway entrance after a user-interface action indicates selection of marker 2502. Upon selection of the marker, DDRA 2503 appears again and begins displaying words. FIG. 25h shows display of the word "Bowling" at a first time. FIG. 25i shows display of the word "Green" at a second time. FIG. 25j shows display of the word "Subway" at a third time. FIG. 25k shows display of the word "100 feet" at a fourth time. Window 2500 shows marker 2502 as grayed out in FIGS. 25h-25k to indicate that display of the RSVP content associated with the marker has been initiated.

FIGS. 26a-26c show various types of alternative known display devices in which embodiments of the invention might be implemented. While particular embodiments of the invention can be implemented in the context of any electronic device capable of displaying information, small screen display devices such as smart phones and other devices derive particular benefits from the ability of invention embodiments to increase the amount and speed of information displayable within a limited screen space. Other embodiments of the invention have already been illustrated and described in the context of smart phone displays. However, FIGS. 26a-26c show alternative displays devices which also have a particular need for the benefits provided by implementation of embodiments of the present invention. FIG. 26a illustrates a head mounted display HMD device 2600a implemented in the form factor of traditional eyeglasses. In particular, device 2600a includes display 2601a. FIG. 26b illustrates another HMD device 2600b, which includes display 2601b. FIG. 26c illustrates a smart watch device 2600c including a display 2601c.

Figure 27A:
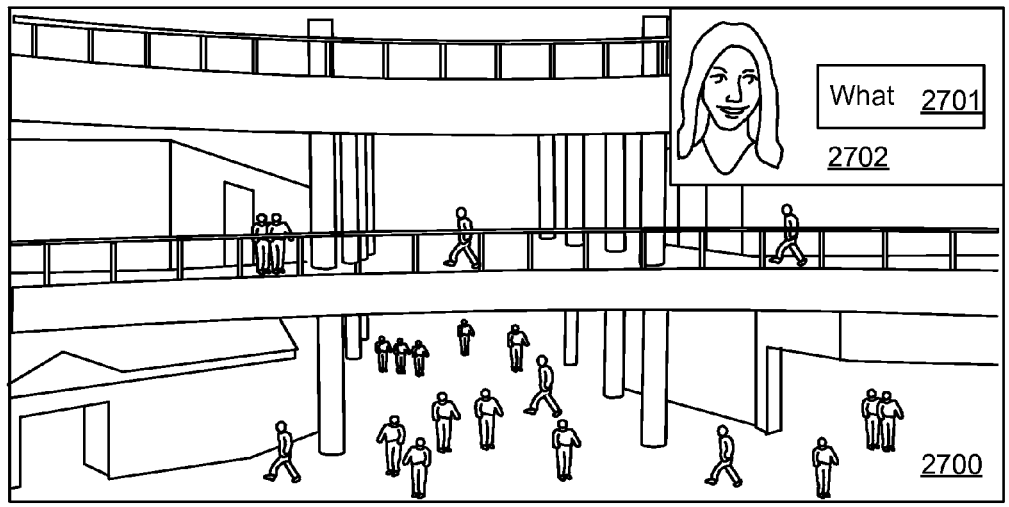
FIGS. 27a-27d show a time sequence of display of RSVP content in an RSVP-enabled interface implemented in a head-mounted display ("HMD") device such as, for example, one of the HMD devices shown in FIGS. 26a-26b.
Figure 27B:
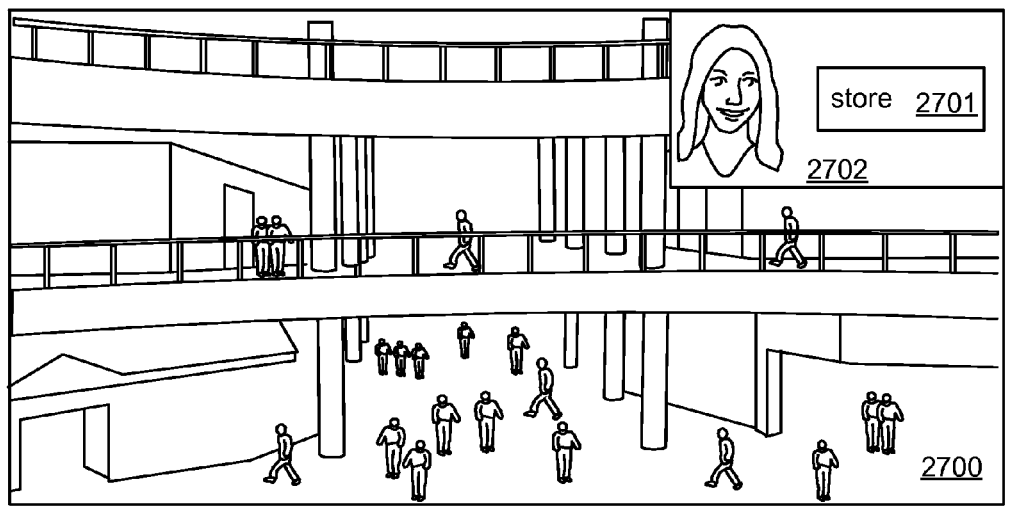
Figure 27C:
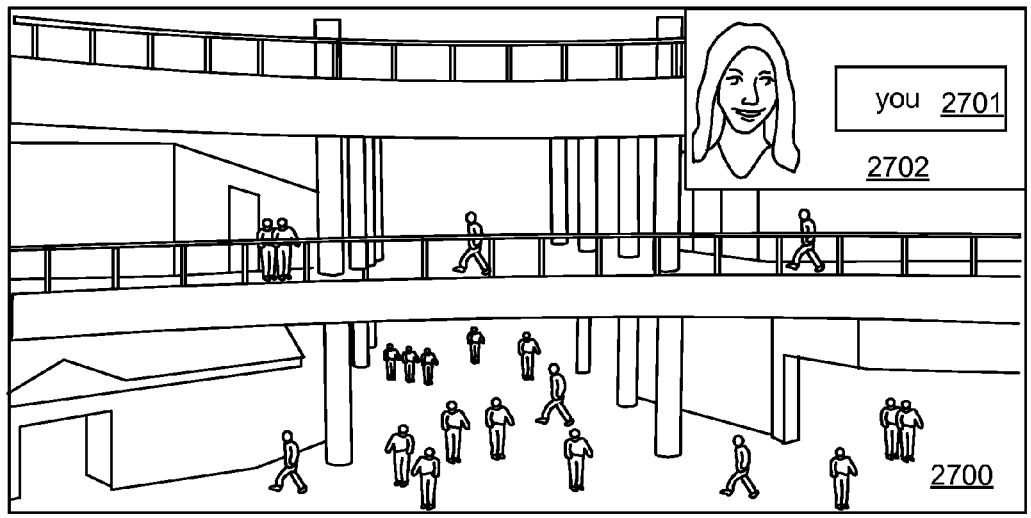
Figure 27D:
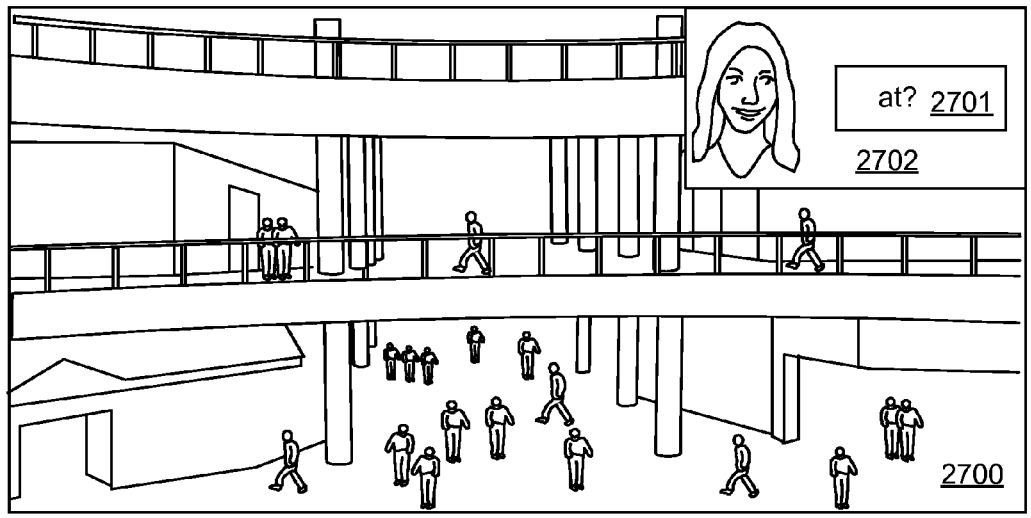

FIGS. 27a-27d show a time sequence of display of RSVP content in an RSVP-enabled interface implemented in an HMD device such as, for example, one of the HMD devices shown in FIGS. 26a-26b. Window 2700 shows the user's field of vision from inside of a shopping mall. The RSVP content is displayed within DRDA 2701 on display 2702. In this example, the user is receiving a message from a friend who is also at the mall. FIG. 27a shows display of the word "What" at a first time. FIG. 27b shows display of the word "store" at a second time. FIG. 27c shows display of the word "you" at a third time. FIG. 27d shows display of the word "at?" at a fourth time.

Figure 28A:
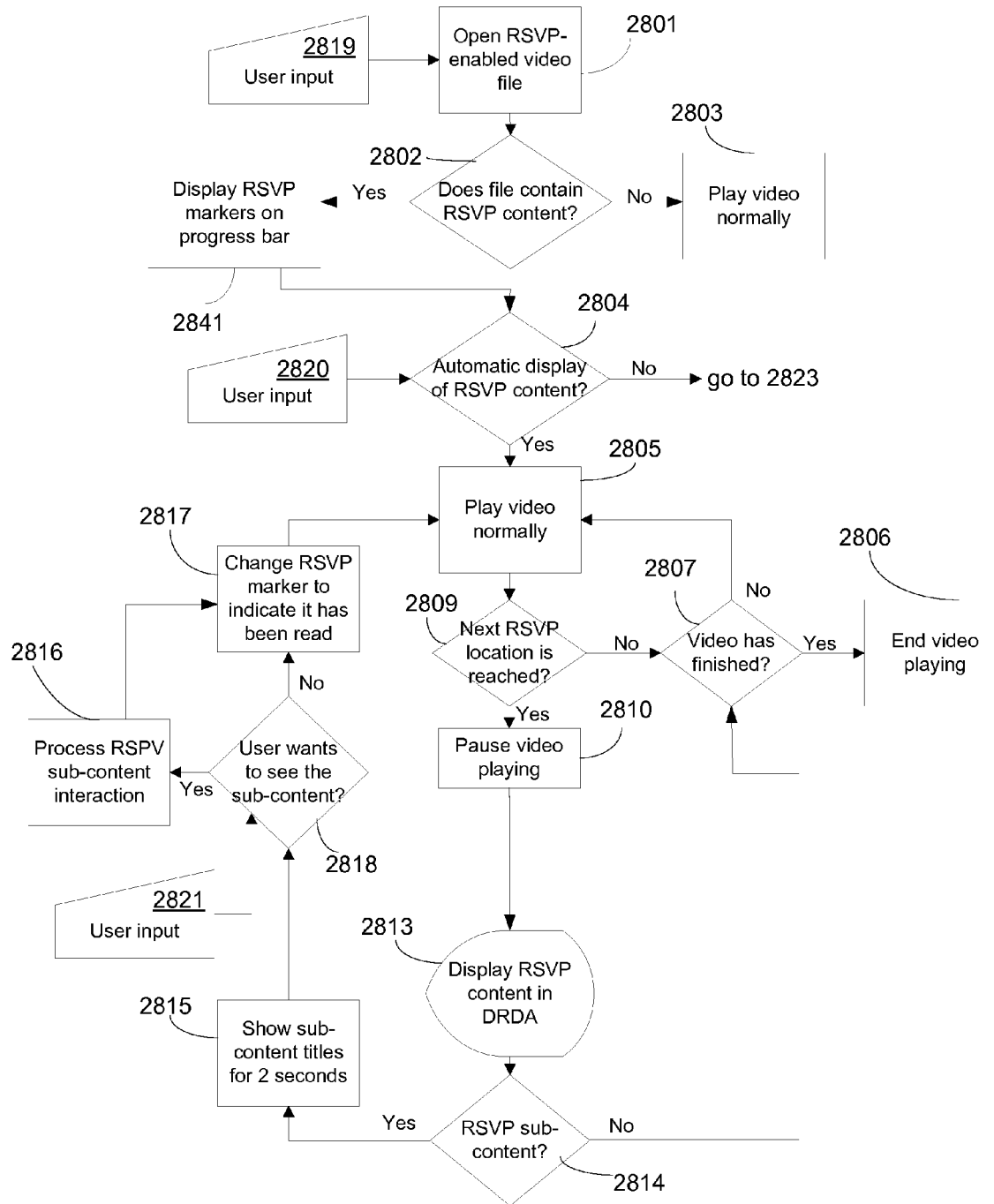
FIGS. 28a-28b show a process flow implemented by a computer system in accordance with an embodiment of the present invention for displaying RSVP content within a video player application.
Figure 28B:
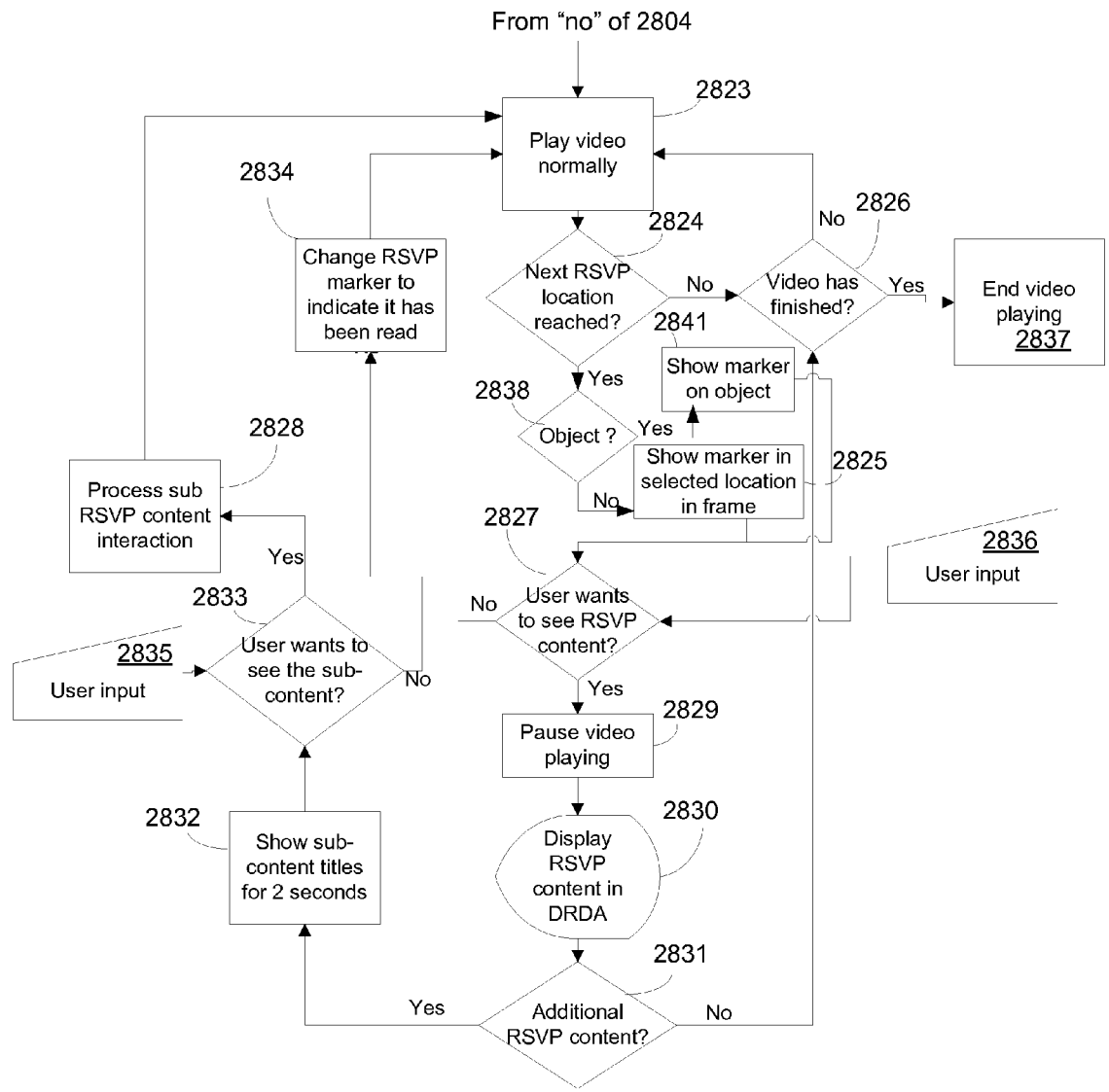

FIGS. 28a-28b show a process flow for a method 2800 implemented by a computer system in accordance with an embodiment of the present invention for displaying RSVP content within a video player application. Method 2800 may be implemented, for example, on a user device executing a video player application such as application 210a of FIG. 2b that is enabled to process RSPV content by RSVP software 211a which utilizes RSVP library 204.

Referring to FIG. 28a, step 2801 opens an RSVP-enabled video file in response to user input 2819. Step 2802 determines whether the file contains any RSVP content. If no, then step 2803 proceeds to play the video in accordance with the video application's normal (i.e., non-RSPV) video playing execution. If yes, the step 2841 displays one or more RSVP markers along the video progress bar/time line. Step 2804 determines whether the user has chosen (based on user input 2820) to have RSPV content in the video file be played automatically. If no, the method proceeds to step 2823 of FIG. 28b (described further below). If yes, then step 2805 begins playing the video content. In some embodiments, user input 2820 may be provided after each RSVP-enabled video file is opened. In other embodiments, user input 2820 may be provided through a user settings interface for determining default user preferences with respect to RSVP-enabled video playback (settings interface not separately shown).

During video playback by step 2805, step 2809 determines whether the next RSVP location in the video file has been reached. If no, then step 2807 determines whether the video has finished. If yes, then video playback ends at step 2806. If no, then step 2805 continues playing the video. However, if the result of step 2809 is yes, then step 2810 pauses video playback. Step 2813 displays the associated RSVP content in a DRDA.

Step 2814 determines whether there is RSVP sub-content associated with the RSVP content displayed in step 2813. If no, then the method proceeds to step 2807. If yes, then step 2815 display titles for the sub-content (see, e.g., the example shown in FIG. 7d). In this embodiment, the titles of sub-content are shown for 2 seconds. However, alternatives may show the titles for different amounts of time. Step 2818 determines whether user input 2821 has indicated that the user has selected to view the sub-content. If no, then step 2817 changes the marker corresponding to the primary RSVP content to indicate that it has been read (e.g., by graying it out as illustrated in previous figures). If yes, then step 2816 displays the sub-content in the DRDA (see, e.g., as shown in FIGS. 7e-7h). When the sub-content is finished displaying, then step 2817 changes the RSVP marker as previously described and the method returns to step 2804 to continue playing the video while step 2809 determines whether the next RSVP content segment has be reached during video playback.

Referring to FIG. 28b, if RSVP content has not been designated to display automatically in step 2804 (FIG. 28a), then step 2823 proceeds to play the video in accordance with the video application's normal video playing execution. During video playback, step 2824 determines whether the next RSVP location in the video file has been reached. If no, then step 2826 determines whether the video has finished. If yes, then video playback ends at step 2837. If no, then step 2823 continues playing the video. However, if the result of step 2824 is yes, then step 2838 determines whether the RSVP content at the current video location is object based (e.g., as shown and described in the context of FIGS. 22a-22f). If yes, then step 2841 shows an RSPV marker on the relevant object in the video frame. If no, then step 2825 shows an RSVP marker in the frame in a designated location (see, e.g., marker 2102-1 in FIG. 21b; in some embodiments, the location may have been designated by an RSVP content author as illustrated in FIG. 24b with respect to marker 2402-1).

Step 2827 determines, based on user input 2836, whether the user has selected to view the RSVP content associated with any of the marker(s) currently displayed in the video frame. If no, then the method returns to step 2823. If yes, then step 2829 pauses video playing and step 2830 displays the corresponding textual content in a DRDA using RSVP.

Step 2830 determines whether there is RSVP sub-content associated with the RSVP content displayed in step 2831. If no, then the method proceeds to step 2826. If yes, then step 2832 display titles for the sub-content. Step 2833 determines whether user input 2835 has indicated that the user has selected to view the sub-content. If no, then step 2834 changes the marker corresponding to the primary RSVP content to indicate that it has been read (e.g., by graying it out as illustrated in previous figures). If yes, then step 2828 displays the sub-content in the DRDA. When the sub-content is finished displaying, then step 2834 changes the RSVP marker as previously described and the method returns to step 2823 to continue playing the video while step 2824 determines whether the next RSVP content segment has been reached during video playback.

Figure 29A:
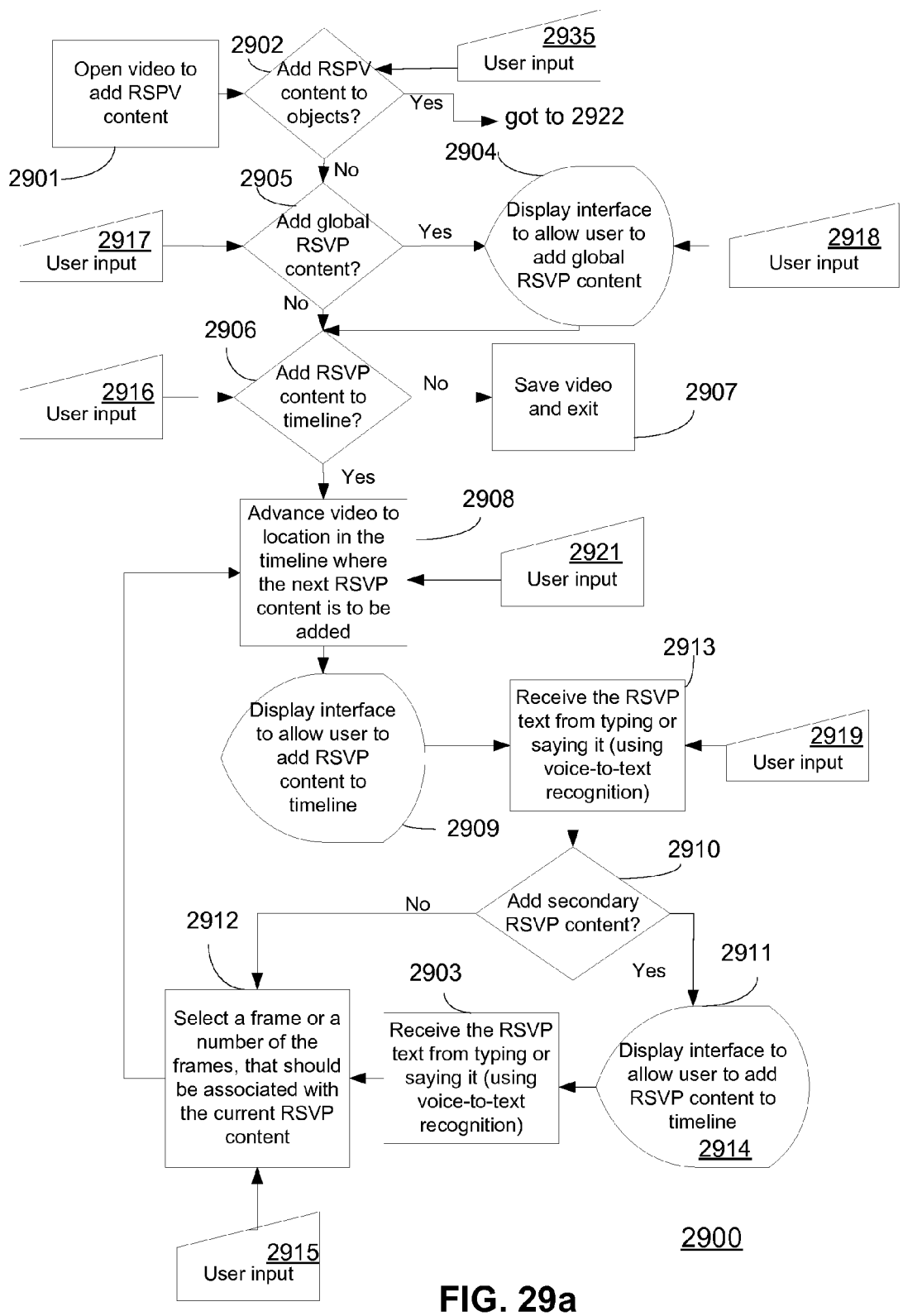
FIGS. 29a-29b show a process flow implemented by a computer system in accordance with an embodiment of the present invention enabling a user to add RSVP content to a video.
Figure 29B:
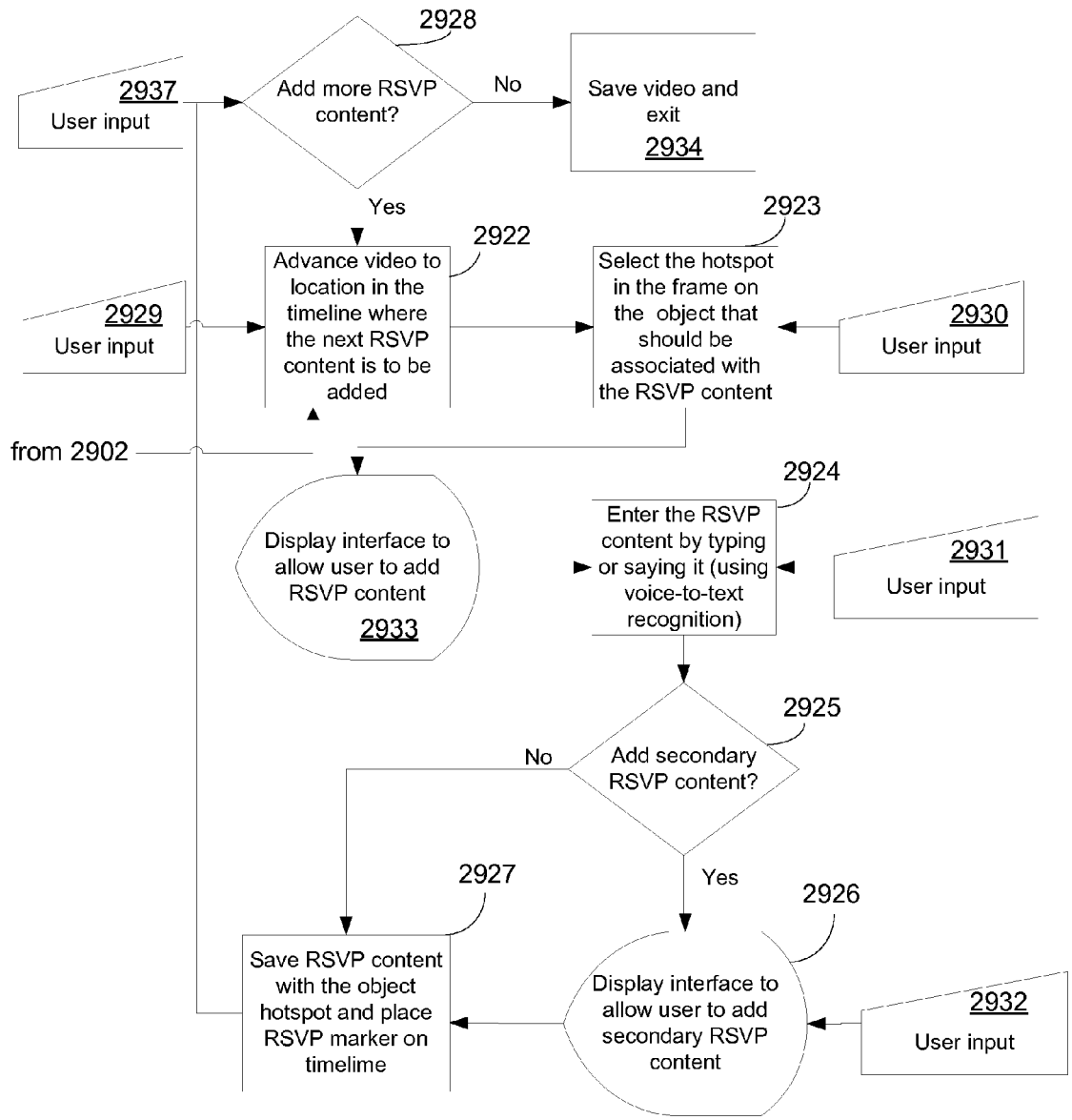

FIGS. 29a-29b show a process flow for a method 2900 implemented by a computer system in accordance with an embodiment of the present invention enabling a user to add RSVP content to a video. Such a preview may be created, for example, through a user interface as shown and described FIGS. 24a-24e. However, in this and other examples illustrated herein of various embodiments of aspects of the invention, the exact logic shown in flow diagrams is not necessarily intended to correspond to the exact interface illustrated in other figures. Both are merely intended to provide examples and those skilled in the art will of course appreciate that there are many variations that would not at all depart from the spirit and scope of the present invention.

Method 2900 may be implemented, for example, on a user device executing a video editing/annotating application such as application 210b of FIG. 2b that is enabled to process RSPV content by RSVP software 211b which utilizes RSVP library 204.

Referring to FIG. 29a, step 2901 opens the video to which RSVP content is to be added. Step 2902 determines, based on user input 2935, whether the user has selected to add or edit RSPV content related objects in the video. If yes, then the method proceeds to step 2922, shown and described below in the context of FIG. 29b. If no, then the method proceeds to step 2905. Step 2905 determines, based on user input 2917, whether the user has selected to add or edit a global RSVP comment. If yes, then step 2904 displays an interface for the user to provide input 2918 to add or edit a global comment to the video that will be displayable by RSVP. The method then proceeds to step 2906. If the result of step 2905 is no, then the method proceeds to step 2906 directly.

Step 2906 determines, based on user input 2916, whether RSVP content is to be added to the video timeline to make the content displayable as a particular time in the video. If no, the step 2907 saves the video and exits. If yes, the step 2908 advances the video, based on user input 2921 (e.g., selecting a point on a progress bar), to the time location in the video where the RSVP content is to be added. Step 2909 then displays an interface to the user to add content to be displayed via RSPV. As described previously in the context of FIGS. 24a-24d, such an interface may include a virtual keyboard, speech recognition interface, or other user interfaces for entering or editing textual content. Step 2913 receives user input 2919 that enters or edits textual content that is to be displayable to a content consumer via RSVP. Step 2910 then determines whether the user would like to add any secondary RSVP content. As previously described in the context of FIGS. 7d-7h, indicators for such additional content may be provided at the end of a primary RSVP display so that a content consumer can determine whether to select to view the additional content. The concepts illustrated there also apply to RSVP content added to video.

If the result of step 2910 is yes, then step 2911 displays an interface to receive user input 2920 to add secondary content to be displayable by RSPV. The method then proceeds to step 2903 to receive the entered content. The method then proceeds to step 2912. If the result of step 2910 is no, then the method proceeds directly to step 2912. Step 2912, based on user input 2915, selects how many frames should be associated with the currently entered RSPV content (including the primary RSVP content received at step 2913 and any secondary content received at step 2914). In various alternatives, the frames may be represented by the number of frames or in a time duration of associated video content. The method then returns to step 2908.

FIG. 29b shows the flow of a portion of method 2900 that is executed if the result of step 2902 (in FIG. 29a) is yes and user added content is to be associated with objects. Step 2922 advances the video based on user input 2929 to the time location in the video where the RSVP content is to be added. Step 2923 provides an interface and accepts user input to identify a hotspot on a video object selected by the user for association with RSPV content. Step 2933 then displays an interface to the user to add content to be displayed via RSPV. Step 2924 receives user input 2931 that enters or edits textual content that is to be displayable to a content consumer via RSPV. Step 2925 then determines whether the user would like to add any secondary RSVP content.

If the result of step 2925 is yes, then step 2926 displays an interface to receive user input 2932 to add secondary content to be displayable by RSPV. The method then proceeds to step 2927 to save the RSVP entered content and any secondary entered RSPV content along with the identified object hotspot and to place an associated marker on the video timeline bar. If the result of step 2925 is no, then the method proceeds directly to step 2927. The method then proceeds to step 2928 to determine, based on user input 2937, whether the user would like to add any more RSPV content to objects in the video. If the result of step 2928 is yes, then the method returns to step 2922. If the result of step 2928 is no, then step 2934 saves the video and the process ends.

Figure 30:
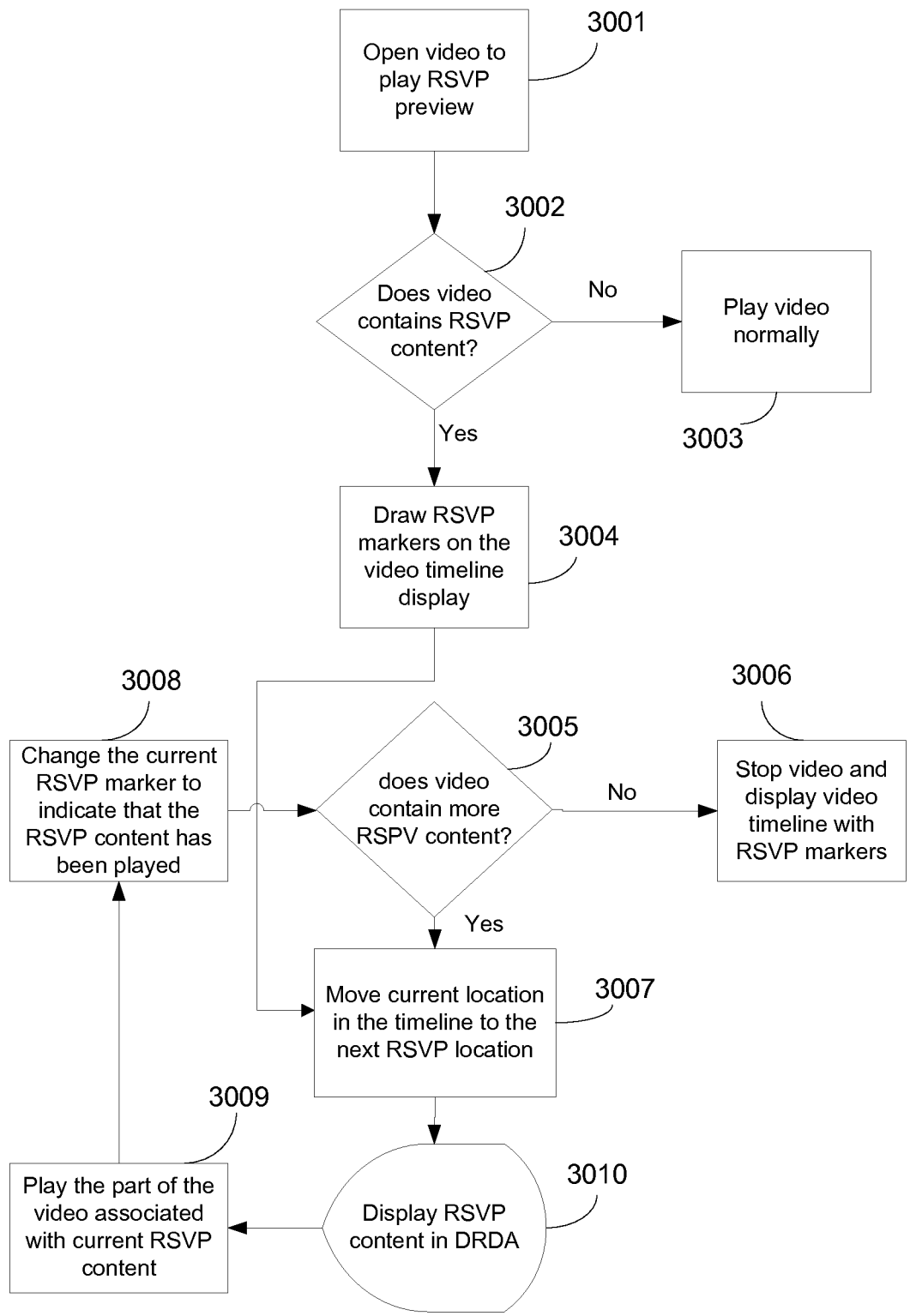
FIG. 30 illustrates a process flow implemented by a computer system in accordance with an embodiment of the present invention for playing an RSVP-enabled video preview.

FIG. 30 illustrates a process flow for a method 3000 implemented by a computer system in accordance with an embodiment of the present invention for playing an RSVP-enabled video preview. Such a preview may be displayed, for example, as shown and described FIGS. 23a-23g. Method 3000 may be implemented, for example, on a user device executing a video player application such as application 210a of FIG. 2b that is enabled to process RSPV content by RSVP software 211a which utilizes RSVP library 204.

Step 3001 opens the video preview (which may be a separate file or data stream distinct from the underlying video that is the subject of the preview while at the same time typically containing a portion of the same of the same content included in the underlying video). Step 3002 determines if the preview has any RSVP content. If no, then step 3003 displays the video preview normally (i.e., as it would any other video without RSVP content). If yes, then step 3004 displays RSVP markers on the video timeline (progress bar). Step 3007 then moves the current location indication on the progress bar to the first RSVP marker location. Step 3010 displays the RSVP content associated with the marker in a DRDA. After the first RSVP content segment finishes displaying, then step 3009 plays the video excerpt that the preview file has associated with that RSVP segment. Step 3008 then changes the current RSVP marker to indicate that the RSVP content associated with that marker has been displayed (e.g., by graying out the marker). Step 3005 determines whether the video preview contains additional RSVP-enabled content. If no, then step 3006 stops the video playback and displays the video timeline with markers. In one alternative, the preview markers are individually selectable so that the user can go back and view individual segments without having to view the entire preview. If the result of step 3005 is yes, then step 3007 repeats and advances to the next RSVP marker location in the timeline.

Figure 31:
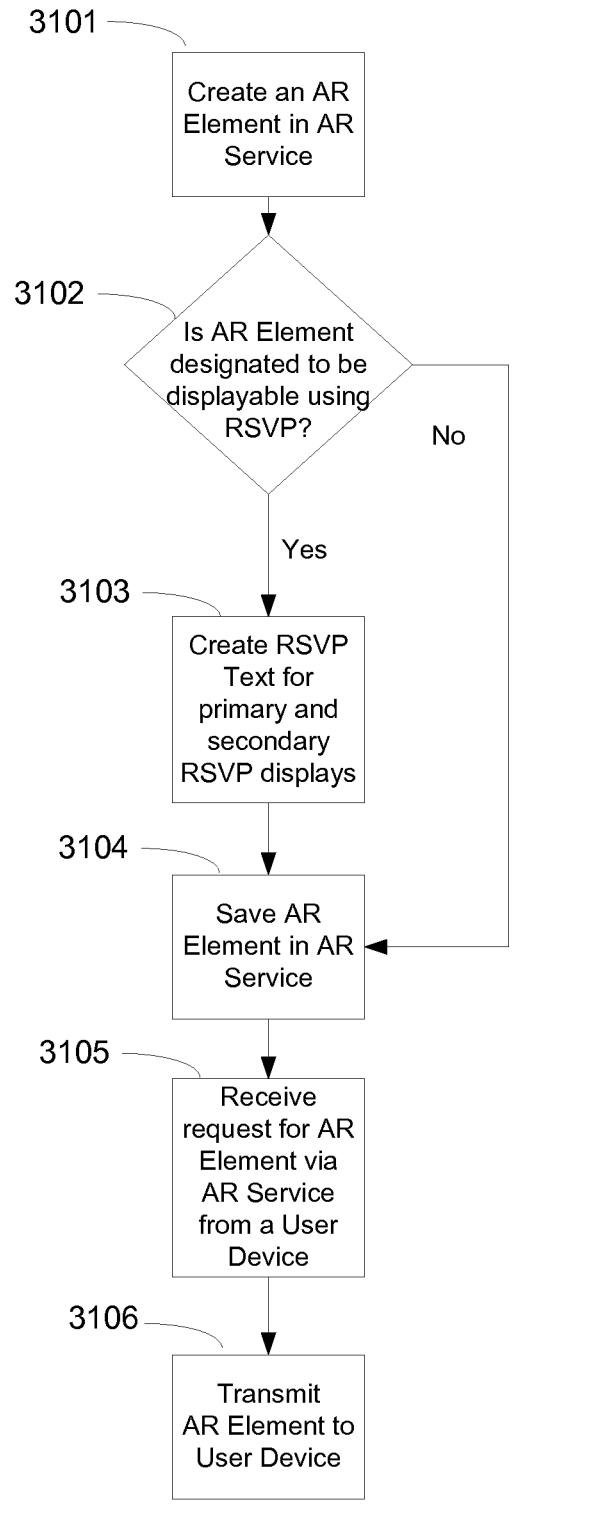
FIG. 31 illustrates a process flow implemented by a computer system in accordance with an embodiment of the present invention for delivering augmented reality ("AR") content elements that are enabled to be displayed via RSPV.

FIG. 31 illustrates a process flow for a method 3100 implemented by a computer system in accordance with an embodiment of the present invention for delivering augmented reality ("AR") content elements that are enabled to be displayed via RSPV. Such a method may be carried out by, for example, an AR service application such as application 217 shown in FIG. 2d including RSVP server library 218 and executing on a server 101.

Step 3101 creates an AR element in the relevant AR service application. Such elements are well known and typically include displayable information that is associated with a real world object viewable by a user of the AR service. Step 3102 determines whether the AR element is designated to be displayable using RSVP. If no, then the process proceeds to step 3104. If yes, then step 3103 prepares the text for RSPV display. In particular embodiments, this may include various additional steps such as, for example, parsing it into a plurality of displayable elements, inserting blank elements where appropriate, calculating display time multipliers based on word length, and determining an optimal recognition position character or proportionate position as further described in co-pending U.S. application Ser. No. 13/547,982 incorporated herein by reference above. As is further explained therein, in a particular implementation, some or all steps for preparing text for RSVP display may be accomplished on a user device rather than remotely on a server computer. If there is any sub-content associated with the AR element, then step 3103 also prepares that sub-content for RSVP display.

Step 3104 saves the AR element on the server. Step 3105 receives, at the AR service application, a request for a particular AR element from a user device. Step 3106 transmits the AR element to the requesting user device.

Figure 32:
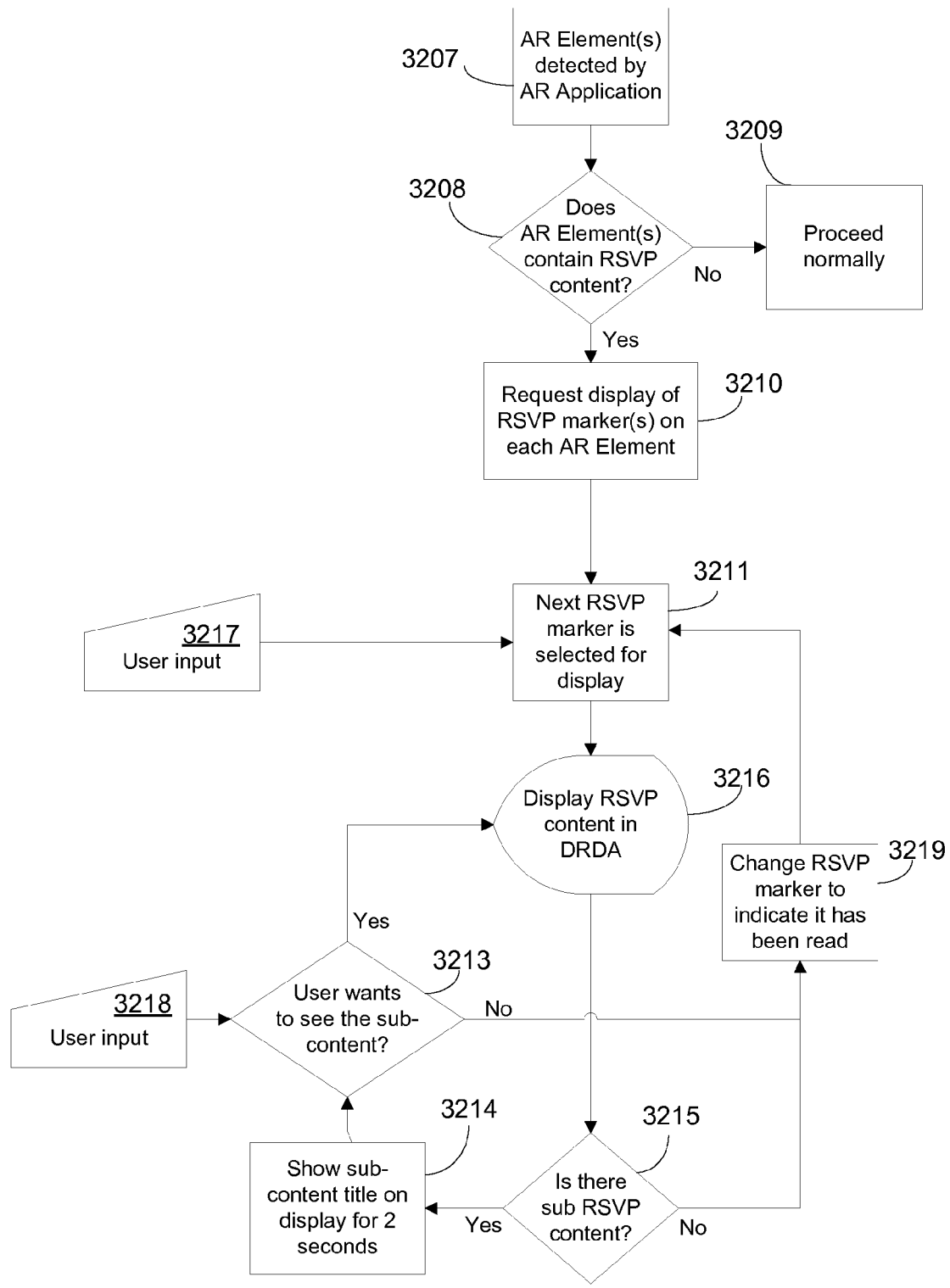
FIG. 32 illustrates a process flow implemented by a computer system in accordance with an embodiment of the present invention for processing and displaying AR content elements that are enabled to be displayed via RSPV.

FIG. 32 illustrates a process flow for a method 3200 implemented by a computer system in accordance with an embodiment of the present invention for processing and displaying AR content elements that are enabled to be displayed via RSPV. Such a method may be carried out by, for example, an AR application such as application 212 shown in FIG. 2c including RSVP software 213 and executing on a user device 210. Those skilled in the art will appreciate that, in a typical implementation, an AR application such as application 212 and/or AR service such as AR service 217 will rely in part on information obtained from a location sensor such as GPS 212 of FIG. 2c. An example of one possible resulting user interface for an RSVP-enabled AR application implementing a method according to an aspect of an invention embodiment is illustrated and described in the context of FIGS. 25a-25k.

Process 3200 begins with step 3207 which detects AR elements received from an AR service (such as AR service 217 executing method 3100 to send AR elements including RSVP displayable content to a user device). Step 3208 determines whether the received AR element or elements include RSVP content. If no, then step 3209 proceeds as the AR application normally would without RSPV content. If yes, the step 3210 displays RSVP markers on objects views associated with real world objects. In one embodiment, these markers include icons such as those illustrated in FIGS. 25a-25k. In an alternative embodiment, these markers may instead be or include short textual titles identifying the real world object. Step 3211 receives user input 3217 selecting a particular RSVP marker for display. Step 3216 displays the RSVP content corresponding to the selected marker in a DRDA. Step 3215 then determines whether there is any sub RSVP content for display. If no, then step 3219 changes the marker corresponding to the RSVP content to indicated that it has been read. If yes, then step 3214 displays titles for the sub-content for two seconds. Step 3213 determines whether user input 3218 has indicated that the user has selected to view the sub-content. If no, then step 3219 changes the marker corresponding to the primary RSVP content to indicate that it has been read. If yes, then step 3216 displays the sub-content in the DRDA. When the sub-content is finished displaying, then the process returns to step 3215 to determine if there is any additional sub-content (sub-content can also have additional sub-content). Once all the RSVP content and sub-content associated with a particular AR element has either been displayed or declined by the user for display, the process then returns to step 3211 to wait for selection of another RSPV marker for RSVP display of content associated with another AR element.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of providing for display of information regarding video content on a user electronic device, the user device being enabled to display an interface comprising a plurality of selectable video item representations, the method comprising:

enabling the user device to display, in response to a user interface action selecting to receive additional information regarding one of a plurality of video items corresponding to a selected one of the plurality of video item representations, a designated display area while simultaneously continuing to display at least a portion of the interface comprising the plurality of video items, wherein continuing to display at least a portion of said interface comprises displaying unselected others of the plurality of selectable video item representations, the designated display area being designated for rapid serial visual presentation (RSVP); and enabling the user device to display in the designated display area, in response to the user interface action, textual content containing the additional information using RSVP, wherein display of the textual content using RSVP comprises sequentially displaying respective display elements comprising respective portions of the textual content such that a predetermined position of a respective display element is displayed at a fixed display location, and further wherein each respective portion of the textual segment fits within a perceptual span of 20 characters or less, each respective portion including a subset of the textual content.

2. The method of claim 1 wherein the textual content corresponding to the selected video item is displayable without downloading a video file associated with the selected video item.

3. The method of claim 1 wherein the textual content corresponding to the selected video item is displayable without receiving a stream of video content associated with the selected video item.

4. The method of claim 1 wherein the plurality of selectable video item representations are received from a server computer in response to a search query sent from the user device.

5. The method claim 1 wherein the plurality of selectable video item representations are received from a server computer in response to the user device accessing a listing of featured video items.

6. The method of claim 1 wherein a plurality of serially displayed words in the textual content are displayed such that an optimal recognition position of each of the plurality of serially displayed words is placed at a fixed location on a display of the user electronic device.

7. The method of claim 1 wherein the textual content includes primary content and sub-content, the sub-content being selectable by a user interface action during a time period after RSVP display of the primary content is initiated, selection of the sub-content initiating RSVP display of the sub-content.

8. The method of claim 7 wherein the time period occurs after RSVP display of the primary content has finished.

9. The method of claim 7 wherein a selectable title of the sub-content is displayed for selection of the sub-content by the user interface action.

10. A method of providing for text-enhanced video display on a user electronic device, the method comprising:
enabling the user electronic device to receive media content that includes video content and related textual content, the related textual content being received for display by rapid serial visual presentation (RSVP) on the user electronic device; and
enabling the user electronic device to, with display of the video content, display the related textual content in a designated display area on the user device using RSVP corresponding to a marker displayed at a particular position in one or more frames of the video content, the particular position being associated with a particular object within the video content.

11. The method of claim 10 wherein the related textual content is displayed automatically at the one or more time locations within the video content.

12. The method of claim 10 wherein playing of the video content is paused while the related textual content is displayed using RSVP.

13. The method of claim 10 wherein playing of the video content continues while the related textual content is displayed using RSVP.

14. The method of claim 1 wherein one or more markers that indicate presence of textual content displayable by RSVP are displayed along a progress bar interface that indicates progress of playing of the video content.

15. The method of claim 10 wherein the textual content includes primary content and sub-content, the sub-content being selectable by a user interface action during a time period after RSVP display of the primary content has begun, selection of the sub-content by the user interface action being operable to initiate RSVP display of the sub-content.

16. The method of claim 15 wherein the time period occurs after RSVP display of the primary content has finished.

17. The method of claim 15 wherein a selectable title of the sub-content is displayed for selection of the sub-content by the user interface action.

18. A method of providing for text-enhanced video display on a user electronic device, the method comprising:
enabling the user electronic device to receive media content that includes video content and related textual content, the related textual content being received for display by rapid serial visual presentation (RSVP) on the user electronic device, the video content comprising one or more respective video excerpts providing partial video content of video item, the related textual content comprising one or more respective textual content segments corresponding to the one or more respective video excerpts; and
enabling the user electronic device to display a first textual content segment using RSVP and display a first video excerpt with the first textual content segment, wherein displaying a first textual content segment using RSVP comprises sequentially displaying respective display elements comprising respective portions of the first textual segment such that a predetermined position of a respective display element is displayed at a fixed display location, and further wherein each respective portion of the first textual segment fits within a perceptual span of 20 characters or less, each respective portion including a subset of the first textual segment.

19. The method claim 18 wherein enabling the user electronic device to display the first video excerpt with the first textual content segment comprises enabling the user electronic device to display the first textual segment prior to displaying the first video excerpt.

20. The method of claim 19 wherein the first video excerpt displays in response to a user interface action selecting the first video excerpt, the first user interface action being receivable when or after the first textual content segment is displayed using RSVP.

21. The method of claim 1 wherein the user electronic device is a smart phone.

22. The method of claim 1 wherein the user electronic device is a smart watch.

23. The method of claim 1 wherein the user electronic device is a head mounted display.

24. The method of claim 10 wherein the user electronic device is a smart phone.

25. The method of claim 10 wherein the user electronic device is a smart watch.

26. The method of claim 10 wherein the user electronic device is a head mounted display.

27. The method of claim 18 wherein the user electronic device is a smart phone.

28. The method of claim 18 wherein the user electronic device is a smart watch.

29. The method of claim 18 wherein the user electronic device is a head mounted display.

* * * * *